United States Patent

Nezu et al.

[11] Patent Number: 5,586,627
[45] Date of Patent: Dec. 24, 1996

[54] HYDRAULIC SHOCK ABSORBER OF DAMPING FORCE ADJUSTABLE TYPE

[75] Inventors: Takashi Nezu, Tokyo; Akira Kashiwagi, Kanagawa-ken, both of Japan

[73] Assignee: Tokico, Ltd., Kanagawa-ken, Japan

[21] Appl. No.: 246,299

[22] Filed: May 19, 1994

[30] Foreign Application Priority Data

| May 20, 1993 | [JP] | Japan | 5-141437 |
| Oct. 20, 1993 | [JP] | Japan | 5-286111 |
| Mar. 18, 1994 | [JP] | Japan | 6-074471 |
| Mar. 31, 1994 | [JP] | Japan | 6-085591 |

[51] Int. Cl.⁶ .............. F16F 9/46; B62K 25/10
[52] U.S. Cl. .............. 188/299; 188/318; 188/322.13
[58] Field of Search ............ 188/299, 315, 188/318, 322.13; 280/707, 714

[56] References Cited

U.S. PATENT DOCUMENTS

| 4,802,561 | 2/1989 | Knecht et al. | 188/318 |
| 4,880,086 | 11/1989 | Knecht et al. | 188/318 |
| 4,986,393 | 1/1991 | Preukschat | 188/318 |
| 5,324,066 | 6/1994 | Masamura et al. | 280/707 |
| 5,431,259 | 7/1995 | Mizutani et al. | 188/318 |
| 5,439,085 | 8/1995 | Woessner | 188/299 |

FOREIGN PATENT DOCUMENTS

| 160882 | 11/1948 | Australia | 188/318 |
| 3609862C2 | 10/1987 | Germany | |
| 47-45991 | 11/1972 | Japan | 188/315 |
| 48777 | 4/1977 | Japan | 188/318 |
| 4015182 | 1/1992 | Japan | 188/318 |

*Primary Examiner*—Robert J. Oberleitner
*Assistant Examiner*—Chris Schwartz
*Attorney, Agent, or Firm*—Wenderoth, Lind & Ponack

[57] ABSTRACT

The present invention is directed to a damping force adjustable hydraulic shock absorber including a cylinder filled with a hydraulic fluid, a piston slidably mounted within the cylinder to divide the interior of the cylinder into two chambers, and a piston rod having one end connected to the piston and the other end extending out of the cylinder. A damping force generating mechanism is provided to communicate between the two chambers and to generate a damping force. A communication passage for communicating one of two chambers in the cylinder with the other chamber and a valve are provided in the communication passage and are adapted to generate the damping force by opening in response to one way flow of the liquid. The shock absorber has a valve opening pressure adjusting mechanism having a back pressure chamber communicating with an upstream portion of the communication passage with respect to the valve. The adjusting mechanism is adapted to change a valve opening pressure of the valve in accordance with a pressure in the back pressure chamber. Also, a relief valve is provided which permits communication between the back pressure chamber and a downstream portion of the communication passage. The relief valve is capable of adjusting the pressure in the back pressure chamber.

8 Claims, 19 Drawing Sheets

HYDRAULIC SHOCK ABSORBER OF DAMPING FORCE ADJUSTABLE TYPE

BACKGROUND OF THE INVENTION

1. Field of the Invention

The present invention relates to a hydraulic shock absorber of a damping power adjustable type to be mounted on a suspension system of a vehicle such as an automobile and the like.

2. Related Background Art

Among hydraulic shock absorbers to be mounted on a suspension system of a vehicle such as an automobile and the like, there are hydraulic shock absorbers of damping force adjustable type in which a damping force can be properly adjusted to improve comfort and/or steering stability in accordance with road conditions, running conditions and the like.

In general, the hydraulic shock absorber of this kind is designed so that a piston to which a piston rod is connected is slidably mounted within a cylinder filled with oil, two chambers defined by the piston in the cylinder are communicated with a main oil passage and a bypass passage, respectively, a damping force generating mechanism (orifice, disk valve and the like) for generating a great damping force is provided in the main oil passage, and a damping force generating mechanism for generating a small damping force and a damping force adjusting valve for opening and closing the bypass passage are provided in the bypass passage.

With this arrangement, when the damping force adjusting valve is opened, the sliding movement of the piston due to extension and contraction of the piston rod causes the oil in the cylinder to mainly flow into the bypass passage, thereby generating small damping forces both at the extension side and at the contraction side. In this case, the damping force has a soft property. On the other hand, when the damping force adjusting valve is closed, the sliding movement of the piston due to extension and contraction of the piston rod causes the oil in the cylinder to flow into the main oil passage alone, thereby generating large damping forces both at the extension side and at the contraction side. In this case, the damping force has a hard property. In this way, the damping force property can be changed by opening and closing the damping force adjusting valve.

When a vehicle is running under normal condition, by selecting the soft damping force property, the vibration of the vehicle caused due to the unevenness of the road surface can be absorbed to improve the comfort. On the other hand, when the vehicle is cornering, being accelerated or braked, or is running at a high speed, by selecting the hard damping force property, the change in posture of the vehicle can be suppressed to improve the steering stability. Further, there has been proposed a suspension control system wherein the comfort and steering stability can be improved by combining a control device and an actuator with the hydraulic shock absorber of damping force adjustable type to automatically change the damping force at real time in accordance with the road conditions and running conditions.

In such a suspension control system, when any combination of different damping force properties of the hydraulic shock absorber between the extension side and the contraction side (for example, combination of the hard property at the extension side and the soft property at the contraction side, or combination of the soft property at the extension side and the hard property at the contraction side) can be selected, the optimum damping force can be obtained quickly in accordance with the change in the road condition and/or running condition, thereby improving the comfort and the steering stability effectively.

To this end, conventionally, there have been proposed various hydraulic shock absorbers of damping force adjustable type in which two different bypass passages are provided at the extension side and the contraction side, respectively so that different (great and small) damping force properties can be obtained by adjusting cross-sectional areas of the bypass passages.

However, in such conventional hydraulic shock absorbers of the damping force adjustable type, since time cross-sectional area of the bypass passage set by the damping force adjusting valve is fixed, the resulting damping force is varied with the magnitude of time piston speed. Accordingly, the conventional damping force adjustment is accomplished by adjusting the damping coefficient on the basis of the piston speed. Thus, in order to directly control the damping force by using the above-mentioned suspension control system, the piston speed of the hydraulic shock absorber must be detected first, then, the damping coefficient for achieving the desired damping force associated with the piston speed must be calculated, and then, the actuator must be driven to open the damping force adjusting valve to an extent that the opening value of the valve corresponds to the calculated damping coefficient. Therefore, in the conventional techniques, there arose the problems that the control circuit is subjected to great load and that it is difficult to quickly change the damping force in accordance with the change in the road condition and/or running condition.

SUMMARY OF THE INVENTION

The present invention is directed to eliminating the above-mentioned conventional drawbacks, and an object of the present invention is to provide a hydraulic shock absorber of the damping force adjustable type which can directly control a damping force without being influenced by a piston speed.

To achieve the above object, a hydraulic shock absorber of damping force adjustable type according to the present invention comprises a cylinder filled with oil, a piston slidably mounted within the cylinder to define two chambers in the cylinder, a piston rod having one end connected to the piston and the other end extending to the exterior of the cylinder, and a damping force generating mechanism for communicating the two chambers with each other and for generating a damping force. The present invention is characterized by a communication passage for communicating one of the above two chambers with time other chamber, a valve provided in the communication passage and adapted to be opened by oil flow in one direction thereby to generate the damping force, a valve opening pressure adjusting mechanism having a back pressure chamber communicated with an upstream side of the valve through an orifice and adapted to change a valve opening pressure of the valve in accordance with pressure in the back pressure chamber, and a relief valve for communicating the back pressure chamber with a downstream side of the valve to permit adjustment of the pressure in the back pressure chamber.

With this arrangement, during extension or contraction of the piston rod, since relief pressure of the relief valve is adjusted and the pressure in the back pressure chamber is also changed accordingly, and the opening value of the valve is determined by the pressure in the back pressure chamber and time pressure in the communication passage, it is possible to effect time direct control without being influenced by the piston speed.

DETAILED DESCRIPTION OF THE PREFERRED EMBODIMENTS

The present invention will now be explained in connection with embodiments thereof with reference to the accompanying drawings.

Figure 1:
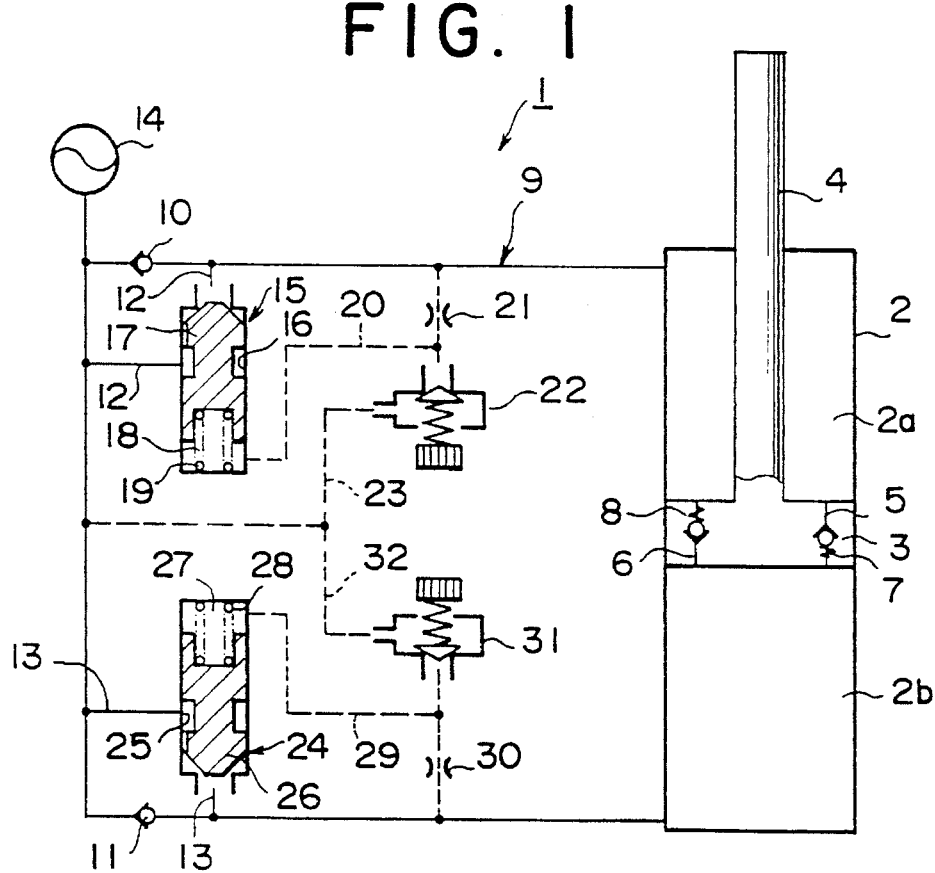
FIG. 1 is a circuit diagram of a hydraulic shock absorber of damping force adjustable type according to a first embodiment of time present invention.

First of all, a first embodiment of the present invention will be explained with reference to FIG. 1. As shown in FIG. 1, a damping force adjustable hydraulic shock absorber 1 has a piston 3 slidably mounted within a cylinder 2 filled with oil, which piston divides the interior of the cylinder 2 into an upper cylinder chamber 2a and a lower cylinder chamber 2b. A piston rod 4 is connected to the piston 3, and the other end of the piston rod 4 extends to the exterior of the cylinder 2 through a rod guide formed in an end wall of the cylinder and a seal member (not shown).

An extension side passage 5 and a contraction side passage 6 are formed in piston 3 to permit the communication between the upper cylinder chamber 2a and the lower cylinder chamber 2b. The extension side passage 5 includes a pressure regulating valve 7 such as a disc valve for permitting the oil flow from the upper cylinder chamber 2a to the lower cylinder chamber 2b to generate a damping force when pressure in the upper cylinder chamber 2a exceeds a predetermined value, and the contraction side passage 6 includes a pressure regulating valve 8 such as a disc valve for permitting the oil flow from the lower cylinder chamber 2b to the upper cylinder chamber 2a to generate a damping force when pressure in the lower cylinder chamber 2b exceeds a predetermined value.

A communication passage 9 for communicating the upper cylinder chamber 2a with the lower cylinder chamber 2b is provided outside the cylinder 2. The communication passage 9 includes a check valve 10 for preventing the oil flow from the upper cylinder chamber 2a to the lower cylinder chamber 2b, and a check valve 11 for preventing the oil flow from the lower cylinder chamber 2b to the upper cylinder chamber 2a. Further, the communication passage is connected to an extension side communication passage 12 for bypassing the check valve 10 and a contraction side communication passage 13 for bypassing the check valve 11. Tile communication passage is also connected to a reservoir (accumulator) 14 for compensating (by compression and expansion of gas) the change in volume of the cylinder 2 due to the extension and contraction of the piston rod 4.

The extension side communication passage 12 is connected to a popper valve 15 for adjusting a flow area of the passage. The popper valve 15 has a popper (valve body) 17 slidably fitted into a guide 16 so that the flow area of the extension side communication passage 12 can be adjusted by shifting the popper 17. The popper 17 is subjected to pressure at an upstream side (side of the upper cylinder chamber 2a) of the extension side communication passage 12, thereby shifting in a valve opening direction. Further, a back pressure chamber 18 is formed in the guide 16 adjacent to the back surface of the popper 17. The pressure in the back pressure chamber 18 acts to shift the popper 17 in a valve closing direction. Thus, the back pressure chamber 18 forms a part of a valve opening pressure adjusting mechanism. Further, a spring 19 for biasing the popper 17 toward the valve closing direction is disposed in the back pressure chamber 18.

Further, the back pressure chamber 18 is communicated with the upstream side (side of the upper cylinder chamber 2a) of the extension side communication passage 12 regarding the popper valve 15 through a back pressure passage 20. The back pressure passage 20 includes an orifice 21 and a relief valve 22. The relief valve 22 is so designed as to appropriately set relief pressure, and the relieved oil is sent to a downstream side (side of the reservoir 14) of the extension side communication passage 12 regarding the popper valve 15 through a relief passage 23. Further, the pressure of oil flowing into the back pressure passage 20 is reduced by the orifice 21, thereby reducing lead to the relief valve 22.

Similarly, the contraction side communication passage 13 is connected to a popper valve 24 for adjusting a flow area of the passage. The popper valve 24 has a popper (valve body) 26 slidably fitted into a guide 25 so that the flow area of the contraction side communication passage 13 can be adjusted by shifting the popper 26. The poppet 26 is subjected to pressure at an upstream side (side of the lower cylinder chamber 2b) of the contraction side communication passage 13, thereby shifting in a valve opening direction. Further, a back pressure chamber 27 is formed in the guide 25 adjacent to the back surface of the popper 26. The pressure in the back pressure chamber 27 acts to shift the popper 26 in a valve closing direction. Thus, the back pressure chamber 27 forms a part of a valve opening pressure adjusting mechanism. Further, a spring 28 for biasing the popper 26 toward the valve closing direction is disposed in the back pressure chamber 27.

Further, the back pressure chamber 27 is communicated with the upstream side (side of the lower cylinder chamber 2b) of the contraction side communication passage 13 regarding the popper valve 24 through a back pressure passage 29. The back pressure passage 29 includes an orifice 30 and a relief valve 31. The relief valve 31 is so designed as to appropriately set relief pressure, and the relieved oil is sent to a downstream side (side of the reservoir 14) of the contraction side communication passage 13 regarding the popper valve 24 through a relief passage 32. Further, the pressure of oil flowing into the back pressure passage 29 is reduced by the orifice 30, thereby reducing load to the relief valve 31.

Next, the operation of the shock absorber according to the first embodiment will be explained.

During the extension of the piston rod 4, the sliding movement of the piston 3 causes the oil in the upper cylinder chamber 2a to flow toward the lower cylinder chamber 2b through the communication passage 9. In this case, since the check valve 10 is closed and the check valve 11 is opened, the oil flows into the extension side communication passage 12, so that the damping force is generated by the popper valve 15.

In the poppet valve 15, the popper 17 subjected to the pressure of the upper cylinder chamber 2a tends to shift in the valve opening direction. On the other hand, the back pressure chamber 18 is subjected to the pressure of the upper cylinder chamber 2a through the back pressure passage 20, thereby tending to shift the poppet 17 in the valve closing direction. When the pressure in the back pressure chamber 18 exceeds a predetermined value set by the relief valve 22, the relief valve 22 is opened. As a result, since the oil in the back pressure passage 20 flows toward the lower cylinder chamber 2b through the relief passage 23, the pressure in the back pressure chamber 18 can be set by the relief valve 22. The popper 17 is shifted until it reaches a position where the pressure in the upper cylinder chamber 2a is balanced with the sum of the set pressure of the relief valve 22 and a biasing force of the spring 19. Accordingly, the popper valve 15 is opened with the opening value corresponding to the pressure in the upper cylinder chamber 2a, thereby determining the damping force. In this way, the flow area of the popper valve 15 is varied with the pressure in the upper cylinder chamber 2a, with the result that a desired damping force can be obtained substantially without being influenced by the piston speed.

Incidentally, if the pressure in the upper cylinder chamber 2a exceeds a predetermined value, the pressure regulating valve 7 of the piston 3 will be opened, with the result that the oil in the upper cylinder chamber 2a flows into the lower cylinder chamber 2b through the extension side passage 5, thereby generating a damping force.

During the contraction of the piston rod 4, the sliding movement of the piston 3 causes the oil in the lower cylinder chamber 2b to flow toward the upper cylinder chamber 2a through the communication passage 9. In this case, since the check valve 10 is opened and the check valve 11 is closed, the oil flows into the contraction side communication passage 13, so that the damping force is generated by the popper valve 24.

In the popper valve 24, similar to the poppet valve 15 associated with the extension side, the poppet 26 is shifted until it reaches a position where the pressure in the lower cylinder chamber 2b is balanced with the sum of the set pressure of the relief valve 22 and a biasing force of the spring 28. Accordingly, the poppet valve 24 is opened with the opening value corresponding to the pressure in the lower cylinder chamber 2b, thereby determining the damping force in this way, the flow area of the popper valve 24 is varied with the pressure in the lower cylinder chamber 2b, with the result that a desired damping force can be obtained substantially without being influenced by the piston speed.

Incidentally, if the pressure in the lower cylinder chamber 2b exceeds a predetermined value, the pressure regulating valve 8 of the piston 3 will be opened, with the result that the oil in the lower cylinder chamber 2b directly flows into the upper cylinder chamber 2a through the contraction side passage 6, thereby generating the damping force.

In this way, by adjusting the relief pressures of the relief valves 22, 31, the damping forces at the extension side and the contraction side can be directly controlled substantially without being influenced by the piston speed.

Figure 2:
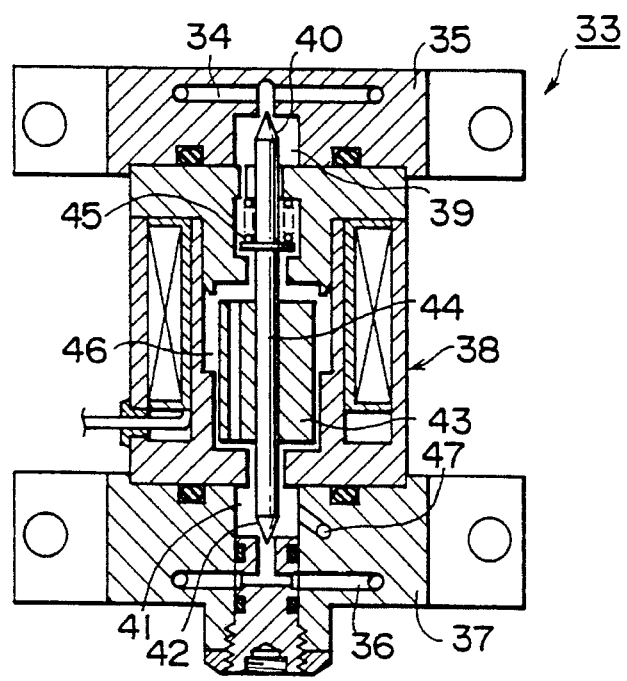
FIG. 2 is a front sectional view of an electromagnetic proportion control valve which is another embodiment of a relief valve of the shock absorber of FIG. 1.

Next, an embodiment in which an electromagnetic proportion control valve 33 shown in FIG. 2 is used in place of the relief valves 22, 31 in the adjustable damping force hydraulic shock absorber shown in FIG. 1 will be explained.

As shown in FIG. 2, the electromagnetic proportion control valve 33 is constituted by a relief valve 35 for relieving a back pressure passage 34 connected to the popper valve 15, a relief valve 37 for relieving a back pressure passage 36 connected to the popper valve 24, and a proportion solenoid 38 for opening and closing the relief valves 35, 37.

The relief valve 35 is a needle valve for permitting and preventing the communication between the back pressure passage 34 and a relief chamber 39 by means of a needle 40. Similarly, the relief valve 37 is a needle valve for permitting and preventing communication between the back pressure passage 36 and a relief chamber 41 by means of a needle 42. The needles 40, 42 are formed on both ends of a rod 44 connected to a plunger 43 of the proportion solenoid 38 so that, when one of the relief valves 35, 37 is closed by the shifting movement of the rod 44, the other relief valve is opened.

The proportion solenoid 38 includes a spring 45 for biasing the rod 44 toward the relief valve 37, so that the relief valve 37 is normally closed and the relief valve 35 is normally opened. The proportion solenoid 38 serves to generate a force for shifting the rod 44 toward the relief valve 35 via the plunger 43 in opposition to a biasing force of the spring 45 in response to a current applied to the solenoid. Further, relief pressure of the relief valve 37 can be adjusted in accordance with the applied current, and relief pressure of the relief valve 35 can be adjusted by increasing the current to shift the rod 44 toward the relief valve 35.

The relief chambers 39, 41 are communicated with each other through a passage 46 formed in the proportion solenoid 38, and are communicated with the reservoir 14 through a relief passage 47 formed in the relief valve 37.

Next, the operation of the electromagnetic proportion control valve 33 having the above-mentioned construction will be explained.

By adjusting the relief pressure of the relief valve 37 by applying the current to the proportion solenoid 38, the opening value of the popper valve 24 is adjusted, so that the damping force at the contraction side can be controlled. In this case, since the relief valve 35 is opened, the opening value of the poppet valve 15 is increased, thereby reducing the damping force at the extension side. Accordingly, the damping force property becomes a property shown by a curve (1) in FIG. 4. Incidentally, the curve (1) shows a condition that the current I applied to the proportion solenoid 38 is minimized to maximize the damping force at the contraction side.

Further, by adjusting the relief pressure of the relief valve 35 by increasing the current applied to the proportion solenoid 38 to shift the rod 44 toward the relief valve 35, the opening value of the popper valve 15 is adjusted, so that the damping force at the extension side can be controlled. In this case, since the relief valve 37 is opened, the opening value of the popper valve 24 is increased, thereby reducing the damping force at the contraction side. Accordingly, the damping force property becomes a property shown by a curve (2) in FIG. 4. Incidentally, the curve (2) shows a condition that the current I applied to the proportion solenoid 38 is maximized to maximize the damping force at the extension side.

Figure 4:
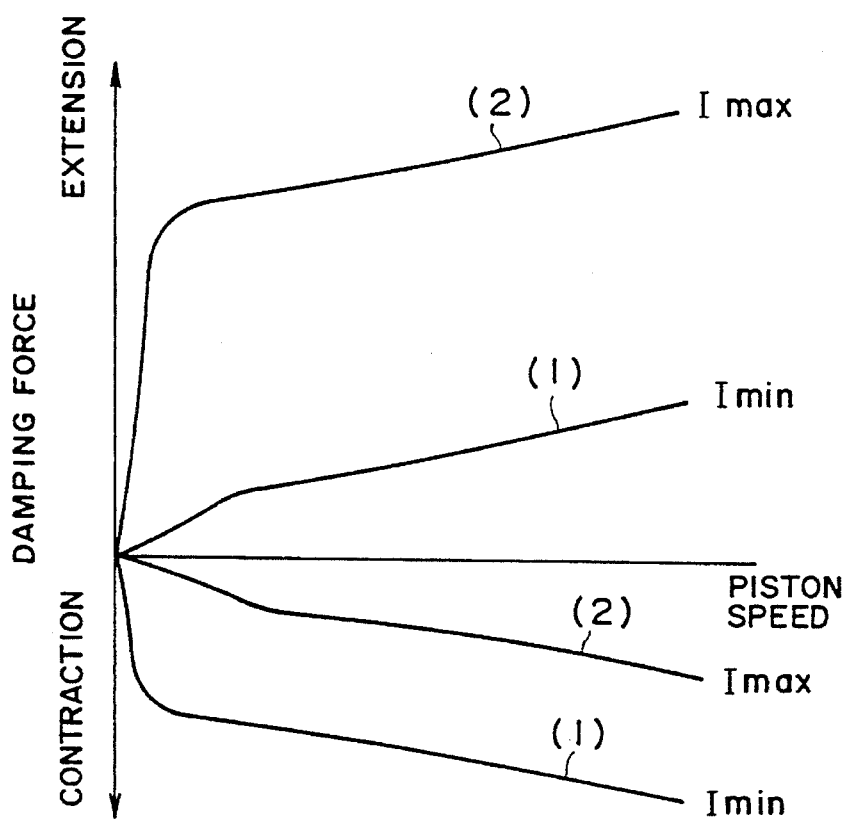
FIG. 4 is a graph showing damping properties when the electromagnetic proportion control valve of FIG. 2 is combined with the shock absorber of FIG. 1.

In this way, by adjusting the current applied to the proportion solenoid 38, it is possible to continuously adjust the damping force property between the curves (1) and (2) in FIG. 4. Further, since the different (great and small) damping forces are generated at the extension side and the contraction side, it is possible to obtain the damping force property suitable to the suspension control.

Incidentally, by adjusting the applied currents by utilizing two electromagnetic proportion control valves as the relief valves 22, 31 according to the embodiment shown in FIG. 1, the damping force at the extension side and the damping force at the contraction side can be controlled independently.

Next, a second embodiment of the present invention will be explained with reference to FIG. 3.

Figure 3:
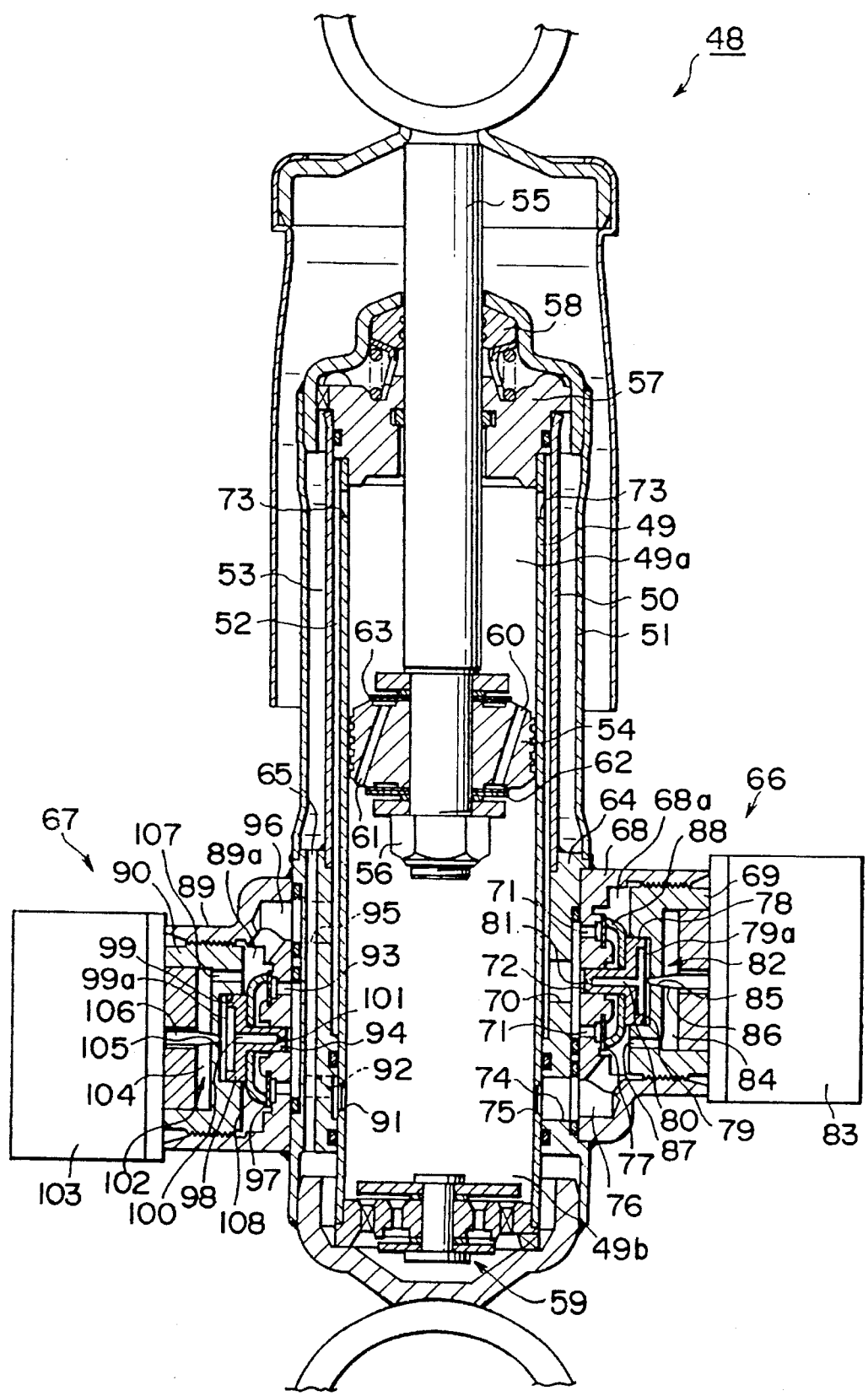
FIG. 3 is a front sectional view of a damping force adjustable hydraulic shock absorber according to a second embodiment of the present invention.

As shown in FIG. 3, a hydraulic shock absorber 48 of damping force adjustable type comprises an inner cylindrical member 50 surrounding a cylinder 49, and an outer cylindrical member 15 surrounding the inner cylindrical member 50, so that a triplicate cylinder structure is provided. With this arrangement, an annular passage 52 is defined between the cylinder 49 and the inner cylindrical member 50, and a reservoir chamber 53 is defined between the inner cylindrical member 50 and the outer cylindrical member 51.

A piston 54 is slidably mounted within the cylinder 49 to divide the interior of the cylinder 49 into an upper cylinder chamber 49a and a lower cylinder chamber 49b. A piston rod 55 has one end connected Lo the piston 54 by a nut 56, and the other end extending to the exterior of the cylinder through a rod guide 57 and a seal member 58 which are attached to an upper end of the cylinder 49. A base valve 59 is mounted on a Lower end of the cylinder 49. The lower cylinder chamber 49b is communicated with the reservoir chamber 53 through the base valve 59 with moderate flow resistance. The cylinder 49 is filled with oil and the reservoir chamber 53 is filled with oil and gas, so that the change in volume of the cylinder 49 due to extension and contraction of the piston rod 55 can be compensated by compression and expansion of the gas in the reservoir chamber 53.

An extension side passage 60 and a contraction side passage 61 for permitting the communication between the upper cylinder chamber 49a and the lower cylinder chamber 49b are formed in the piston 54. The extension side passage 60 includes a disc valve 62 for permitting the oil flow from the upper cylinder chamber 49a to the lower cylinder chamber 49b to generate a damping force when pressure in the upper cylinder chamber 49a exceeds a predetermined value, and the contraction side passage 61 includes a disc valve 63 for permitting the oil flow from the lower cylinder chamber 49b to the upper cylinder chamber 49a to generate a damping force when pressure in the lower cylinder chamber 49b exceeds a predetermined value.

A substantially cylindrical passage member 64 is arranged around the cylinder 49 near the lower end of the cylinder, and lower ends of the inner and outer cylindrical members 50, 51 are attached to an upper end of the passage member 64. An annular passage 52 is defined between the cylinder 49 and the passage member 64, and the reservoir chamber 53 is communicated with the lower cylinder chamber 49b through a reservoir passage 65 extending axially through the passage member 64 via the base valve 59.

Around the passage member 64, there are arranged an extension side damping force adjusting mechanism 66 including an extension side communication passage for communicating the upper cylinder chamber 49a with the lower cylinder chamber 49b through the annular passage 52, and a contraction side damping force adjusting mechanism 67 including a contraction side communication passage for communicating the upper cylinder chamber 49a with the lower cylinder chamber 49b through the annular passage 52. The extension side damping force adjusting mechanism 66 has a cylindrical valve case 68 having a bottom which is joined to the passage member 64, and a cylindrical plug 69 having a bottom is threaded into an opening portion of the valve case 68, thereby defining a valve chamber 68a in the valve case 68. A valve passage 71 for communicating the valve chamber 68a with the annular passage 52 through a passage 70 formed in the passage member 64, and a guide bore 72 are formed in the bottom of the valve case 68. The annular passage 52 is communicated with the upper cylinder chamber 49a through a passage 73 formed in the cylinder 49 near its upper end. Further, a communication passage 76 is formed in the bottom of the base valve 68 to communicate the lower cylinder chamber 49b with the valve chamber 68a through a passage 74 formed in the passage member 64 and a passage 75 formed in the cylinder 49 near its lower end.

A disc valve (valve body) 77 for permitting only the oil flow from the upper cylinder chamber 49a to the valve chamber 68a through the valve passage 71 thereby to generate a damping force is arranged within the valve case 68. A small diameter portion of a plunger 78 is slidably fitted into the guide bore 72, and a large diameter base of the plunger 78 is slidably fitted into a guide bore 79 formed in the plug 69. A back pressure chamber 79a is formed in the guide bore 79. A back pressure passage 80 extends through axially a center of the plunger 78 and has an orifice 81. Pressure of oil flowing into the back pressure passage 80 is reduced by the orifice 81, thereby reducing lead to a relief valve 82 which will be described later.

The relief valve 82 for relieving the pressure in the back pressure chamber 79a is formed in the plug 69. The relief valve 82 is a needle valve in which a communication passage 85 for communicating a relief chamber 84 defined by the plug 69 and a proportion solenoid 83 with the back pressure chamber 79a is opened and closed by a needle 86 connected to the proportion solenoid 83. The proportion solenoid 83 serves to adjust relief pressure of the relief valve 82 by biasing the needle 86 toward a valve closing direction with a force corresponding to the current applied to the solenoid. The relief chamber 84 is communicated with the valve chamber 68a through a relief passage 87.

The plunger 78 is connected to an urging member 88 which can abut against a back surface of the disc valve 77 so that the disc valve 77 is urged toward the valve closing direction by the pressure in the back pressure chamber 79a acting on the plunger 78. This arrangement forms a part of a valve opening pressure adjusting mechanism for adjusting a valve opening pressure for the disc valve 77.

The contraction side damping force adjusting mechanism 67 has a cylindrical valve case 89 having a bottom which is joined to the passage member 64, and a cylindrical plug 69 having a bottom is threaded into an opening portion of the valve case 89, thereby defining a valve chamber 89a in the valve case 89. A valve passage 93 for communicating the valve chamber 89a with the lower cylinder chamber 49b through a passage 91 formed in the cylinder 49 near its lower end and a passage 92 formed in the passage member 64, and a guide bore 94 are formed in the bottom of the valve case 89. Further, a communication passage 96 is formed in the bottom of the valve case 89 to communicate the valve chamber 89a with the annular passage 52 through a passage 95 formed in the passage member 64.

A disc valve (valve body) 97 for permitting only the oil flow from the lower cylinder chamber 49b to the valve chamber 89a through the valve passage 93 thereby to generate a damping force is arranged within the valve case 89 near the bottom of the valve case. A small diameter portion of a plunger 98 is slidably fitted into the guide bore 94, and a large diameter base of the plunger 98 is slidably fitted into a guide bore 99 formed in the plug 90. A back pressure chamber 99a is formed in the guide bore 99. A back pressure passage 100 extends through axially a center of the plunger 98 and has an orifice 101. Pressure of oil flowing into the back pressure passage 100 is reduced by the orifice 101, thereby reducing load to a relief valve 102 which will be described later.

The relief valve 102 for relieving the pressure in the back pressure chamber 99a is formed in the plug 90. The relief valve 102 is a needle valve in which a communication passage 105 for communicating a relief chamber 104 defined by the plug 90 and a proportion solenoid 103 with the back pressure chamber 99a is opened and closed by a needle 106 connected to the proportion solenoid 103. The proportion solenoid 103 serves to adjust relief pressure of the relief valve 102 by biasing the needle 106 toward a valve closing direction with a force corresponding to the current applied to the solenoid. The relief chamber 104 is communicated with the valve chamber 89a through a relief passage 107.

The plunger 98 is connected to an urging member 108 which can be abutted against a back surface of the disc valve 97 so that the disc valve 97 is urged toward the valve closing direction by the pressure in the back pressure chamber 99a acting on the plunger 98. This arrangement forms a part of a valve opening pressure adjusting mechanism for adjusting a valve opening pressure for the disc valve 97.

Next, the operation of the shock absorber according to the second embodiment having the above construction will be explained.

During the extension of the piston rod 55, the sliding movement of the piston 54 causes the oil in the upper cylinder chamber 49a to flow into the lower cylinder chamber 49b through the passage 73 and the annular passage 52 and through the passage 70, valve passage 71, valve chamber 68a, communication passage 76, passage 74 and passage 75 of the extension side damping force adjusting mechanism 66. And, the disc valve 77 is opened by the pressure of oil in the upper cylinder chamber 49a to adjust the flow area of the valve passage 71, thereby generating a damping force. In this case, since the disc valve 77 is urged toward the valve closing direction by means of the urging member 88, the damping force proportional to the urging load is generated. On the other hand, in the contraction side damping force adjusting mechanism 67, since the disc valve 97 and the relief valve 102 are closed by the pressure in the upper cylinder chamber 49a, there is no oil flow.

The urging load of the urging member 88 is created by transferring the oil in the upper cylinder chamber 49a to the back pressure chamber 79a through the back pressure passage 80 and by making the pressure of oil in the back pressure chamber 79a act on a pressure receiving surface of the large diameter base of the plunger 78. In this case, when the pressure in the back pressure chamber 79a exceeds the pressure set by the relief valve 82, the relief valve 82 is opened so that the oil in the back pressure chamber 79a escapes to the relief chamber 84 and flows into the valve chamber 68a associated with the lower cylinder chamber 49b through the relief passage 87. Therefore, the pressure in the back pressure chamber 79a can be set by the relief valve 82. Accordingly, the damping force can be directly controlled when the relief pressure of the relief valve 82 is set by adjusting the biasing force for the needle 86 by using the current applied to the proportion solenoid 83 so that the opening value of the disc valve 77 is changed in accordance with the pressure in the upper cylinder chamber 49a, thereby obtaining the desired damping force substantially without being influenced upon the piston speed.

Incidentally, if the pressure in the upper cylinder chamber 49a exceeds a predetermined value, the disc valve 62 of the piston 54 will be opened to directly flow the oil in the upper cylinder chamber 49a to the lower cylinder chamber 49b through the extension side passage 60, thereby generating the damping force.

During the contraction of the piston rod 55, the sliding movement of the piston 54 causes the oil in the lower cylinder chamber 49b to flow into the upper cylinder chamber 49a through the passage 91 and through the passage 92, valve passage 93, valve chamber 89a, communication passage 96, passage 95, annular passage 52 and passage 73 of the contraction side damping force adjusting mechanism 67. The disc valve 97 is opened by the pressure of oil in the lower cylinder chamber 49b to adjust the flow area of the valve passage 93, thereby generating the damping force. In this case, since the disc valve 97 is urged toward the valve closing direction by the urging member 108, the damping force proportional to the urging load of the urging member is generated. On the other hand, in the extension side damping force adjusting mechanism 66, since the disc valve 77 and the relief valve 82 are closed by the pressure in the lower cylinder chamber 49b, there is no oil flow.

The urging load of the urging member 108 is created by transferring the oil in the lower cylinder chamber 49b to the back pressure chamber 99a through the back pressure passage 100 of the plunger 98 and by making the pressure of oil in the back pressure chamber 99a act on a pressure receiving surface of the large diameter base of the plunger 98. In this case, when the pressure in the back pressure chamber 99a exceeds the pressure set by the relief valve 102, the relief valve 102 is opened so that the oil in the back pressure chamber 99a escapes to the relief chamber 104 and flows into the valve chamber 89a associated with the upper cylinder chamber 49a through the relief passage 107. Therefore, the pressure in the back pressure chamber 99a can be set by the relief valve 102. Accordingly, the damping force can be directly controlled when the relief pressure of the relief valve 102 is set by adjusting the biasing force for the needle 106 by using the current applied to the proportion solenoid 103, so that the opening value of the disc valve 97 is changed in accordance with the pressure in the lower cylinder chamber 49b, thereby obtaining the desired damping force substantially without being influenced upon the piston speed.

Incidentally, if the pressure in the lower cylinder chamber 49b exceeds a predetermined value, the disc valve 63 of the piston 54 will be opened to directly flow the oil in the lower cylinder chamber 49b to the upper cylinder chamber 49a through the contraction side passage 61, thereby generating the damping force.

In this way, by adjusting the relief pressures of the relief valves 87, 102 by the currents applied to the proportion solenoids 83, 103, the damping forces at the extension side and the contraction side can be directly controlled, respectively, substantially without being influenced upon the piston speed.

Next, the control regarding the suspension control system of the automobile to which the hydraulic shock absorber 48 of damping force adjustable type according to the second embodiment is applied will be explained with reference to FIGS. 5 to 7. Incidentally, the fundamental theory of the control which will be explained hereinbelow is the same as that described in the Japanese Patent Application No. 5-2148.

Figure 5:
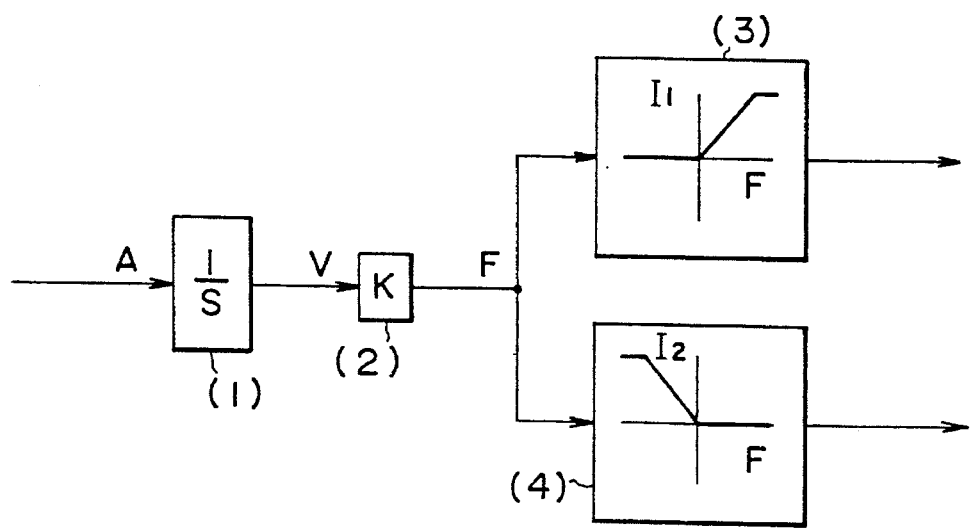
FIG. 5 is a block diagram showing an example of the control effected by means of a controller of a suspension control system to which the damping force adjustable hydraulic shock absorber is applied.

As shown in FIG. 5, an acceleration signal A emitted from an acceleration sensor attached to the body of the vehicle and adapted to measure acceleration in an up-and-down direction is integrated in a block (1) to calculate a velocity V of the vehicle in the up-and-down direction. In a block (2), a desired damping force F is calculated by multiplying the velocity V by control gain K. Now, it is assumed that the desired damping force F is positive when the vehicle is moved upwardly and the desired damping force F is negative when the vehicle is moved downwardly. In a block (3), current $I_1$ to be applied to the extension side proportion solenoid 83 and corresponding to the desired damping force F is calculated, and, in a block (4), current $I_2$ to be applied to the contraction side proportion solenoid 103 and corresponding to the desired damping force F is calculated. In this case, in the block (3), when the desired damping force F is positive, the current $I_1$ corresponding to the desired damping force F is calculated, and, when the desired damping force is negative, the current $I_1$ is regarded as zero ($I_1$=0). On the other hand, in the block (4), when the desired damping force F is negative, the current $I_2$ corresponding to the desired damping force F is calculated, and, when the desired damping force is positive, the current $I_2$ is regarded as zero ($I_2$=0).

In this way, by generating the desired damping force F at one of the extension side and contraction side damping force adjusting mechanisms 66, 67 of the hydraulic shock absorber 48 of damping force adjustable type and by reducing the damping force at the other damping force adjusting mechanism in accordance with the velocity of the vehicle in the up-and-down direction, it is possible to effectively suppress the vibration of the vehicle on the basis of the aforementioned fundamental theory.

In the control shown in FIG. 5, since the damping force is controlled on the basis of velocity of sprung mass, even when unsprung mass is strongly vibrated under the severe road condition, if the velocity of the sprung mass becomes small, the damping force will be reduced, thereby worsening the vibration control of the unsprung mass.

Figure 6:
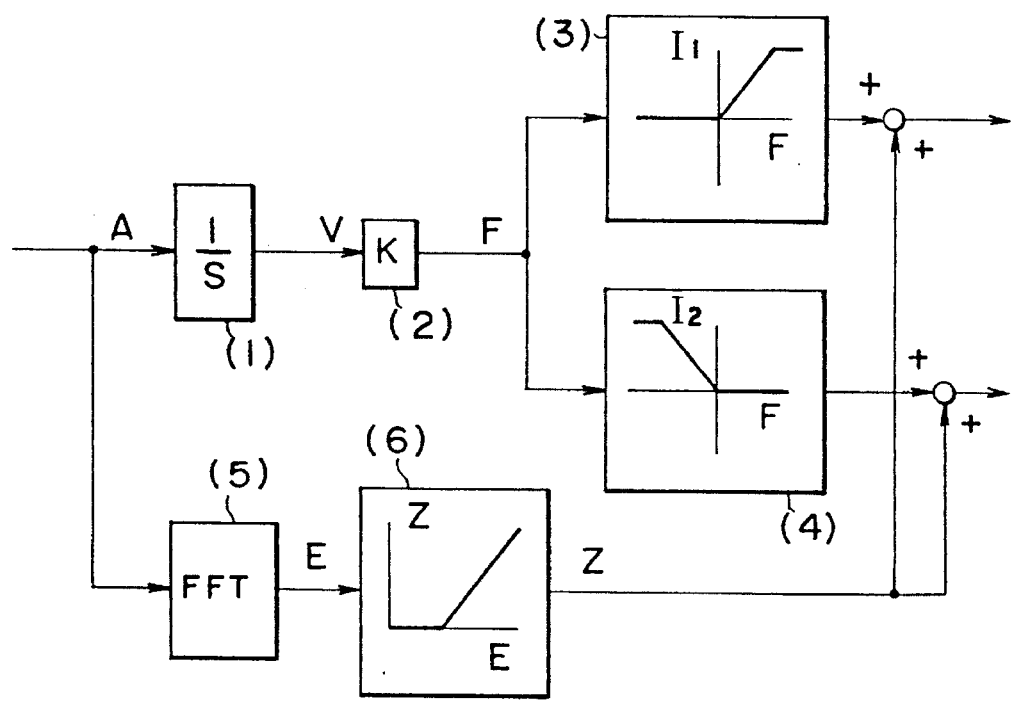
FIG. 6 is a block diagram showing another example of control effected by means of the controller of the suspension control system to which the damping force adjustable hydraulic shock absorber is applied.
Figure 7:
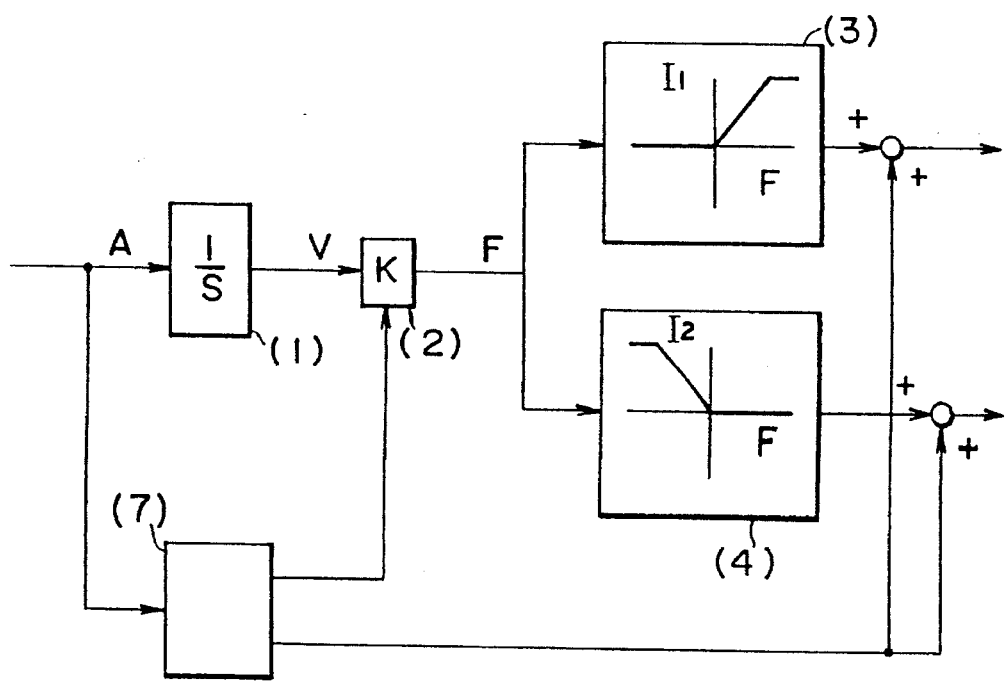
FIG. 7 is a block diagram showing an example of control effected during fall occurrence in the control by means of the controller of FIG. 5.

To avoid tills, as shown in FIG. 6, in addition to the control shown in FIG. 5, in a block (5), high speed Fourier transform regarding the acceleration signal A is effected to determine power spectral density, and a level value E at a predetermined frequency area regarding relatively high frequency (value near a resonance point of the unsprung mass in the order of 1.0–15 Hz) of the power spectral density is calculated, and, in a block (6), a damping force correction value Z is calculated by multiplying the level value E by function having a dead zone. And, the damping force correction value Z is added to the currents $I_1$, $I_2$ outputted from the blocks (3) and (4). By doing so, even if the velocity of the sprung mass is small, when the level value E of the predetermined frequency area is increased under the severe road condition, the damping force is also increased. Thus, since the road condition (severe or bad road condition and the like) resulting in the reduction in the road gripping feature of wheels and/or full-stroke of the suspension system can be judged on the basis of the magnitude of the level value E, the vibration control of the unsprung mass can be improved by appropriately increasing or decreasing the damping forces at the extension side and the contraction side of the hydraulic shock absorber 48 of damping force adjustable type.

Next, the control effected in the suspension control system when failure occurs will be explained with reference to FIG. 7. As shown in FIG. 7, in addition to the control shown in FIG. 5 or 6 (incidentally, FIG. 7 only shows elements corresponding to those in FIG. 5), in a block (7), if an abnormal signal is emitted from any one of sensors of the suspension control system (in FIG. 7, only the acceleration signal is depicted), the control gain K in the block (2) is set to zero (K=0), and, further, the currents $I_1$, $I_2$ are applied to the proportion solenoids 83, 103 in such a manner that the damping forces sufficient to maintain the steering stability of the vehicle can be obtained both at the extension side and at the contraction side of the hydraulic shock absorber 48 of damping force adjustable type.

In this way, even if the fail occurs, by applying the predetermined currents $I_1$, $I_2$ to the proportion solenoids 83, 103, the adequate damping forces can be obtained both at the extension side and at the contraction side, thereby preventing the reduction in the steering stability.

Incidentally, in the control according to the illustrated embodiment, although the clamping force obtained by the hydraulic shock absorber of damping force adjustable type is minimized when the currents $I_1$, $I_2$=0, by designing so that the predetermined damping force is generated when the currents (applied to the proportion solenoids 83, 103) $I_1$, $I_2$=0 by applying initial loads (by means of springs) to the needles 86, 106 of the relief valves 82, 102 in the valve closing direction, the predetermined relief pressure can be achieved to obtain the adequate damping force merely by making the control gain K in the block (2) zero (K=0) if the failure occurs. With this arrangement, under the normal control, when the damping force smaller than that upon occurrence of the failure is required, the needles 86, 106 may be biased in the valve opening direction by applying the currents $I_1$, $I_2$ to the proportion solenoids 83, 103 reversely.

Next, a third embodiment of the present invention will be explained with reference to FIG. 8. Since the third embodiment is substantially the same as the hydraulic shock absorber 48 of damping force adjustable type according to the second embodiment shown in FIG. 3 except for the extension side damping force adjusting mechanism 66 and the contraction side damping force adjusting mechanism 67, the same elements as those of the second embodiment are designated by the same reference numerals, and only the differences will be fully explained.

Figure 8:
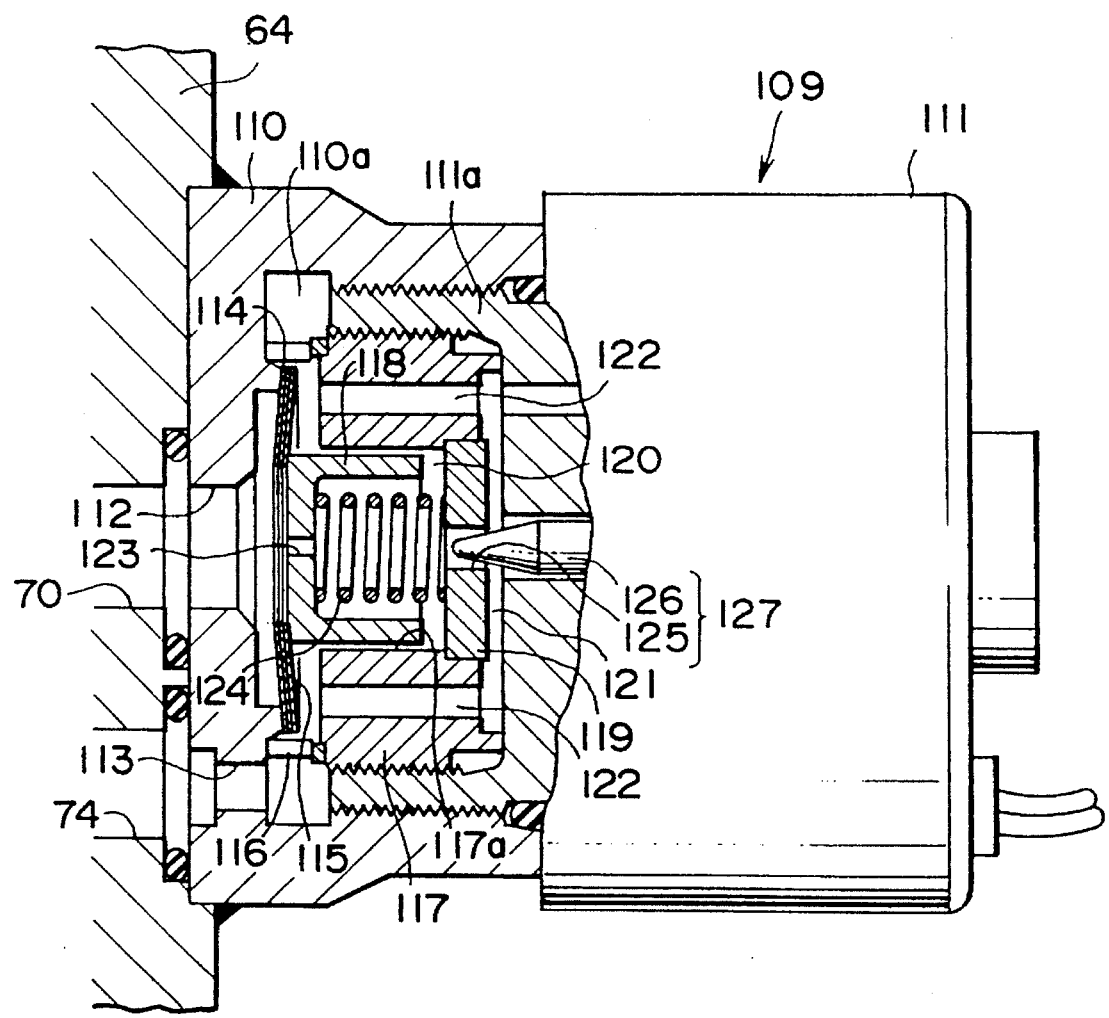
FIG. 8 is a longitudinal view, in partial section, of a damping force adjusting mechanism of a hydraulic shock absorber according to a third embodiment of the present invention.

As shown in FIG. 8, an extension side damping force adjusting mechanism 109 forming an extension side communication passage comprising an inlet passage 112 (described later) communicated with the upper cylinder chamber 49a and all outlet passage 113 (described later) communicated with the lower cylinder chamber 49b is arranged at one side of the passage member 64. Further, a contraction side damping force adjusting mechanism (not shown) forming an contraction side communication passage for communicating the upper cylinder chamber 49a with the lower cylinder chamber 49b is arranged at the other side of the passage member 64. Since the contraction side damping force adjusting mechanism is the same as the extension side damping force adjusting mechanism 109 except that an inlet passage thereof is communicated with the lower cylinder chamber 49b and an outlet passage thereof is communicated with the upper cylinder chamber 49a, only the extension side damping force adjusting mechanism will be fully explained hereinafter.

The damping force adjusting mechanism 109 has a cylindrical valve case 110 having a bottom which is joined to the passage member 64, and a cylindrical fitting portion 111a of a proportion solenoid 111 is fitted and threaded into an opening portion of the valve case 110, thereby defining a valve chamber 110a in the valve case 110. An inlet passage 112 for communicating the valve chamber 110a with the passage 70 of the passage member 64, and an outlet passage 113 for communicating the valve chamber 110a with the passage 74 are formed in the bottom of the valve case 110, respectively.

An annular valve seat 114 is formed on an inner surface of the bottom of the valve case 110, and an annular disc valve (valve body) 115 for permitting the oil flow from the inlet passage 112 to the valve chamber 110a to generate a damping force and for preventing the oil flow in a reverse direction is seated on the valve seat 114. The disc valve 115 comprises a plurality of laminated discs and a peripheral portion of the valve is positioned and supported by a disc guide 116.

A substantially cylindrical guide member 117 having a guide bore 117a is fitted into the fitting portion 111a of the proportion solenoid 111, and a cylindrical plunger 118 having a bottom and forming a part of a valve opening pressure adjusting mechanism is slidably fitted into the guide bore 117a. The bottom of the plunger 118 abuts against an inner peripheral edge of the disc valve 115. A valve seat member 119 is attached to an opening portion of the guide bore 117a, and a back pressure chamber 120 is defined by the valve seat member 119 in the guide bore 117a adjacent to a back surface of the plunger 118. A relief chamber 121 is defined by the guide member 117 and the valve seat member 119, and a relief passage 122 for communicating the valve chamber 110a with the relief chamber 121 is formed in the guide member 117. An orifice 123 as a back pressure passage for communicating the inlet passage 112 with the back pressure chamber 120 is formed in the bottom of the plunger 118. The pressure of oil flowing into the back pressure chamber 120 is reduced by the orifice 123, thereby reducing load to a relief valve which will be described later. A spring 124 for biasing the plunger 118 toward the disc valve 115 is arranged between the plunger 118 and the valve seat member A valve bore 125 for communicating the back pressure chamber 120 with the relief chamber 121 is formed in the valve seat member 119, and a tip end of a needle 126 connected to an actuator rod (not shown) of the proportion solenoid 111 is inserted into the valve bore 125. The valve bore 125 and the needle 126 constitute a relief valve 127 for retrieving the pressure in the back pressure chamber 120. The proportion solenoid 111 serves to adjust the relief pressure by biasing the needle 126 in the valve closing direction with a force corresponding to current applied to the solenoid.

Next, the operation of the shock absorber according to the third embodiment having the above construction will be explained.

Similar to the second embodiment, during the extension of the piston rod 55, the oil in the upper cylinder chamber 49a flows into the inlet passage 112 of the damping force adjusting mechanism 109 through the passage 70. And, the oil emitted from the inlet passage 112 forcibly opens the disc valve 115 and flows thereinto, and is sent to the lower cylinder chamber 49b through the outlet passage 113 and the passage 74. The disc valve 115 is deformed or flexed by the pressure in the upper cylinder chamber 49a to create a gap between the disc valve and the valve seat 114, thereby generating a damping force depending upon a flow area of the gap. In this case, since the disc valve 115 is urged against the valve seat 114 by the plunger 118, the valve opening pressure is adjusted by the urging load, thereby generating the damping force proportional to the urging force.

The urging load of the plunger 118 is created by a biasing force of the spring 124 and the pressure in the back pressure chamber 120 transferred from the upper cylinder chamber 49a through the orifice 123 of the plunger 118. In this case, when the pressure in the back pressure chamber 120 exceeds the pressure set by the relief valve 127, since the relief valve 127 is opened so that the oil in the back pressure chamber 120 escapes to the relief chamber 121 and flows into the valve chamber 110a through the relief passage 122, the pressure in the back pressure chamber 120 can be set by the relief valve 127. Accordingly, the damping force can be directly controlled when the relief pressure of the relief valve 127 is set by adjusting the biasing force for the needle 126 by using the current applied to the proportion solenoid 111, so that the opening value of the disc valve 115 is changed in accordance with the pressure in the upper cylinder chamber 49a, thereby containing the desired damping force substantially without being influenced upon the piston speed.

Further, since the plunger 118 is always urged against the disc valve 115 by the biasing force of the spring 124, it is possible to prevent any play from being created between the plunger 118 and the disc valve 115, and, even if the solenoid 111 is not operated due to the breakage of an electric wire, a desired minimum damping force can be maintained.

As shown in FIG. 8, since the disc valve 115 comprises a plurality of laminated discs, a moderate damping force obtained due to the friction between the discs can be used to resist the flexion of the disc valve, thereby preventing the vibration of the disc valve 115.

On the other hand, during the contraction of the piston rod 55, since the disc valve 115 and the relief valve 127 are closed by the pressure of oil in the lower cylinder chamber 49b, there is no oil flow in the damping force adjusting mechanism. Since the oil in the lower cylinder chamber 49b flows into the upper cylinder chamber 49a through the contraction side damping force adjusting mechanism, the predetermined damping force can be obtained substantially without being influenced upon the piston speed, as is in the above-mentioned case.

Accordingly, similar to the second embodiment, by adjusting the relief pressures in accordance with the currents applied to the proportion solenoid 111 of the extension side damping force adjusting mechanism 109 and the proportion solenoid of the contraction side damping force adjusting mechanism, the damping forces at the extension side and the contraction side can be directly controlled substantially without being influenced upon the piston speed, respectively.

According to the hydraulic shock absorber of damping force adjustable type of the present invention, during the extension or the contraction of the piston rod, since the opening value of the valve is determined in accordance with the pressure in the communication passage and the pressure in the back pressure chamber, the latter pressure being changed by adjusting the relief pressure of the relief valve, the damping force can be directly controlled substantially without being influenced upon the piston speed. As a result, when such a hydraulic shock absorber is applied to the suspension control system, since the damping force can be directly controlled substantially without being influenced upon the piston speed, the detection of the piston speed can be omitted, thereby reducing the load to the controller.

Next, a fourth embodiment of the present invention will be explained with reference to FIG. 9. This fourth embodiment is the same as the first embodiment shown in FIG. 1 except that a relief valve 133 is used. Thus, the same elements as those in the first embodiment are designated by the same reference numerals and explanation thereof will be omitted.

Figure 9:
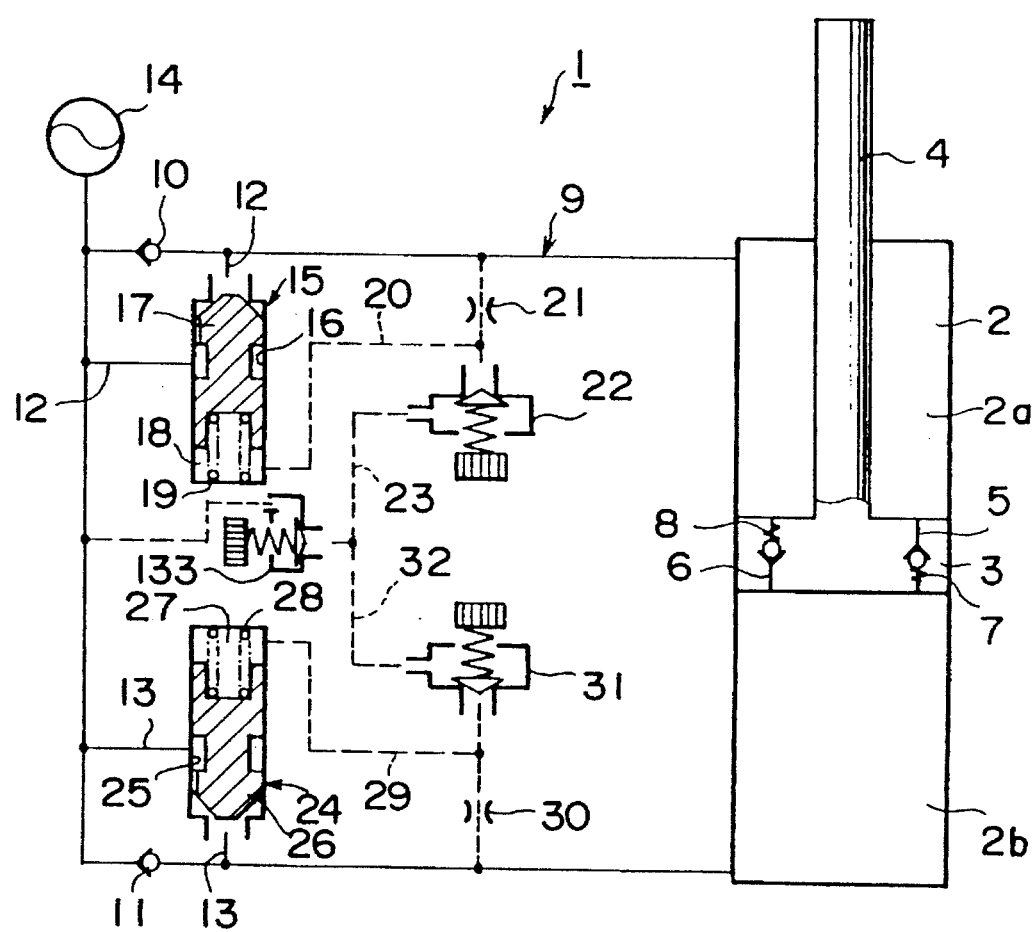
FIG. 9 is a circuit diagram of a damping force adjustable hydraulic shock absorber according to a fourth embodiment of the present invention.

In the embodiment shown in FIG. 9, the extension side relief passage (drain passage) 23 and the contraction side relief passage (drain passage) 32 are communicated with the reservoir 14 via a relief valve 133 acting as a control valve for adjusting flow resistances in these relief passages. The relief valve 133 is so designed that relief pressure thereof can be freely set, and the relieved oil flows into the reservoir 14.

During the extension of the piston rod 4, the sliding movement of the piston 3 causes the oil in the upper cylinder chamber 2a to flow into the lower cylinder chamber 2b through the communication passage 9. In this case, since the check vale 10 is closed and the check valve 11 is opened, the oil flows in the extension side communication passage 12, so that the damping force is generated by the poppet valve 15.

In the popper valve 15, the popper 17 tends to be shifted toward the valve opening direction under the action of the pressure in the upper cylinder chamber 2a. On the other hand, the pressure in the upper cylinder chamber 2a is transferred into the back pressure chamber 18 through the back pressure passage 20, with the result that the popper 17 tends to be shifted toward the valve closing direction. When the pressure of oil in the back pressure chamber 18 reaches the predetermined value, the oil is relieved toward the reservoir 14 through the relief valve 22 and the relief valve 133. In this case, since the pressure at the relief side of the relief valve 22 relies upon the set pressure of the relief valve 133, actual cracking pressure (operating pressure) of the relief valve 22 is determined in accordance with the set pressures of the relief valves 22, 133. Thus, the pressure in the back pressure chamber 18 can be set by adjusting the set pressures of the relief valves 22, 133. And, the popper 17 is shifted to a position where the pressure in the upper cylinder chamber 2a is balanced with the pressure in the back pressure chamber 18 and the biasing force of the spring 19. Accordingly, the popper 15 is opened with the opening value corresponding to the pressure in the upper cylinder chamber 2a, thereby determining the damping force. In this way, the flow area of the popper valve 15 is varied with the pressure in the upper cylinder chamber 2a, thereby generating the damping force substantially without being influenced upon the piston speed.

Incidentally, if the pressure in the upper cylinder chamber 2a exceeds the predetermined value, the pressure regulating valve 7 of the piston 3 is opened to directly flow the oil in the upper cylinder chamber 2a into the lower cylinder chamber 2b through the extension side passage 5, thereby generating the damping force.

During the contraction of the piston rod 4, the sliding movement of the piston 3 causes the oil in the lower cylinder chamber 2b to flow toward the upper cylinder chamber 2a through the communication passage 9. In this case, since the check valve 10 is opened and the check valve 11 is closed, the oil flows into the contraction side communication passage 13, so that the damping force is generated by the popper valve 24.

In the popper valve 24, similar to the poppet valve 15 associated with the extension side, the pressure in the back pressure chamber 27 is determined by the set pressures of the relief valves 31,133, and the popper 26 is shifted until it reaches a position where the pressure in the lower cylinder chamber 2b is balanced with the sum of the pressure of the back pressure chamber 27 and the biasing force of the spring 28, with the result that the popper valve 24 is opened with the opening value corresponding to the pressure in the lower cylinder chamber 2b, thereby determining the damping force. In this way, the flow area of the popper valve 24 is varied with the pressure in the lower cylinder chamber 2b, with the result that a desired damping force can be obtained substantially without being influenced upon the piston speed.

Incidentally, if the pressure in the lower cylinder chamber 2b exceeds a predetermined value, the pressure regulating valve 8 of the piston 3 will be opened, with the result that the oil in the lower cylinder chamber 2b directly flows into the upper cylinder chamber 2a through the contraction side passage 6, thereby generating the damping force.

In this way, by adjusting the relief pressures of the relief valves 22, 31, 133, the damping forces at the extension side and the contraction side can be directly controlled substantially without being influenced upon the piston speed. In this case, since the damping forces at the extension side and the contraction side rely upon the set pressure of the relief valve 133, the damping force at the extension side and the damping force at the contraction side can be adjusted simultaneously by adjusting the set pressure of the relief valve 133. Thus, the properties of the damping forces at the extension side and the contraction side are set by utilizing the set pressures of the relief valves 22 and 31, respectively, and the property of the damping force at the extension side and the property of the damping force at the contraction side can be adjusted to become soft property or hard property by utilizing the set pressure of the relief valve 133.

And, by increasing the set pressure of the relief valve 133, under the severe road condition, it is possible to easily enhance convergence of vibration of the bottoming of the shock absorber. Further, by adjusting the set pressure of the relief valve 133, the property of the damping force at the extension side and the property of the damping force at the contraction side can be set to become soft property or hard property in accordance with driver's demand.

Further, in the suspension control system, if the failure occurs in the system, by increasing the set pressure of the relief valve 133, the damping forces at the extension side and the contraction side can be increased regardless of the set pressures of the relief valves at the extension side and the contraction side, thereby maintaining the steering stability well.

Figure 10:
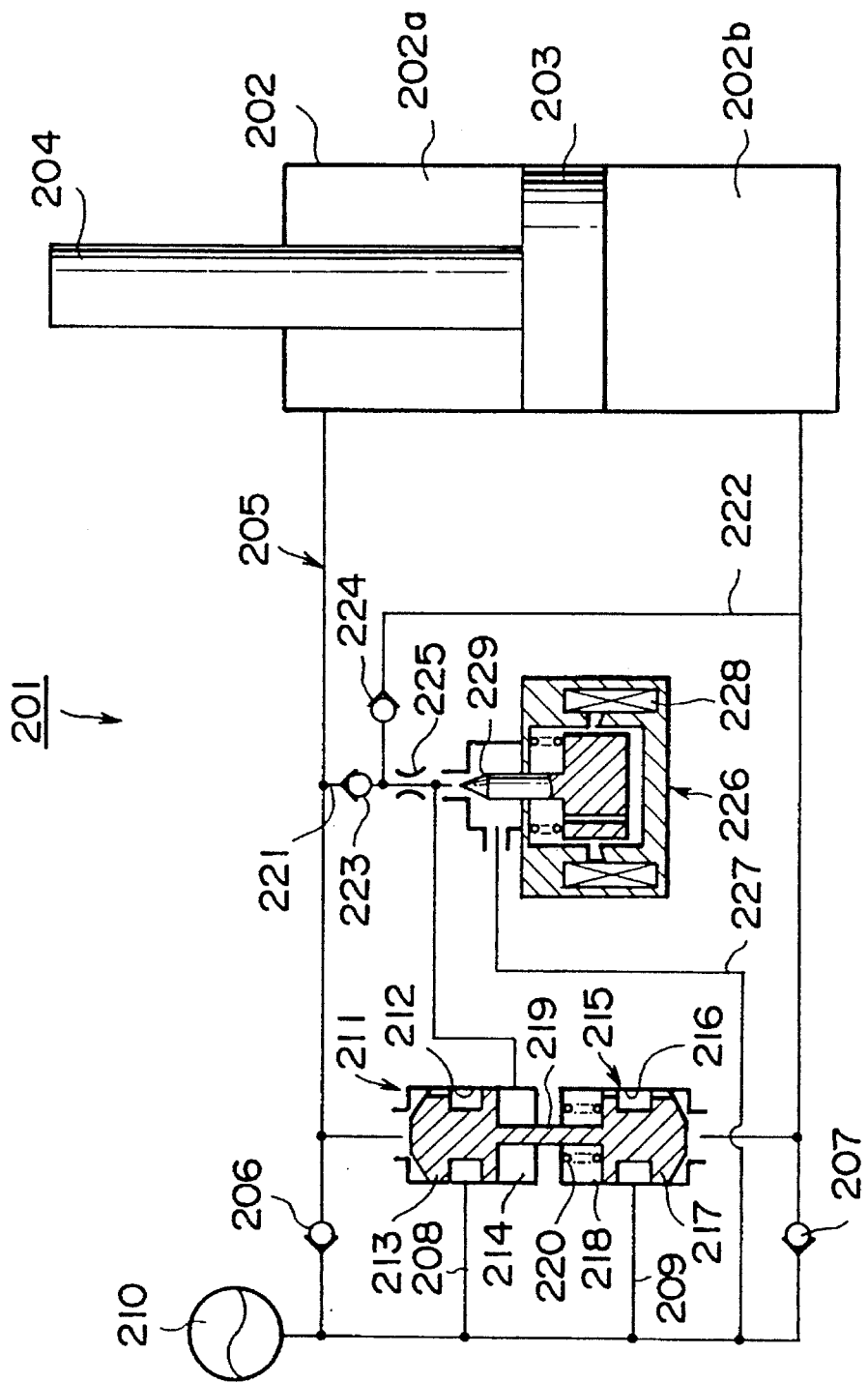
FIG. 10 is a circuit diagram of a damping force adjustable hydraulic shock absorber according to a fifth embodiment of the present invention.

Next, a fifth embodiment of the present invention will be explained with reference to FIG. 10. As shown in FIG. 10, a hydraulic shock absorber 201 of damping force adjustable type has a piston 203 slidably mounted within a cylinder 202 filled with oil, which piston 203 divides the interior of the cylinder 202 into an upper cylinder chamber 202a and a lower cylinder chamber 202b. A piston rod 204 is connected to the piston 203, and the other end of the piston rod 204 extends to the exterior of the cylinder 202 through a rod guide formed in an end wall of the cylinder and a seal member (not shown).

A communication passage 205 for communicating the upper cylinder chamber 202a with the lower cylinder chamber 202b is provided outside the cylinder 202. The communication passage 205 includes a check valve 206 for preventing the oil flow from the upper cylinder chamber 202a to the lower cylinder chamber 202b, and a check valve 207 for preventing the oil flow from the lower cylinder chamber 202b to the upper cylinder chamber 202a. Further, the communication passage 205 is connected to an extension side communication passage 208 for bypassing the check valve 206 and a contraction side communication passage 209 for bypassing the check valve 207. The communication passage 205 is also connected to a reservoir (accumulator) 210 for compensating (by compression and expansion of gas) the change in volume of the cylinder 202 due to the extension and contraction of the piston rod 204.

The extension side communication passage 208 is connected to a popper valve 211 as an extension side damping force adjusting valve for adjusting a flow area of the passage to generate a damping force. The popper valve 211 has a popper (valve body) 213 slidably fitted into a guide 212 so that the flow area of the extension side communication passage 208 can be adjusted by shifting the popper 213. The popper 213 is subjected to pressure at an upstream side (side of the upper cylinder chamber 202a) of the extension side communication passage 208, thereby shifting in a valve opening direction. Further, a pressure chamber 214 is formed in the guide 212 adjacent to the back surface of the popper 213. The pressure in the pressure chamber 214 acts to shift the popper 213 in a valve closing direction.

Similarly, the contraction side communication passage 209 is connected to a popper valve 215 as a contraction side damping force adjusting valve for adjusting a flow area of the passage to generate a damping force. The poppet valve 215 has a poppet (valve body) 217 slidably fitted into a guide 216 so that the flow area of the contraction side communication passage 209 can be adjusted by shifting the popper 217. The popper 217 is subjected to pressure at an upstream side (side of the lower cylinder chamber 202b) of the contraction side communication passage 209, thereby shifting in a valve opening direction. Further, a drain chamber 218 for preventing the pressure from acting on the popper 217 is formed in the guide 216 adjacent to the back surface of the popper 217.

The popper 213 of the popper valve 211 and the popper 217 of the popper valve 215 are interconnected via a connecting rod 219. With this arrangement, there is provided a damping force inversion means according to the present invention, wherein, when the popper valve 211 is shifted upwardly in FIG. 10, the damping force at the side of the popper valve 211 is increased and the damping force at the side of the popper valve 215 is decreased, and, when the popper valve 211 is shifted downwardly in FIG. 10, the damping force at the side of the popper valve 211 is decreased and the damping force at the side of the poppet valve 215 is increased. Further, a spring 220 acting as a biasing means for biasing the popper 217 toward the valve closing direction is arranged in the drain chamber 218 of the popper valve 215. A biasing force of the spring 220 is so selected to act on the popper 213 of the popper valve 211 via the connecting rod 210 to shift the popper toward the valve opening direction. On the other hand, the pressure in the pressure chamber 214 shifting the popper 214 of the popper valve 211 toward the valve closing direction serves to act on the popper 217 of the popper valve 215 to shift the popper toward the valve opening direction. That is to say, the pressure in the pressure chamber 214 acting on the extension side popper 213 and the contraction side popper 217 is opposed to the biasing force of the spring 220. Further, the pressure chamber 214 is communicated with an upstream side (side of the upper cylinder chamber 202a) of the popper valve 211 in the communication passage 208 through an extension side pilot pressure passage 221, and is also communicated with an upstream side (side of the lower cylinder chamber 202b) of the poppet valve 217 in the communication passage 205 through a contraction side pilot pressure passage 222. The extension side pilot pressure passage 221 includes a check valve 223 for permitting the oil flow from the upper cylinder chamber 202a to the pressure chamber 214, and the contraction side pilot pressure passage 222 includes a check valve 224 for permitting the oil flow from the lower cylinder chamber 202b to the pressure chamber 214. The extension side pilot pressure passage 221 and the contraction side pilot pressure passage 222 are communicated with the pressure chamber 214 through an orifice 225 and a relief valve 226.

The relief valve 226 is an electromagnetic proportion control valve designed so that, when the pressure of oil in the extension side pilot pressure passage 221 or the pressure of oil in the contraction side pilot pressure passage 222 exceeds a set relief pressure, the oil is relieved toward the reservoir 210 through a relief passage 227, and the valve opening pressure of a needle valve 229 is adjusted in accordance with current applied to a solenoid 228 to continuously set the relief pressure. Further, the pressure of oil flowing into the relief valve 226 is reduced by the orifice 225, thereby reducing loads to the solenoid 228 and the needle valve 229.

Next, the operation of the shock absorber according to the fifth embodiment having the above construction will be explained.

During the extension of the piston rod 204, the sliding movement of the piston 203 causes the oil in the upper cylinder chamber 202a to flow toward the lower cylinder chamber 202b through the communication passage 205. In this case, since the check valve 206 is closed and the check valve 207 is opened, the oil flows into the extension side communication passage 208 and bypasses the contraction side passage 209, so that the damping force is generated by the popper valve 211.

In the popper valve 211, the popper 213 subjected to the pressure of the upper cylinder chamber 202a tends to shift in the valve opening direction. On the other hand, the pressure chamber 214 is subjected to the pressure of the upper cylinder chamber 202a through the opened check valve 223 and the extension side pilot pressure passage 221, thereby tending to shift the poppet 213 in the valve closing direction. In this case, when the pressure in the pressure chamber 214 exceeds a predetermined value set by the relief valve 226, the needle valve 229 is opened. As a result, since the oil in the extension side pilot pressure passage 221 flows toward the reservoir 210 through the relief passage 227, the pressure in the pressure chamber 214 can be set by the relief valve 226. Further, the biasing force of the spring 220 acts toward the valve opening direction. Thus, the popper 213 is shifted until it reaches a position where the pressure in the upper cylinder chamber 202a acting toward the valve opening direction and the biasing force of the spring 220 are balanced with the pressure in the pressure chamber 214 (set pressure of the relief valve 226). Accordingly, the poppet valve 211 is opened with the opening value corresponding to the pressure in the upper cylinder chamber 202a to determine the damping force at the extension side. In this way, by adjusting the set pressure of the relief valve 226 by using the current applied to the solenoid 228, the damping force can be directly controlled substantially without being influenced upon the piston speed. Incidentally, in this expansion process, an amount of oil varied with the extension of the piston rod 204 from the cylinder 202 is compensated by the reservoir 210.

During the contraction of the piston rod 204, the sliding movement of the piston 203 causes the oil in the lower cylinder chamber 202b to flow toward the upper chamber 202a through the communication passage 205. In this case, since the check valve 205 is opened and the check valve 206 is closed, the oil flows into the contraction side communication passage 209 and bypasses the extension side communication passage 208, so that the damping force is generated by the popper valve 215.

In the popper valve 215, the popper 217 subjected to the pressure in the lower cylinder chamber 202b tends to shift in the valve opening direction. On the other hand, the pressure in the pressure chamber 214 subjected to the pressure in the lower cylinder chamber 202b through the opened check valve 224 and the contraction side pilot pressure passage 222 tends to shift the popper 213 in the valve closing direction. In this case, the pressure in the pressure chamber 214 can be freely set by the relief valve 226, as mentioned above. Further, the biasing force of the spring 220 acts toward the valve closing direction. Thus, the popper 217 is shifted until it reaches a position where the pressure in the pressure chamber 214 (set pressure of the relief valve 226) and the pressure in the lower cylinder chamber 202b which act in the valve opening direction are balanced with the biasing force of the spring 220 acting in the valve closing direction. Accordingly, the popper valve 215 is opened with the opening value corresponding to the pressure in the lower cylinder chamber 202b to determine the damping force at the contraction side. And, by adjusting the set value of the relief valve 226 by using the current applied to the solenoid 228, the damping force can be directly controlled substantially without being influenced upon the piston speed. Incidentally, an amount of oil emitted from the cylinder 202 due the contraction of the piston rod 204 into the cylinder 202 flows into the reservoir 210.

In this way, by adjusting the relief pressure of the single relief valve 226, the damping forces at the extension side and the contraction side can be directly controlled substantially without being influenced upon the piston speed.

Further, in the above-mentioned embodiment, when the set pressure of the relief valve 226 is increased, since the pressure in the pressure chamber 214 is also increased, in the popper valve 211 in which the pressure in the pressure chamber 214 acts in the valve closing direction, it is difficult for the popper 213 to be shifted in the valve opening direction, thereby increasing the damping force at the extension side. On the other hand, in the popper valve 215 in which the pressure in the pressure chamber 214 acts in the valve opening direction, since the popper 217 can easily be shifted in the valve opening direction, the damping force at the contraction side is decreased. To the contrary, when the set pressure of the relief valve 226 is decreased, since the pressure in the pressure chamber 214 is also decreased, in the popper valve 211 in which the pressure in the pressure chamber 214 acts in the valve closing direction, the popper 213 can easily be shifted in the valve opening direction, thereby decreasing the damping force at the extension side. On the other hand, in the popper valve 215 in which the pressure in the pressure chamber 214 acts in the valve opening direction, since it is difficult for the popper 217 to be shifted in the valve opening direction, thereby increasing the damping force at the contraction side. In this way, it is possible to generate the different (great and small) damping forces at the extension side and the contraction side, thereby obtaining the damping force properties suitable for the suspension control.

Next, a sixth embodiment of the present invention will be explained with reference to FIG. 11.

Figure 11:
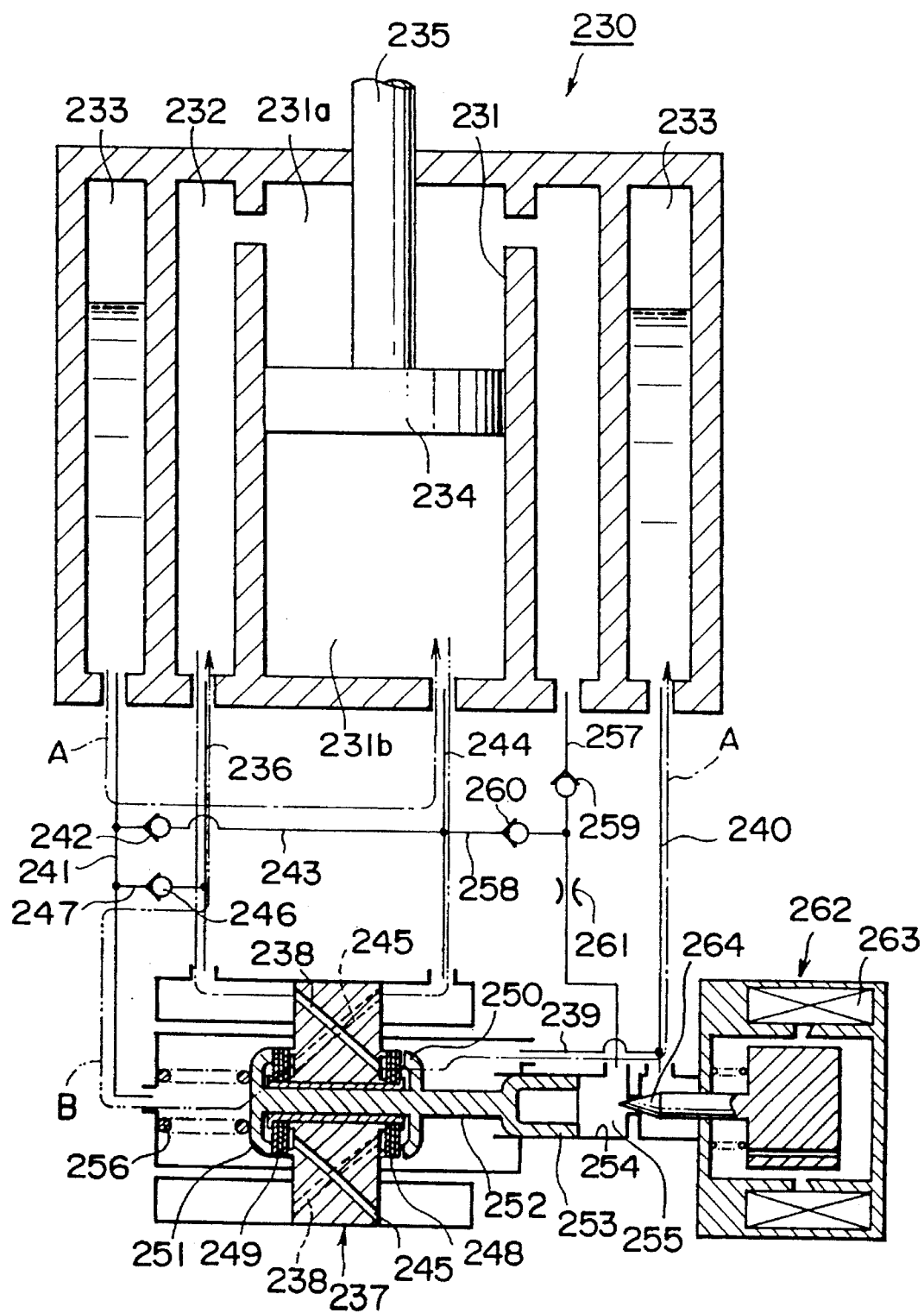
FIG. 11 is a circuit diagram of a damping force adjustable hydraulic shock absorber according to a sixth embodiment of the present invention.

As shown in FIG. 11, a damping force adjusting valve 230 has a triplicate cylinder structure in which an annular passage 232 is formed to surround a cylinder 231 and an annular reservoir 233 is formed to surround the annular passage 232. A piston 234 is slidably mounted within the cylinder 231 filled with oil, which piston divides the interior of the cylinder 231 into an upper cylinder chamber 231a and a lower cylinder chamber 231b. A piston rod 235 has one end connected to the piston 234, and the other end extending to the exterior of the cylinder 231 through a rod guide and a seal member (not shown) which are provided on an upper end of the cylinder 231. The reservoir 233 is filled with oil and gas so that the change in volume of the cylinder 231 due to extension and contraction of the piston rod 235 can be compensated by compression and expansion of the gas in the reservoir 233.

The upper cylinder chamber 231a is communicated with the reservoir 233 through the annular passage 232 and a passage 236 and through an extension side passage 238, passage 239 and a passage 240 of a damping force generating mechanism 237. Further, the reservoir 233 is communicated with the lower cylinder chamber 231b through a passage 241, a passage including a check valve 242 and a passage 244. These passages constitute an extension side communication passage A. The check valve 242 permits the oil to flow in the passage 243 from the passage 241 (associated with the reservoir 233) to the passage 244 (associated with the lower cylinder chamber 231b), so that the extension side communication passage A permits only the oil flow from the upper cylinder chamber 231a to the lower cylinder chamber 231b by means of the check valve 242.

The lower cylinder chamber 231b is communicated with the upper cylinder chamber 231a through the passage 244, a contraction side passage 245 of the damping force generating mechanism 237, the passage 241, a passage 247 including a check valve 246, the passage 236 and the annular passage 232. These passages constitute a contraction side communication passage B. The check valve 246 permits the oil to flow in the passage 247 from the passage 241 (associated with the lower cylinder chamber 231b) to the passage 236 (associated with the upper cylinder chamber 231a), so that the contraction side communication passage B permits only the oil flow from the lower cylinder chamber 231b to the upper cylinder chamber 231a by means of the check valve 246.

The damping force generating mechanism 237 includes a disc valve 248 as an extension side damping force adjusting valve. The disc valve is clamped at its inner periphery and is so designed that, when an outer periphery of the disc valve is flexed by the pressure of oil in the extension side passage 238, the disc valve is opened to adjust the flow area of the passage. Further, the damping force generating mechanism also includes a disc valve 249 as a contraction side damping force adjusting valve. The disc valve 249 is clamped at its inner periphery and is so designed that, when an outer periphery of the disc valve is flexed by the pressure of oil in the contraction side passage 245, the disc valve is opened to adjust the flow area of the passage. Urging members 250, 251 are arranged adjacent to back surfaces of the disc valves 248, 249. The urging members 250, 251 are interconnected via a connecting rod 252 slidably inserted into the damping force generating mechanism 237. The connecting rod 252 further extends from the urging member 250, and the extended connecting rod is provided at its free end with a piston portion 253 which constitutes a damping force inversion means. The piston portion 253 is slidably mounted within a cylinder member 254, and a pressure chamber 255 is formed in the cylinder member 254. Further, the damping force generating mechanism 237 includes a spring 256 acting as a biasing means for biasing the urging member 251 to urge it against the back surface of the disc valve 249.

The urging member 250 is urged against the back surface of the disc valve 248 by the pressure in the pressure chamber 255 via the connecting rod 252 to close the disc valve 248. At the same time, the urging member 251 is shifted away from the disc valve 249. On the other hand, the urging member 251 is urged against the back surface of the disc valve 249 by a biasing force of the spring 256 to close the disc valve 249. At the same time, the urging member 250 is shifted away from the disc valve 248 via the connecting rod 252. That is to say, the pressure in the pressure chamber 255 acting on the extension side disc valve 248 is opposed to the biasing force of the spring 256 acting on the contraction side disc valve 249.

The pressure chamber 255 is communicated with the annular passage 232 (at an upstream side of the disc valve 248 acting as the damping force adjusting valve of the extension side communication passage A), i.e., with the upper cylinder chamber 231a through an extension side pilot pressure passage 257, and is also communicated with the passage 244 (at an upstream side of the disc valve 249 acting as the damping force adjusting valve of the contraction side communication passage B), i.e., with the lower cylinder chamber 231b through a contraction side pilot pressure passage 258. The extension side pilot pressure passage 257 includes a check valve 259 for permitting the oil flow from the upper cylinder chamber 231a to the lower cylinder chamber 231b, and the contraction side pilot pressure passage 258 includes a check valve 260 for permitting the oil flow from the lower cylinder chamber 231b to the upper cylinder chamber 231a. The extension side pilot pressure passage 257 and the contraction side pilot pressure passage 258 are communicated with the pressure chamber 255 through an orifice 261.

The cylinder member 254 is provided with a relief valve 262 for relieving the pressure in the pressure chamber 255. The relief valve 262 is an electromagnetic proportion control valve wherein, when the pressure of oil in the extension side pilot pressure passage 257 or the pressure of oil in the contraction side pilot pressure passage 258 exceeds the set relief pressure, the oil is relieved to the reservoir 233 through the passage 240, and a valve opening pressure of a needle valve 264 is adjusted by using current applied to a solenoid 263 to continuously and freely set the relief pressure. Further, the pressure of oil flowing into the pressure chamber 255 is reduced by the orifice 261, thereby reducing loads to the solenoid 263 and the needle valve 264.

Next, the operation of the sixth embodiment having the above construction will be explained.

During the extension of the piston rod 235, the sliding movement of the piston 234 causes the oil in the upper cylinder chamber 231a to flow toward the lower cylinder chamber 231b through the extension side communication passage A. In this case, the damping force is generated by controlling the oil flow in the extension side passage 238 of the damping force generating mechanism 237 by means of the disc valve 248.

In the damping force generating mechanism 237, the disc valve 248 tends to be deformed in the valve opening direction by the pressure in the extension side passage 238. On the other hand, the pressure chamber 255 receives the pressure from the upper cylinder chamber 231a through the opened check valve 259 and the extension side pilot pressure passage 257, and the pressure in the pressure chamber urges the urging member 250 against the back surface of the disc valve 248 via the connecting rod 252, thereby urging the disc valve toward the valve closing direction. In this case, when the pressure in the pressure chamber 255 exceeds the set pressure of the relief valve 262, since the needle valve 264 is opened and the oil in the pressure chamber 255 flows into the reservoir 233 through the passage 240, the pressure in the pressure chamber 255 can be freely set by the relief valve 262. Further, the biasing force of the spring 256 tends to shift the disc valve 248 in the valve opening direction via the connecting rod 252. Thus, the disc valve 248 is deformed until it reaches a position where the pressure in the upper cylinder chamber 231a and the biasing force of the spring 256 which act in the valve opening direction are balanced with the pressure in the pressure chamber 255 (set pressure of the relief valve 262) acting in the valve closing direction, thereby opening the disc valve. Accordingly, the disc valve 248 is opened with the opening value corresponding to the pressure in the upper cylinder chamber 231a to determine the damping force at the extension side, and the damping force can be directly controlled substantially without being influenced upon the piston speed, by adjusting the set pressure of the relief valve 262 by using the current applied to the solenoid 263.

During the contraction of the piston rod 235, the sliding movement of the piston 234 causes the oil in the lower cylinder chamber 231b to flow into the upper cylinder chamber 231a through the contraction side communication passage B. In this case, the damping force is generated by controlling movement of oil in the contraction side passage 245 of the damping force generating mechanism 237.

In the damping force generating mechanism 237, the pressure of oil in the contraction side passage 245 tends to deform the disc valve 249 in the valve opening direction to open the valve. On the other hand, the pressure chamber 255 receives the pressure from the lower cylinder chamber 231b through the opened check valve 260 and the contraction side pilot pressure passage 258. The pressure in the pressure chamber urges the urging member 250 against the back surface of the disc valve 248 via the connecting rod 252 and shifts the urging member 251 away from the disc valve 249. In this case, when the pressure in the pressure chamber 255 exceeds the set pressure of the relief valve 262, the needle valve 264 is opened so that the oil in the pressure chamber 255 flows into the reservoir 233 through the passage 240. Accordingly, the pressure in the pressure chamber 255 can be freely set by the relief valve 262. Further, the biasing force of the spring 256 acts on the urging member 251 to urge it against the back surface of the disc valve 249 thereby to close this disc valve. Thus, the disc valve 249 is deformed to open until it reaches a position where the pressure in the flower cylinder chamber 231b and the pressure in the pressure chamber 255 (set pressure of the relief valve 262) which act in the valve opening direction are balanced with the biasing force of the spring 256. Accordingly, the disc valve 249 is opened with the opening value corresponding to the pressure in the lower cylinder chamber 231b to determine the damping force at the contraction side, and the damping force can be directly controlled substantially without being influenced upon the piston speed by adjusting the set pressure of the relief valve 262 by using the current applied to the solenoid 263.

As mentioned above, similar to the fifth embodiment, the damping force at the extension side and the damping force at the contraction side can be directly controlled, respectively, substantially without being influenced upon the piston speed by adjusting the set pressure of the single relief valve 262. Further, in this embodiment, when the set pressure of the relief valve 262 is increased, since the pressure in the pressure chamber 255 is also increased, it is difficult to open the disc valve 248 on which the pressure in the pressure chamber acts in the valve closing direction, thereby increasing the damping force at the extension side. On the other hand, the disc valve 249 on which the pressure in the pressure chamber 255 acts in the valve opening direction can easily be opened to increase the damping force at the contraction side. To the contrary, when the set pressure of the relief valve 262 is decreased, since the pressure in the pressure chamber 255 is also increased, the disc valve 248 on which the pressure in the pressure chamber 255 acts in the valve closing direction can easily be opened to decrease the damping force at the extension side. On the other hand, since it is difficult to open the disc valve 249 on which the pressure in the pressure chamber 255 acts in the valve opening direction, the damping force at the contraction side is increased. In this way, the different (great and small) damping forces can be generated at the extension side and the contraction side, thereby obtaining the damping force properties suitable for the suspension control.

Incidentally, in the above-mentioned fifth and sixth embodiments, while an example that the relief valve is set so that the damping force at the extension side becomes small and the damping force at the contraction side becomes great in the low set pressure of the relief valve when the solenoid is not energized was explained, it is possible to set so that the damping force at the extension side becomes great and the damping force at the contraction side becomes small, by reversing the acting directions of the pressure in the pressure chamber and the biasing force of the biasing means which act on the extension side damping force adjusting valve and the contraction side damping force adjusting valve.

Figure 12:
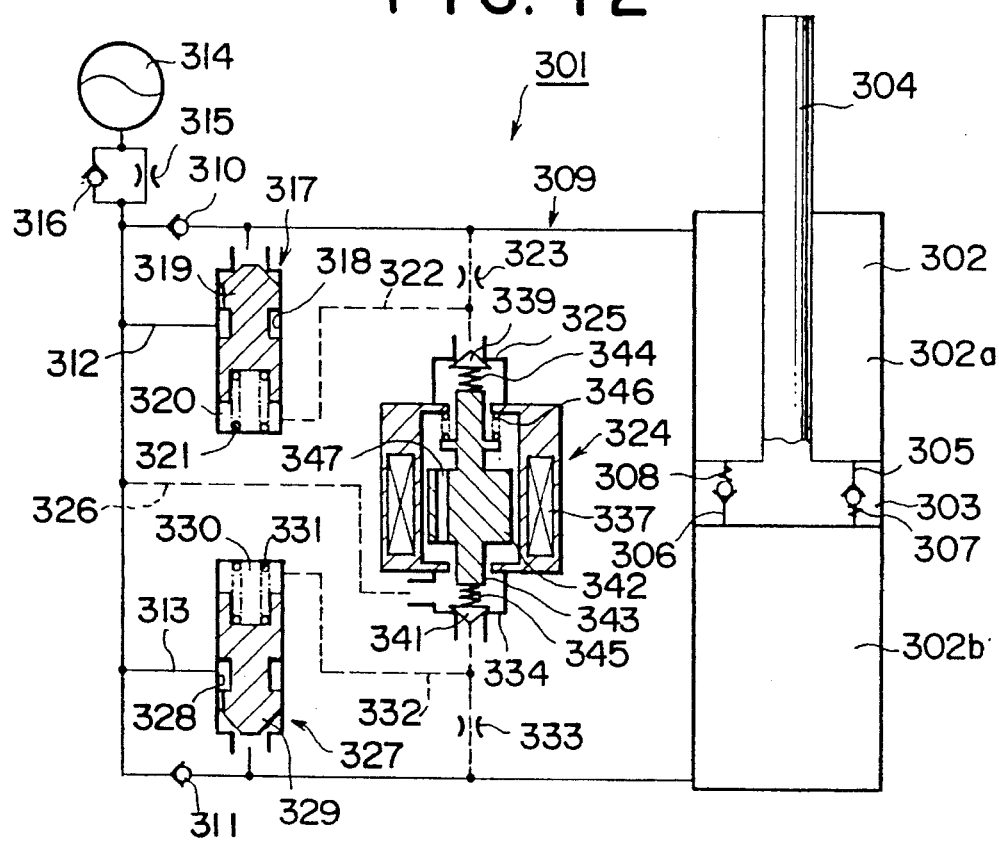
FIG. 12 is a circuit diagram of a damping force adjustable hydraulic shock absorber according to a seventh embodiment of the present invention.
Figure 13:
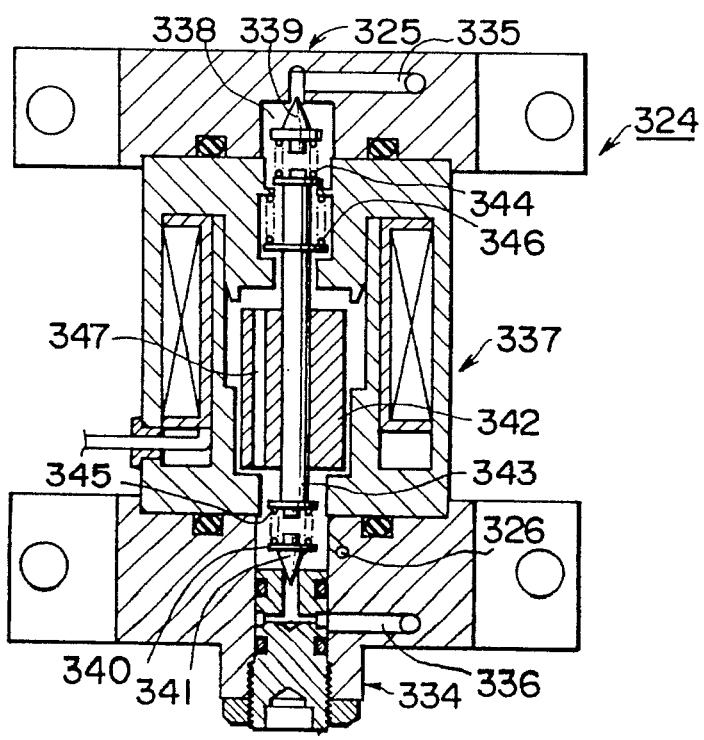
FIG. 13 is a side sectional view of an electromagnetic proportion control valve of the shock absorber of FIG. 12.

Next, a seventh embodiment of the present invention will be explained with reference to FIGS. 12 and 13. A hydraulic shock absorber 301 of damping force adjustable type has a piston 303 slidably mounted within a cylinder 302 filled with oil, which piston 303 divides the interior of the cylinder 302 into an upper cylinder chamber 302a and a lower cylinder chamber 302b. A piston rod 304 is connected to the piston 303, and the other end of the piston rod 304 extends to the exterior of the cylinder 302 through a rod guide formed in an end wall of the cylinder and a seal member (not shown).

An extension side passage 305 and a contraction side passage 306 are formed in the piston 303 to permit the communication between the upper cylinder chamber 302a and the lower cylinder chamber 302b. The extension side passage 305 includes a pressure regulating valve 307 such as a disc valve for permitting the oil flow from the upper cylinder chamber 302a to the lower cylinder chamber 302b to generate a clamping force when pressure in the upper cylinder chamber 302a exceeds a predetermined value, and the contraction side passage 306 includes a pressure regulating valve 308 such as a disc valve for permitting the oil flow from the lower cylinder chamber 302b to the upper cylinder chamber 302a to generate a damping force when pressure in the lower cylinder chamber 302b exceeds a predetermined value.

A communication passage 309 for communicating the upper cylinder chamber 302a with the lower cylinder chamber 302b is provided outside the cylinder 302. The communication passage 309 includes a check valve 310 for preventing the oil flow from the upper cylinder chamber 302a to the lower cylinder chamber 302b, and a check valve 311 for preventing the oil flow from the lower cylinder chamber 302b to the upper cylinder chamber 302a. Further, the communication passage 309 is connected to an extension side communication passage 312 for bypassing the check valve 310 and a contraction side communication passage 313 for bypassing the check valve 311. The communication passage 309 is also connected to a reservoir (accumulator) 314 for compensating (by compression and expansion of gas) the change in volume of the cylinder 302 due to the extension and contraction of the piston rod 304, via an orifice 315 and a check valve 316 which are arranged in parallel.

The extension side communication passage 312 is connected to a popper valve 317 acting as an extension side damping force adjusting valve. The poppet valve 317 has a popper (valve body) 319 slidably fitted into a guide 318 so that the flow area of the extension side communication passage 312 can be adjusted by shifting the popper 319. The popper 319 is subjected to pressure at an upstream side (side of the upper cylinder chamber 302a) of the extension side communication passage 312, thereby shifting in a valve opening direction. Further, a back pressure chamber 320 forming a part of a valve opening pressure adjusting mechanism is formed in the guide 318 adjacent to the back surface of the poppet 319. The pressure in the back pressure chamber 320 acts to shift the popper 319 in a valve closing direction. Further, a spring 321 for biasing the popper 319 toward the valve closing direction is disposed in the back pressure chamber 320.

The back pressure chamber 320 is communicated with the upstream side (side of the upper cylinder chamber 302a) of the extension side communication passage 312 regarding the poppet valve 317 through a back pressure passage 322. The back pressure passage 322 includes an orifice 323. A downstream side of the back pressure passage 322 regarding the orifice 323 is connected to an extension side relief valve 325 of an electromagnetic proportion control valve 324 (described later) and is also connected to a downstream side (side of the reservoir 14) of the extension side communication passage 312 regarding the popper valve 317 through a relief passage 326.

Similarly, the contraction side communication passage 313 includes a popper valve 327 acting as a contraction side damping force adjusting valve. The popper valve 327 has a popper (valve body) 329 slidably fitted into a guide 328 so that the flow area of the contraction side communication passage 313 can be adjusted by shifting the popper 329. The poppet 329 is subjected to pressure at an upstream side (side of the lower cylinder chamber 302b) of the contraction side communication passage 313, thereby shifting in a valve opening direction. Further, a back pressure chamber 330 forming a part of a valve opening pressure adjusting mechanism is formed in the guide 328 adjacent to the back surface of the popper 329. The pressure in the back pressure chamber 329 acts to shift the popper 329 in a valve closing direction. Further, a spring 331 for biasing the popper 329 toward the valve closing direction is disposed in the back pressure chamber 330.

The back pressure chamber 330 is communicated with the upstream side (side of the lower cylinder chamber 302b) of the contraction side communication passage 313 regarding the popper valve 327 through a back pressure passage 332. The back pressure passage 332 includes an orifice 333. A downstream side of the back pressure passage 332 regarding the orifice 333 is connected to a contraction side relief valve 334 of the electromagnetic proportion control valve 324 and is also connected to a downstream side (side of the reservoir 314) of the contraction side communication passage 313 regarding the popper valve 327 through a relief passage 326.

Next, the electromagnetic proportion control valve 324 will be explained with reference to FIG. 13. As shown in FIG. 13, the electromagnetic proportion control valve 324 comprises the extension side relief valve 325 for relieving the pressure in a passage 335 connected to the back pressure passage 322, the contraction side relief valve 334 for relieving the pressure in a passage 336 connected to the back pressure passage 322, and a proportion solenoid 337 for adjusting relief pressures of the extension side relief valve 325 and the contraction side relief valve 334.

The extension side relief valve 325 is a needle valve in which a communication passage between the passage 335 and a relief chamber 338 can be opened or closed by a needle (valve body) 339. Similarly, the contraction side relief valve 334 is a needle valve in which a communication passage between the passage 336 and a relief chamber 340 can be opened or closed by a needle (valve body) 341. The needles 339, 341 are connected to both ends of an operation rod 343 connected to a plunger 342 of the proportion solenoid 337, via spring members (spring means) 344, 345, respectively. When the relief pressure of the extension side relief valve 325 or the contraction side relief valve 334 is increased by shifting the operation rod 343 to compress the spring member 344 or the spring member 345, the relief pressure of the other relief valve is decreased. Now, the needles 339, 341 each has small mass (smaller than about 1 gram) so that a vibration system obtained by the combination of the needles and the spring members 344, 345 has adequately high natural frequency (order of kHz).

A spring 346 for biasing the operation rod 343 toward the contraction side relief valve 334 is associated with the proportion solenoid 337. The proportion solenoid 337 is so designed as to generate a force for shifting the operation rod 343 toward the relief valve 325 in opposition to a biasing force of a spring 346 In accordance with current applied to the solenoid. Further, with this arrangement, the relief pressure of the contraction side relief valve 334 can be adjusted by changing the degree of compression of the spring member 345 in accordance with the current applied to the solenoid, and the relief pressure of the extension side relief valve 325 can be adjusted by compressing the spring member 344 by increasing the current applied to the solenoid to shift the operation rod 343 toward the extension side relief valve 325.

The relief chambers 338, 340 are communicated with each other through a passage 347 formed in the proportion solenoid 337 and are connected to the reservoir 314 through the relief passage 326.

Next, the operation of the shock absorber according to the seventh embodiment having the above construction will be explained.

During the extension of the piston rod 304, the sliding movement of the piston 303 causes the oil in the upper cylinder chamber 302a to flow toward the lower cylinder chamber 302b through the communication passage 309. In this case, since the check valve 310 is closed and the check valve 311 is opened, the oil flows into the extension side communication passage 312, so that the damping force is generated by the popper valve 317. In this case, since an amount of oil emitted from the upper cylinder chamber 302a due to the extension of the piston rod 304 is smoothly replenished from the reservoir 314 into the lower cylinder chamber 302b through the opened check valves, excessive negative pressure is not generated in the lower cylinder chamber 302b, thereby preventing any bubbles from entering into the lower cylinder chamber.

In the popper valve 317, the popper 319 subjected to the pressure in the upper cylinder chamber 302a tends to shift in the valve opening direction. On the other hand, the back pressure chamber 320 is subjected to the pressure from the upper cylinder chamber 302a through the back pressure passage 322, thereby tending to shift the popper 319 in the valve closing direction. When the pressure in the back pressure chamber 320 exceeds a predetermined value set by the extension side relief valve 325 of the electromagnetic proportion control valve 324, the needle 339 is shifted in opposition to the biasing force of the spring member 344 and the oil in the back pressure passage 322 is relieved into the relief passage 326. Accordingly, the pressure in the back pressure chamber 320 can be set by the set pressure of the extension side relief valve 325 of the electromagnetic proportion control valve 324. The popper 319 is shifted until it reaches a position where the pressure in the upper cylinder chamber 302a and the set pressure of the extension side relief valve 325 are balanced with the biasing force of the spring 321. Accordingly, the popper valve 317 is opened with the opening value corresponding to the pressure in the upper cylinder chamber 302a, thereby determining the damping force. In this way, the flow area of the popper valve 317 is varied with the pressure in the upper cylinder chamber 302a, with the result that a desired damping force can be obtained substantially without being influenced upon the piston speed.

During the contraction of the piston rod 304, the sliding movement of the piston 303 causes the oil in the lower cylinder chamber 302b to flow toward the upper cylinder chamber 302a through the communication passage 309. In this case, since the check valve 310 is opened and the check valve 311 is closed, the oil flows into the contraction side communication passage 313, so that the damping force is generated by the popper valve 327. In this case, an amount of oil emitted from the cylinder due to the contraction of the piston rod 304 flows into the reservoir 314. Since the oil flowing into the reservoir 314 is subjected to the moderate resistance generated by the orifice 315, excessive negative pressure is not generated in the upper cylinder chamber 302a, thereby preventing any bubbles from entering into the upper cylinder chamber.

In the popper valve 327, similar to the popper valve 317 associated with the extension side, the popper 329 is shifted until it reaches a position where the pressure in the lower cylinder chamber 302b is balanced with the sum of the set pressure of the contraction side relief valve 334 of the electromagnetic proportion control valve 324 and a biasing force of the spring 331. Accordingly, the popper valve 327 is opened with the opening value corresponding to the pressure in the lower cylinder chamber 302b, thereby determining the damping force. In this way, the flow area of the popper valve 327 is varied with the pressure in the lower cylinder chamber 302b. with the result that a desired damping force can be obtained substantially without being influenced upon the piston speed.

By adjusting the relief pressure of the contraction side relief valve 334 by shifting the operation rod 343 toward the contraction side relief valve 334 by energizing the proportion solenoid 337 of the electromagnetic proportion control valve 324, the opening value of the popper valve 327 can be adjusted to control the damping force at the contraction side. In this case, since the relief pressure of the extension side relief valve 325 is decreased, the opening value of the popper valve 317 is increased, thereby decreasing the damping force at the extension side. Accordingly, the damping force property at the contraction side becomes the hard property, and the damping force property at the extension side becomes the soft property.

Further, by adjusting the relief pressure of the extension side relief valve 325 by shifting the operation rod 343 toward the extension side relief valve 325 to compress the spring member 344 by increasing the current applied to the proportion solenoid 337, the opening value of the poppet valve 317 can be adjusted to control the damping force at the extension side. In this case, since the relief pressure of the contraction side relief valve 324 is decreased, the opening value of the popper valve 327 is increased, thereby decreasing the damping force at the contraction side. Accordingly, the damping force property at the extension side becomes the hard property, and the damping force property at the contraction side becomes the soft property.

By adjusting the current applied to the proportion solenoid 337 in this way, the damping force at the contraction side can be continuously changed from the hard property toward the soft property and the damping force at the extension side can be continuously changed from the soft property toward the hard property. In this case, the different (great and small) damping forces are generated at the extension side and the contraction side, thereby obtaining the damping force properties suitable for the suspension control.

Incidentally, during the extension of the piston rod, if the pressure in the upper cylinder chamber 302a exceeds a predetermined value, the pressure adjusting valve 307 in the piston 303 is opened to flow the oil in the upper cylinder chamber 302a directly into the lower cylinder chamber 302b through the extension side passage 305, thereby generating the damping force. Similarly, during the contraction of the piston rod, if the pressure in the lower cylinder chamber 302b exceeds a predetermined value, the pressure adjusting valve 308 in the piston 303 is opened to flow the oil in the lower cylinder chamber 302b directly into the upper cylinder chamber 302a through the contraction side passage 306, thereby generating the damping force.

Further, since each of the needles 339, 341 of the electromagnetic proportion control valve 324 has sufficiently small mass so that natural frequency of a vibration system obtained by the combination of the needles and the spring members 344, 345 becomes sufficiently great, upon abrupt increase in the pressure in the back pressure passage 322 or 332, the spring member 344 or 345 is deformed, with the result that the needle valve Is quickly opened without any time delay, thereby suppressing the increase in the back pressure due to pulsation of oil in the back pressure passage 322 or 332. In this way, it is possible to suppress the increase in the back pressure due to the pulsation within 1 msec. Further, when the needle 339 or 341 is opened in this way, since the operation rod 343 and the plunger 342 are not moved, it is possible to prevent any delay in response due to inertia of the mass and solid friction. Thus, for the change in high frequency piston speed (input speed to the piston rod), the increase in the back pressure due to the pulsation can be suppressed to generate the optimum damping force, thereby preventing the comfort of the vehicle from worsening.

Incidentally, since the control of the relief pressures of the extension side relief valve 325 and the contraction side relief valve 334 using the current applied to the proportion solenoid 337 is effected by deforming the spring members 344, 345 via the operation rod 343, delay in response of the order of several tens of msec (microseconds) would occur due to the use of these springs. However, since the damping force adjustment regarding the sprung mass vibration and the unsprung mass vibration in the general suspension control is effected with respect to the frequency of the order of 1–10 Hz, there is no problem regarding the delay in response due to the spring element.

Next, an eighth embodiment of the present invention will be explained with reference to FIG. 14.

Figure 14:
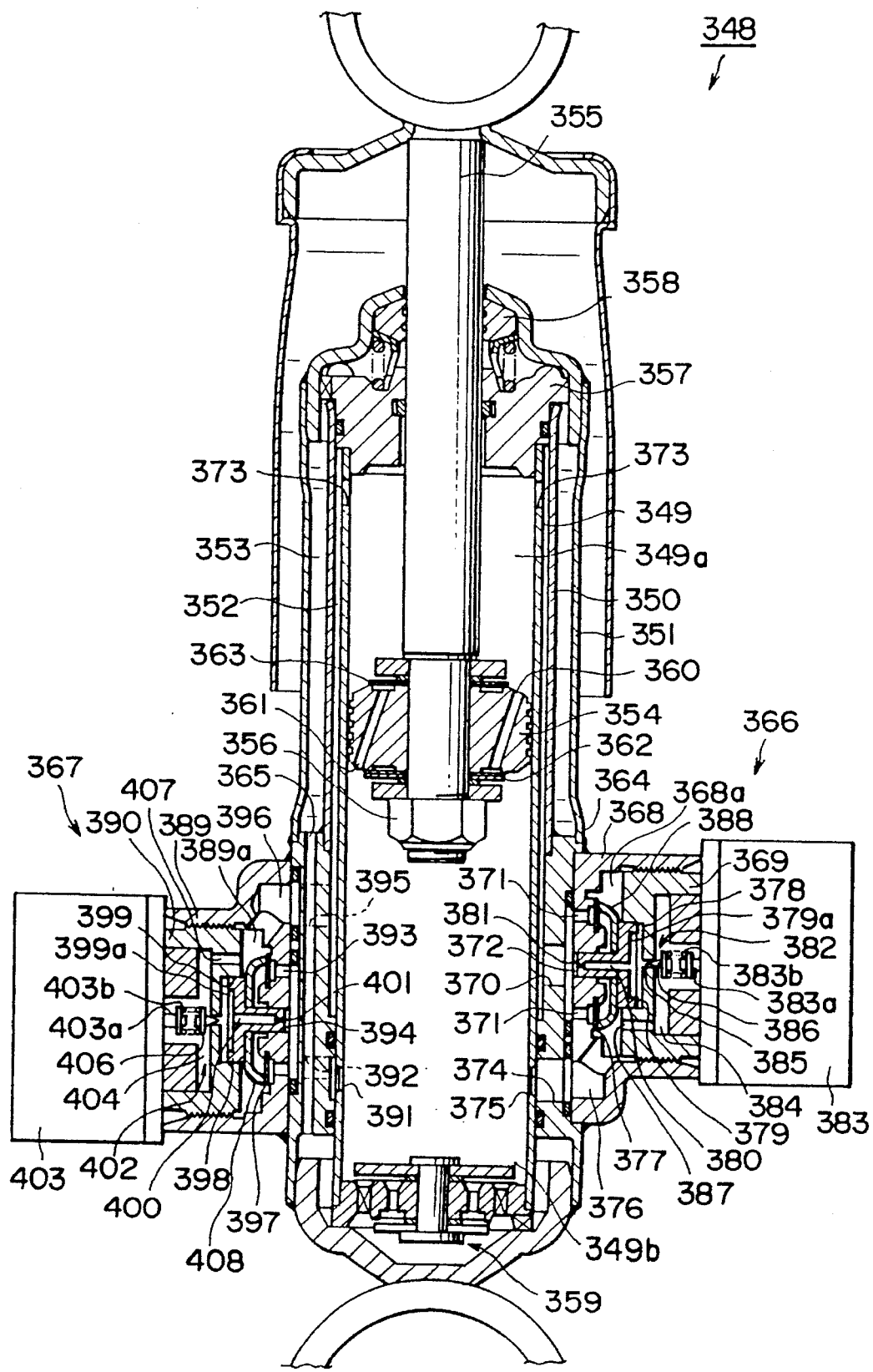
FIG. 14 is a side sectional view of a damping force adjustable hydraulic shock absorber according to an eighth embodiment of the present invention.

As shown in FIG. 14, a hydraulic shock absorber 348 of damping force adjustable type comprises an inner cylindrical member 350 surrounding a cylinder 349, and an outer cylindrical member 351 surrounding the inner cylindrical member 350, so that a triplicate cylinder structure is provided. With this arrangement, an annular passage 352 is defined between the cylinder 349 and the inner cylindrical member 350, and a reservoir chamber 353 is defined between the inner cylindrical member 350 and the outer cylindrical member 351.

A piston 354 is slidably mounted within the cylinder 349 to divide the interior of the cylinder 349 into an upper cylinder chamber 349a and a lower cylinder chamber 349b. A piston rod 355 has one end connected to the piston 354 by a nut 356, and the other end extending to the exterior of the cylinder 349 through a rod guide 357 and a seal member 358 which are attached to an upper end of the cylinder 349. A base valve 359 is mounted on a lower end of the cylinder 349. The lower cylinder chamber 349b is communicated with the reservoir chamber 353 through the base valve 359 with moderate flow resistance. The cylinder 349 is filled with oil and the reservoir chamber 353 is filled with oil and gas, so that the change in volume of the cylinder 349 due to extension and contraction of the piston rod 355 can be compensated by compression and expansion of the gas in the reservoir chamber 353.

An extension side passage 360 and a contraction side passage 361 for permitting the communication between the upper cylinder chamber 349a and the lower cylinder chamber 349b are formed in the piston 354. The extension side passage 360 includes a disc valve 362 for permitting the oil flow from the upper cylinder chamber 349a to the lower cylinder chamber 349b to generate a damping force when pressure in the upper cylinder chamber 349a exceeds a predetermined value, and the contraction side passage 361 includes a disc valve 363 for permitting the oil flow from the lower cylinder chamber 349b to the upper cylinder chamber 349a to generate a damping force when pressure in the lower cylinder chamber 349b exceeds a predetermined value.

A substantially cylindrical passage member 364 is arranged around the cylinder 349 near the lower end of the cylinder, and lower ends of the inner and outer cylindrical members 350, 351 are attached to an upper end of the passage member 364. An annular passage 352 is defined between the cylinder 349 and the passage member 364, and the reservoir chamber 353 is communicated with the lower cylinder chamber 349b through a reservoir passage 365 extending axially through the passage member 364 via the base valve 359.

Around the passage member 364, there are arranged an extension side damping force adjusting mechanism 366 including an extension side communication passage for communicating the upper cylinder chamber 349a with the lower cylinder chamber 349b through the annular passage 352, and a contraction side damping force adjusting mechanism 367 including a contraction side communication passage for communicating the upper cylinder chamber 349a with the lower cylinder chamber 349b through the annular passage 352. The extension side damping force adjusting mechanism 366 has a cylindrical valve case 368 having a bottom which is joined to the passage member 364, and a cylindrical plug 369 having a bottom is threaded into an opening portion of the valve case 368, thereby defining a valve chamber 368a in the valve case 368. A valve passage 371 for communicating the valve chamber 368a with the annular passage 352 through a passage 370 formed in the passage member 364, and a guide bore 372 are formed in the bottom of the valve case 368. The annular passage 352 is communicated with the upper cylinder chamber 349a through a passage 373 formed in the cylinder 349 near its upper end. Further, a communication passage 376 is formed in the bottom of the base valve 368 to communicate the lower cylinder chamber 349b with the valve chamber 368a through a passage 374 formed in the passage member 364 and a passage 375 formed in the cylinder 349 near its lower end.

A disc valve 377 acting as a damping force adjusting valve for permitting only the oil flow from the upper cylinder chamber 349a to the valve chamber 368a through the valve passage 371 thereby to generate a damping force is arranged within the valve case 368. A small diameter portion of a plunger 378 is slidably fitted into the guide bore 372, and a large diameter base of the plunger 372 is slidably fitted into a guide bore 379 formed in the plug 369. A back pressure chamber 379a forming a part of a valve opening pressure adjusting mechanism is formed in the guide bore 379. A back pressure passage 380 extends through axially a center of the plunger 378 and has an orifice 381. Pressure of oil flowing into the back pressure passage 380 is reduced by the orifice 381, thereby reducing load to a relief valve 382 which will be described later.

The relief valve 382 for relieving the pressure in the back pressure chamber 379a is formed in the plug 369. The relief valve 382 is a needle valve in which a communication passage 385 for communicating a relief chamber 384 defined by the plug 369 and a proportion solenoid 383 with the back pressure chamber 379a is opened and closed by a needle 386 connected to an operation rod 383a of the proportion solenoid 383 via a spring member (spring means) 383b. The proportion solenoid 383 serves to adjust relief pressure of the relief valve 382 by changing a valve opening pressure of the needle 386 by compressing the spring member 383b by biasing the operation rod 383a with a force corresponding to the current applied to the solenoid. The relief chamber 384 is communicated with the valve chamber 368a through a relief passage 387. Now, the needle 386 has small mass (smaller than 1 gram) so that a vibration system obtained by the combination of the needle and the spring member 383b has adequately high natural frequency (order of kHz).

The plunger 378 is connected to an urging member 388 which can abut against a back surface of the disc valve 377 so that the disc valve 377 is urged toward the valve closing direction by the pressure in the back pressure chamber 379a acting on the plunger 378. With this arrangement, a valve opening pressure for the disc valve 377 can be adjusted.

The contraction side damping force adjusting mechanism 367 has a cylindrical valve ease 389 having a bottom which is joined to the passage member 364, and a cylindrical plug 390 having a bottom is threaded into an opening portion of the valve ease 389, thereby defining a valve chamber 389a in the valve ease 389. A valve passage 393 for communicating the valve chamber 389a with the lower cylinder chamber 349b through a passage 391 formed in the cylinder 349 near its lower end and a passage 392 formed in the passage member 364, and a guide bore 394 are formed in the bottom of the valve case 389. Further, a communication passage 396 is formed in the bottom of the base valve 389 to communicate the valve chamber 389a with the annular passage 352 through a passage 395 formed in the passage member 364.

A disc valve 397 acting as a damping force adjusting valve for permitting only the oil flow from the lower cylinder chamber 349b to the valve chamber 389a through the valve passage 393 thereby to generate a damping force is arranged within the valve case 389 near the bottom of the valve case. A small diameter portion of a plunger 398 is slidably fitted into the guide bore 394, and a large diameter base of the plunger 398 is slidably fitted into a guide bore 399 formed in the plug 390. A back pressure chamber 399a forming a part of a valve opening pressure adjusting mechanism is formed in the guide bore 399. A back pressure passage 400 extends through axially a center of the plunger 398 and has an orifice 401. Pressure of oil flowing into the back pressure passage 400 is reduced by the orifice 401, thereby reducing load to a relief valve 402 which will be described later.

The relief valve 402 for relieving the pressure in the back pressure chamber 399a is formed in the plug 390. The relief valve 402 is a needle valve in which a communication passage 405 for communicating a relief chamber 404 defined by the plug 390 and a proportion solenoid 403 with the back pressure chamber 399a is opened and closed by a needle 406 connected to an operation rod 403a of the proportion solenoid 403 via a spring member (spring means) 403b. The proportion solenoid 403 serves to adjust relief pressure of the relief valve 402 by compressing the spring member 403b to change a valve opening pressure of the needle 406 by actuating the operation rod 403a with a force corresponding to the current applied to the solenoid. The relief chamber 404 is communicated with the valve chamber 389a through a relief passage 407. Now, the needle 406 has small mass (smaller than 1 gram) so that a vibration system obtained by the combination of the needle and the spring member 403b has adequately high natural frequency (order of kHz).

The plunger 398 is connected to an urging member 408 which can abut against a back surface of the disc valve 397 so that the disc valve 397 is urged toward the valve closing direction by the pressure in the back pressure chamber 399a acting on the plunger 98. With this arrangement, a valve opening pressure of the disc valve 397 can be adjusted.

Next, the operation of the shock absorber according to the eighth embodiment having the above construction will be explained.

During the extension of the piston rod 355, the sliding movement of the piston 354 causes the oil in the upper cylinder chamber 349a to flow into the lower cylinder chamber 349b through the passage 373 and the annular passage 352 and through the passage 370, valve passage 371, valve chamber 368a, communication passage 376, passage 374 and passage 375 of the extension side damping force adjusting mechanism 366. And, the disc valve 377 is opened by the pressure of oil in the upper cylinder chamber 349a to adjust the flow area of the valve passage 371, thereby generating a damping force. In this case, since the disc valve 377 is urged toward the valve closing direction by means of the urging member 388, the damping force proportional to the urging load is generated. On the other hand, in the contraction side damping force adjusting mechanism 367, since the disc valve 397 and the relief valve 402 are closed by the pressure in the upper cylinder chamber 349a, there is no oil flow.

The urging load of the urging member 388 is created by transferring the oil in the upper cylinder chamber 349a to the back pressure chamber 379a through the back pressure passage 380 and by acting the pressure of oil in the back pressure chamber 379a on a pressure receiving surface of the large diameter base of the plunger 378. In this case, when the pressure in the back pressure chamber 379a exceeds the pressure set by the relief valve 382, since the relief valve 382 is opened so that the oil in the back pressure chamber 379a escapes to the relief chamber 384 and flows into the valve chamber 368a associated with the lower cylinder chamber 349b through the relief passage 387, the pressure in the back pressure chamber 379a can be set by the relief valve 382. Accordingly, the damping force can be directly controlled when the relief pressure of the relief valve 382 is set by adjusting the valve opening pressure of the needle 386 by changing the degree of compression of the spring member 383b by using the current applied to the proportion solenoid 383 so that the opening value of the disc valve 377 is adjusted, with the result that the opening value of the disc valve 377 is varied with the pressure in the upper cylinder chamber 349a, thereby generating the damping force substantially without being influenced upon the piston speed.

Incidentally, if the pressure in the upper cylinder chamber 349a exceeds a predetermined value, the disc valve 362 of the piston 354 will be opened to directly flow the oil in the upper cylinder chamber 349a to the lower cylinder chamber 349b through the extension side passage 360, thereby generating the damping force.

During the contraction of the piston rod 355, the sliding movement of the piston 354 causes the oil in the lower cylinder chamber 349b to flow into the upper cylinder chamber 349a through the passage 391 and through the passage 392, valve passage 393, valve chamber 389a, communication passage 396, passage 395, annular passage 352 and passage 373 of the contraction side damping force adjusting mechanism 367. And, the disc valve 397 is opened by the pressure of oil in the lower cylinder chamber 349b to adjust the flow area of the valve passage 393, thereby generating the damping force. In this case, since the disc valve 397 is urged toward the valve closing direction by the urging member 408, the damping force proportional to the urging load of the urging member is generated. On the other hand, in the extension side damping force adjusting mechanism 366, since the disc valve 377 and the relief valve 382 are closed by the pressure in the lower cylinder chamber 349b, there is no oil flow.

The urging load of the urging member 408 is created by transferring the oil in the lower cylinder chamber 349b to the back pressure chamber 399a through the back pressure passage 400 of the plunger 398 and by acting the pressure of oil in the back pressure chamber 399a on a pressure receiving surface of the large diameter base of the plunger 398. In this case, when the pressure in the back pressure chamber 399a exceeds the pressure set by the relief valve 402, since the relief valve 402 is opened so that the oil in the back pressure chamber 399a escapes to the relief chamber 404 and flows into the valve chamber 389a associated with the upper cylinder chamber 349a through the relief passage 407, the pressure in the back pressure chamber 399a can be set by the relief valve 402. Accordingly, the damping force can be directly controlled when the relief pressure of the relief valve 402 is set by changing the degree of compression of the spring member 403b to adjust the valve opening pressure for the needle 406 by using the current applied to the proportion solenoid 103 so that the relief pressure of the relief valve 402 is set, with the result that the opening value of the disc valve 397 is varied with the pressure in the lower cylinder chamber 349b, thereby generating the predetermined damping force substantially without being influenced upon the piston speed.

Incidentally, if the pressure in the lower cylinder chamber 349b exceeds a predetermined value, the disc valve 363 of the piston 354 will be opened to directly flow the oil in the lower cylinder chamber 349b to the upper cylinder chamber 349a through the contraction side passage 361, thereby generating the damping force.

In this way, by adjusting the relief pressures of the relief valves 387, 402 by using the currents applied to the proportion solenoids 383, 403, the damping forces at the extension side and the contraction side can be directly controlled, respectively, substantially without being influenced upon the piston speed. Further, as is in the first embodiment, since natural frequencies of the needles 386, 406 and the spring members 383b, 403b are selected to become sufficiently great, it is possible to suppress the increase in the back pressure due to the delay in response of the relief valves, thereby preventing the comfort of the vehicle from worsening.

Incidentally, in the eighth embodiment, while an example that both the extension side damping force adjusting mechanism 366 and the contraction side damping force adjusting mechanism 367 are used was explained, the shock absorber according to the present invention may include only one of these damping force adjusting mechanisms to attain the light weight of the vehicle and/or to simplify the specification.

Next, a ninth embodiment of the present invention will be explained with reference to FIG. 15. Incidentally, since the ninth embodiment is substantially the same as the seventh embodiment shown in FIGS. 12 and 13 except for the poppet valves and the relief valves, the same elements as those of the seventh embodiment are designated by the same reference numerals, and only the differences will be fully explained.

Figure 15:
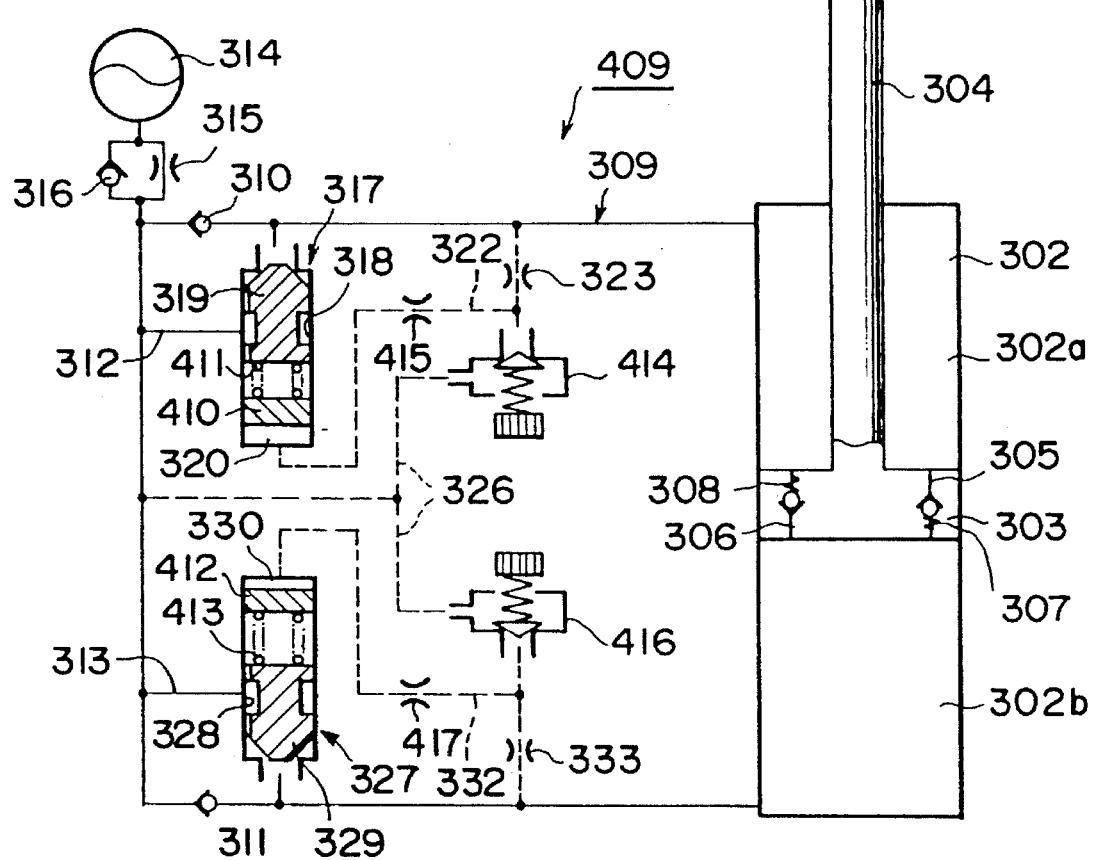
FIG. 15 is a circuit diagram of a damping force adjustable hydraulic shock absorber according to a ninth embodiment of the present invention.

As shown in FIG. 15, in a hydraulic shock absorber 409 of damping force adjustable type, the popper valve 317 provided in the extension side passage 312 has a piston 410 slidably mounted within the guide 318 adjacent to the back surface of the popper 319, and a spring member (spring means) 411 is arranged between the popper 319 and the piston 410. And, the back pressure chamber 320 forming a part of a valve opening pressure adjusting mechanism is provided adjacent to a back surface of the piston 410.

Similarly, the popper valve 327 provided in the contraction side passage 313 has a piston 412 slidably mounted within the guide 328 adjacent to the back surface of the popper 329, and a spring member (spring means) 413 is arranged between the popper 329 and the piston 412. And, the back pressure chamber 330 forming a part of a valve opening pressure adjusting mechanism is provided adjacent to a back surface of the piston 412.

The back pressure passage 322 includes an orifice 415 disposed at a downstream side of the orifice 323, and a relief valve 414 is connected to the back pressure passage 322 between the orifices 323, 415. The relief valve 414 can freely set its relief pressure, and relieved oil can flow into a downstream side (side of the reservoir 314) of the extension side passage 312 regarding the poppet valve 317 through the relief passage 326. Further, the pressure of oil flowing into the back pressure passage 322 is reduced by the orifice 323, thereby reducing load to the relief valve 414.

Similarly, the back pressure passage 332 includes an orifice 417 disposed at a downstream side of the orifice 333, and a relief valve 416 is connected to the back pressure passage 332 between the orifices 333, 417. The relief valve 416 can freely set its relief pressure, and relieved oil can flow into a downstream side (side of the reservoir 314) of the contraction side passage 313 regarding the popper valve 327 through the relief passage 326. Further, the pressure of oil flowing into the back pressure passage 332 is reduced by the orifice 333, thereby reducing load to the relief valve 416.

Next, the operation of the shock absorber according to the ninth embodiment having the above construction will be explained.

In the hydraulic shock absorber 409 of damping force adjustable type according to the ninth embodiment, at the extension side of the piston rod 304, the pressure in the back pressure chamber 320 of the popper valve 319 can be freely set by the relief pressure of the relief valve 414. The poppet 319 is shifted until it reaches a position where the pressure in the upper cylinder chamber 302a is balanced with the pressure in the back pressure chamber 320 (set pressure of the relief valve 414). Accordingly, the popper valve 317 is opened with the opening value corresponding to the pressure in the upper cylinder chamber 302a to determine the damping force. In this way, the flow area of the popper valve 317 is varied with the pressure in the upper cylinder chamber 302a, thereby generating the predetermined damping force substantially without being influenced upon the piston speed.

At the contraction side of the piston rod 304, the pressure in the back pressure chamber 330 of the popper valve 327 can be freely set by the relief pressure of the relief valve 416. The popper 329 is shifted until it reaches a position where the pressure in the lower cylinder chamber 302b is balanced with the pressure in the back pressure chamber 330 (set pressure of the relief valve 416). Accordingly, the poppet valve 327 is opened with the opening value corresponding to the pressure in the lower cylinder chamber 302b to determine the damping force. In this way, the flow area of the popper valve 327 is varied with the pressure in the lower cylinder chamber 302b, thereby generating the predetermined damping force substantially without being influenced upon the piston speed.

By adjusting the teller pressures of the relief valves 414, 416 in this way, the damping forces at the extension side and the contraction side can be directly controlled substantially without being influenced upon the piston speed.

Further, since the back pressure chambers 320, 330 have volume elasticity due to the presence of the pistons 410, 412 and the spring members 411, 413, a relation between an amount ΔV flowing from the back pressure passages 322, 332 into the back pressure chambers 320, 330 and increment ΔP of pressure in the back pressure chambers 320, 330 becomes as follows:

$$\Delta P / \Delta V = 1/(V_0/K_v + S^2/K_s) = K \tag{1}$$

Where, $V_0$ is a volume of the back pressure chamber, $K_v$ is bulk modulus of oil, S is a cross-area of the piston, $K_s$ is a spring constant of the spring, and K is coefficient of volume elasticity of the back pressure chamber. Now, when the spring members 411, 413 are formed from conventional metallic springs, since the second term ($S^2/K_s$) of denominator in the above equation becomes sufficiently greater than the first term ($V_0/K_v$) (for example, by 100 times or more), the volume elasticity K of the back pressure chamber can be made smaller sufficiently. Further, the influence of fluctuation of the bulk modulus $K_v$ of oil due to the mixing of bubbles with oil and the separation of bubbles from oil is minimized, thereby stabilizing the volume elasticity K.

Since the back pressure passages 322, 332 include the orifices 415, 417, a relation between the relief pressure $P_i$ of the relief valves 414, 416, oil amount q flowing into the back pressure chambers 320, 330 through the orifices 415, 417 and pressure $P_0$ in the back pressure chambers 320, 330 can be represented by the following equation by using linear approximation (resistance coefficient R) regarding the property of orifice (pressure loss/flow rate):

$$P_i(t)-P_0(t)=Rq(t) \quad (2)$$

$$P_0(t)=K\int q(t)dt \quad (3)$$

By using Laplace transform, transfer function $P_0(s)/P_i(s)$ becomes as follows $$G(s)=P_0(s)/P_i(s)=1/(1+s\cdot R/K) \quad (4)$$

As shown in the above equations, the pressure $P_0$ in the back pressure chamber regarding the relief pressure $P_i$ becomes "time-lag of first order" system so that a low pass filter in which time constant is determined by $\tau=R/K$ is established. Accordingly, even if pulsation is generated in the oil in the back pressure chambers 322, 332 by the surging and self-excited vibration of the relief valves 414, 416 due to high frequency input to the piston rod 304, since the increase in pressure in the back pressure chambers 320, 330 is gradually damped, it is possible to prevent excessive increase in the back pressure in the popper valves 317, 327, thereby generating the proper damping force.

Figure 17:
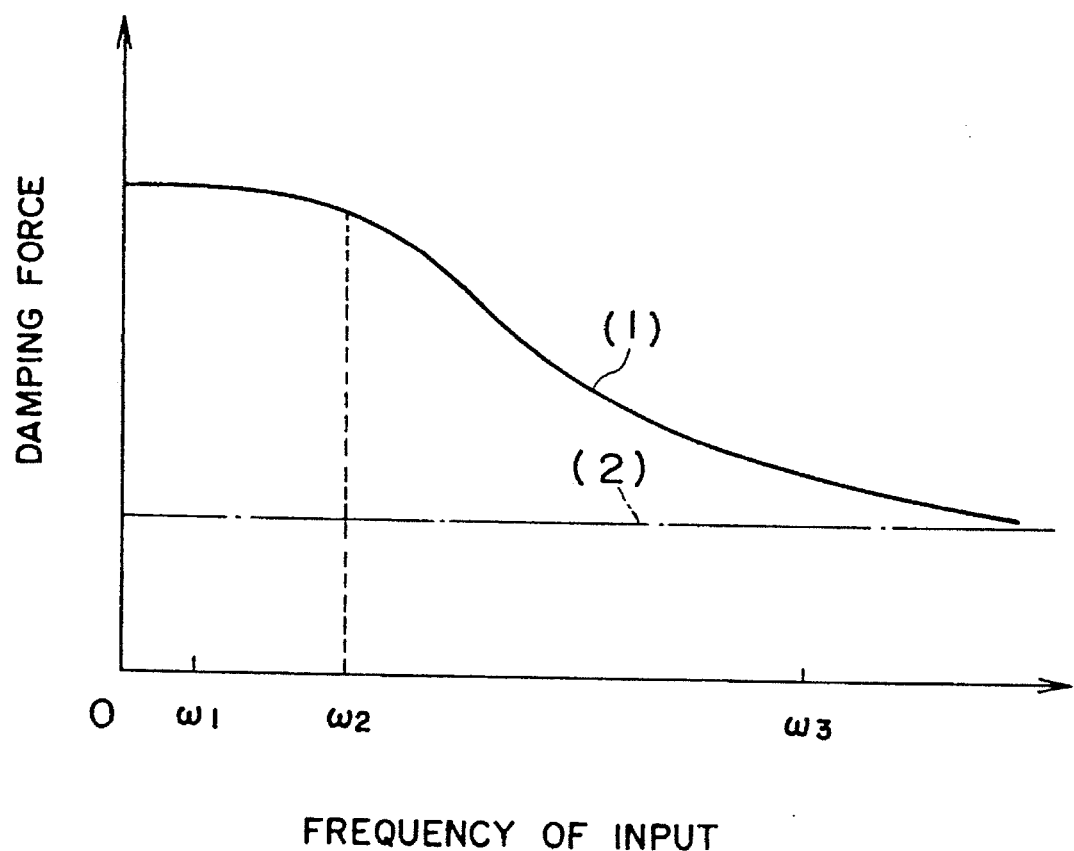
FIG. 17 is a graph showing a relation between frequency of input regarding piston rods of the shock absorbers of FIGS. 15 and 16 and a damping force.

In this case, a relation between frequency $\omega$ of speed of the piston and a damping force F due to the presence of the popper valves 317, 327 becomes as shown in FIG. 17. In FIG. 17, a curve (1) represents the hard property (maximum damping force) and a curve (2) represents the soft property (minimum damping force). Further, in FIG. 17, $\omega_1$ is resonant frequency of the sprung mass of the vehicle on which the hydraulic shock absorber 409 of damping force adjustable type is mounted, $\omega_2$ is cut-off frequency determined by the time constant $\tau$. In this way, it is possible to generate the great damping force in the proximity of the resonant frequency $\omega_1$ of the sprung mass, to effectively perform the posture control and vibration control by controlling the damping force by means of the suspension control system and to improve the comfort by isolating the vibration of the unsprung mass by reducing the damping force regardless of the set damping force property with respect to frequency $\omega_3$ greater than the resonant frequency of the unsprung mass.

Incidentally, in the hydraulic shock absorber 409 of damping force adjustable type shown in FIG. 15, in place of the relief valves 414, 416, an electromagnetic proportion control valve 33 shown in FIG. 2 may be used.

Next, a tenth embodiment of the present invention will be explained with reference to FIG. 16. Incidentally, since the tenth embodiment is substantially the same as the eighth embodiment shown in FIG. 14 except for the arrangement of the needle valves of the teller valves 382, 402 and the valve opening pressure adjusting mechanisms for the disc valves 377, 397, the same elements as those of the eighth embodiment are designated by the same reference numerals, and only the differences will be fully explained.

Figure 16:
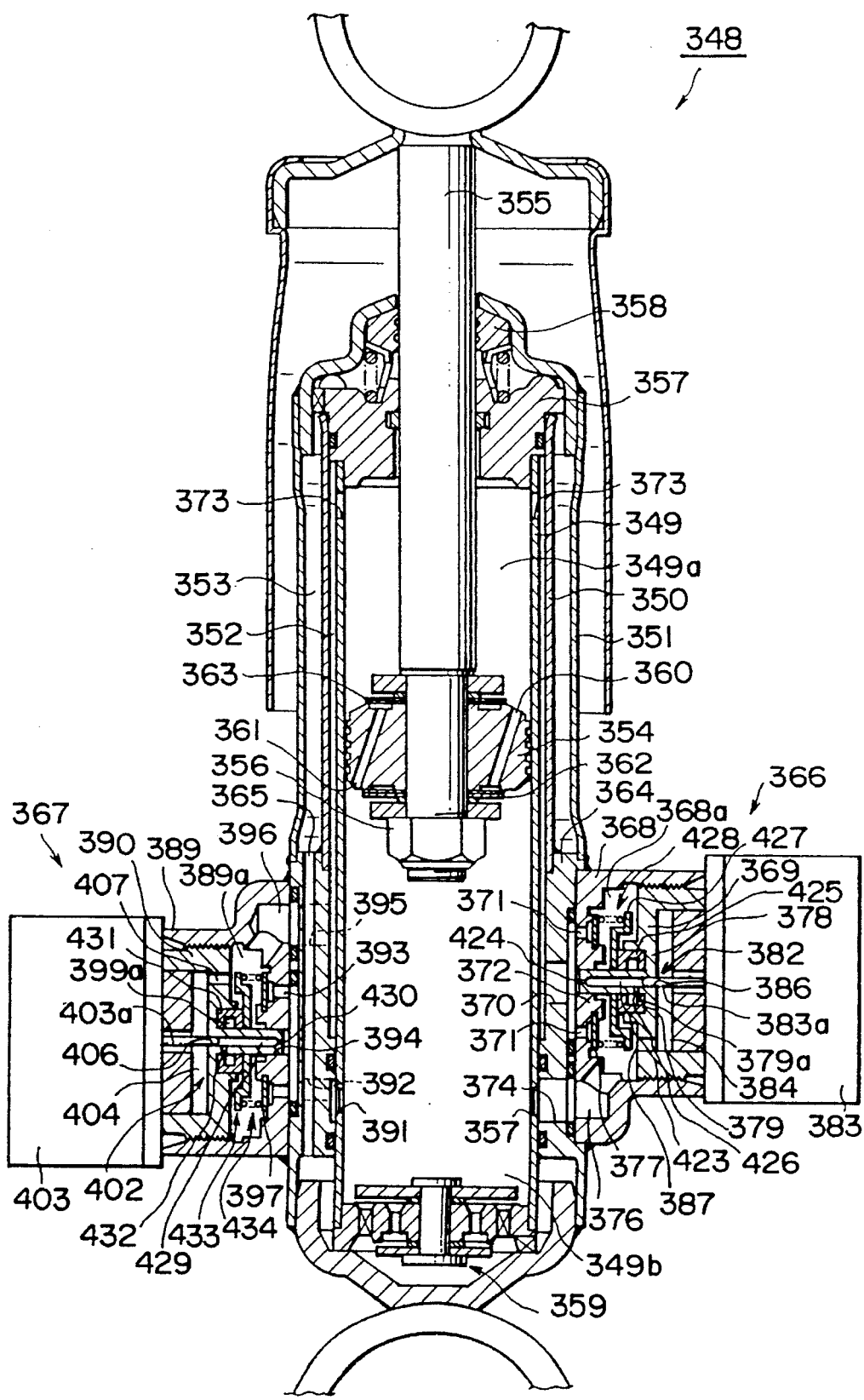
FIG. 16 is a side sectional view of a damping force adjustable hydraulic shock absorber according to a tenth embodiment of the present invention.

As shown in FIG. 16, in a hydraulic shock absorber 348 of damping force adjustable type, the spring members 383, 403b of the relief valves 382, 402 are omitted from the hydraulic shock absorber 348 of damping force adjustable type shown in FIG. 14, and the operation rod 383a of the proportion solenoid 383 is integrally formed with the needle 386 and the operation rod 403a of the proportion solenoid 403 is integrally formed with the needle 406 so that the relief pressures of the relief valves 382, 402 are directly controlled by thrust forces of the proportion solenoids 383, 403.

In the extension side damping force generating mechanism 366, a back pressure passage 423 extending through the plug 369 is connected to the guide bore 372 formed in the valve case 368 and an orifice 424 is formed in a tip end of the back pressure passage 423. A plunger 425 is slidably fitted into the guide bore 379 of the plug 369 to define the back pressure chamber 379a forming a part of the valve opening pressure adjusting mechanism within the guide bore 379. The back pressure passage 423 extends through the plunger 425 and is communicated with the back pressure chamber 379a through an orifice 426. The pressure in the back pressure passage 423 and accordingly the pressure in the back pressure chamber 379a can be relieved by the relief valve 382 disposed between the orifices 424, 426. Incidentally, The orifice 424 serves to reduce the pressure of oil flowing from the upper cylinder chamber 349a into the back pressure passage 423, thereby reducing load to the relief valve 382.

A spring seat 427 is attached to the plunger 425 and a spring member 428 is arranged between the spring seat 427 and the disc valve 377. The pressure in the back pressure chamber 379a acts on the plunger 425 to shift the disc valve 377 toward the valve closing direction, thereby adjusting the flow area of the disc valve. The back pressure chamber 379a has volume elasticity due to an elastic force of the spring member (spring means) 428.

Similarly, in the contraction side damping force generating mechanism 367, a back pressure passage 429 extending through the plug 390 is connected to the guide bore 394 formed in the valve case 389 and an orifice 430 is formed in a tip end of the back pressure passage 429. A plunger 431 is slidably fitted into the guide bore 399 of the plug 390 to define the back pressure chamber 399a forming a part of the valve opening pressure adjusting mechanism within the guide bore 399. The back pressure chamber 429 extends through the plunger 431 and is communicated with the back pressure chamber 399a through an orifice 432. The pressure in the back pressure passage 429 and accordingly the pressure in the back pressure chamber 399a can be relieved by the relief valve 402 disposed between the orifices 430, 432. Incidentally, the orifice 430 serves to reduce the pressure of oil flowing from the lower cylinder chamber 349b into the back pressure passage 429, thereby reducing load to the relief valve 402.

A spring seat 433 is attached to the plunger 431 and a spring member (spring means) 434 is arranged between the spring seat 433 and the disc valve 397. The pressure in the back pressure chamber 399a acts on the plunger 431 to shift the disc valve 397 toward the valve closing direction, thereby adjusting the flow area of the disc valve. The back pressure chamber 399a has volume elasticity due to an elastic force of the spring member 428.

With this arrangement, similar to the eighth embodiment shown in FIG. 14, by adjusting the relief pressures of the relief valves 387, 402 by using the currents applied to the proportion solenoids 383, 403, the damping forces at the extension side and the contraction side can be directly controlled substantially without being influenced upon the piston speed.

Further, similar to the ninth embodiment, since the back pressure chambers 379a, 399a have the volume elasticity due to the presence of the springs 428, 434 and the back pressure passages 423, 429 are communicated with the back pressure chambers 379a, 399a through the orifices 426, 432, a low-pass filter wherein the pressures in the back pressure chambers 379a, 399a have "time-lag of first order" system regarding the relief pressures of the relief valves 387, 402 is formed, with the result that, even if pulsation is generated in the oil in the back pressure passages 423, 429 by the surging and self-excited vibration of the relief valves 387, 402 due to high frequency input to the piston rod 304, since the increase in pressure in the back pressure chambers 379a, 399a is gradually damped, it is possible to prevent excessive increase in the back pressure in the disc valves 377, 379, thereby generating the proper damping force.

Incidentally, in the tenth embodiment, while an example that both the extension side damping force adjusting mechanism 366 and the contraction side damping force adjusting mechanism 367 are used was explained, the shock absorber according to the present invention may include only one of these damping force adjusting mechanisms to attain the light weight of the vehicle and/or to simplify the specification.

In the hydraulic shock absorbers according to the seventh and eighth embodiments, since the spring means is arranged between the valve body of the relief valve and the plunger of the proportion solenoid, the mass of the valve body of the relief valve can be reduced sufficient to increase the natural frequency, thereby improving the response to the high frequency input to the piston rod.

Further, in the hydraulic shock absorbers according to the ninth and tenth embodiments, since the back pressure chamber have "time-lag of first order" system regarding the change in relief pressure due to the presence of the spring means and one of the orifices, for the high frequency input to the piston rod, the increase in damping force due to the delay in response of the damping force adjusting valve can be prevented.

Figure 18:
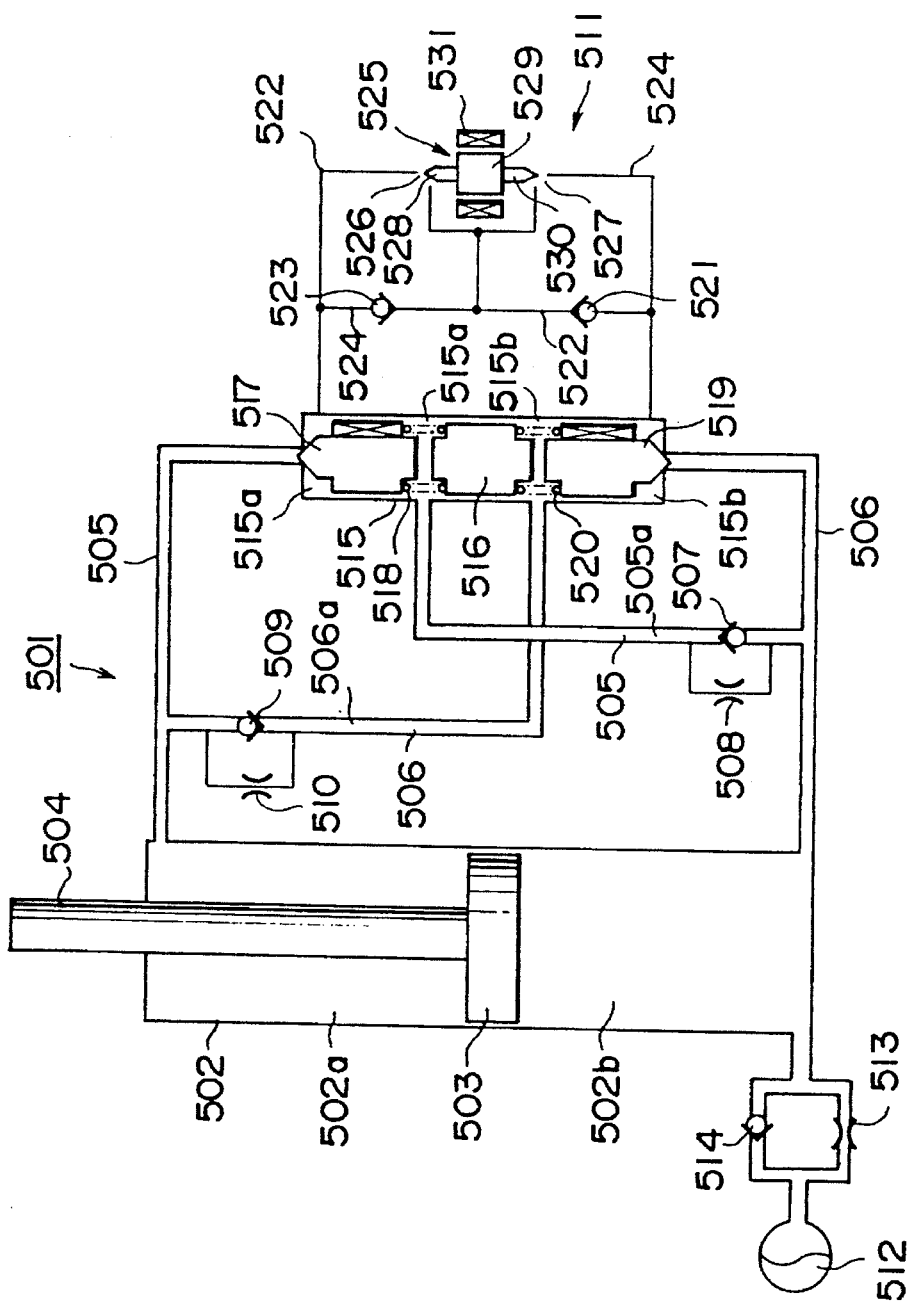
FIG. 18 is a circuit diagram of a damping force adjustable hydraulic shock absorber according to an eleventh embodiment of the present invention.

Next, an eleventh embodiment of the present invention will be explained with reference to FIG. 18. As shown in FIG. 18, a hydraulic shock absorber 501 of damping force adjustable type has a piston 503 slidably mounted within a cylinder 502 filled with oil, which piston divides the interior of the cylinder 502 into an upper cylinder chamber 502a and a lower cylinder chamber 502b. A piston rod 504 is connected to the piston 503, and the other end of the piston rod 504 extends to the exterior of the cylinder 502 through a rod guide formed in an end wall of the cylinder and a seal member (not shown).

A first communication passage 505 and a second communication passage 506 are arranged outside the cylinder 502 to permit the communication between the upper cylinder chamber 502a and the lower cylinder chamber 502b. The first communication passage 505 includes a check valve 507 for permitting the oil flow from the upper cylinder chamber 502a to the lower cylinder chamber 502b, and an orifice 508 for bypassing the check valve 507. The second communication passage 506 includes a check valve 509 for permitting the oil flow from the lower cylinder chamber 502b to the upper cylinder chamber 502a, and an orifice 510 for bypassing the check valve 509. A damping force adjusting mechanism 511 which will be described later is arranged at an upstream side of the check valve 507 and the orifice 508 of the first communication passage 505 and at an upstream side of the check valve 509 and the orifice 510 of the second communication passage 506. Further, a reservoir 512 for compensating (by compression and expansion of gas) the change in volume of the cylinder 502 due to the extension and contraction of the piston rod 504 is connected to the lower cylinder chamber 502b through an orifice 513 and a check valve 514 which are arranged in parallel.

In the damping force adjusting mechanism 511, a piston member 516 is slidably mounted within a guide 515 which forms a pressure chamber (described later). The pressure chamber is divided by the piston member 516 into a first chamber 515a communicating with the first communication passage 505 and a second chamber 515b communicating with the second communication passage 506. A popper 517 forming an extension side damping force adjusting valve is slidably guided within the first chamber 515a of the guide 515, and a first spring member 518 is arranged between the popper 517 and one end of the piston member 516, so that the popper 517 is shifted by the pressure in the first communication passage 505 associated with the upper cylinder chamber 502a in opposition to an elastic force of the first spring member 518 to adjust a flow area of the first communication passage 505. Further, the popper 517 also acts as a check valve for preventing oil flow from the first chamber 515a to the upper cylinder chamber 502a.

A poppet 519 forming a contraction side damping force adjusting valve is slidably guided within the second chamber 515b of the guide 515, and a second spring member 520 is arranged between the poppet 519 and the other end of the piston member 516, so that the popper 519 is shifted by the pressure in the second communication passage 506 associated with the lower cylinder chamber 502b in opposition to an elastic force of the second spring member 520 to adjust a flow area of the second communication passage 506. Further, the popper 519 also acts as a check valve for preventing oil flow from the second chamber 515b to the lower cylinder chamber 502b. Pressure chambers are formed adjacent to back surfaces of the extension side popper 517 and the contraction side popper 519 in the guide 515.

The first and second chambers 515a, 515b of the damping force adjusting mechanism 511 are connected to each other through a first relief pressure passage 522 including a check valve 521 for permitting the oil flow from the first chamber 515a to the second chamber 515b and a second relief pressure passage 524 including a check valve 523 for permitting the oil flow from the second chamber 515b to the first chamber 515a. Further, the first relief pressure passage 522 is connected to a first relief valve 526 of an electromagnetic proportion control valve 525 which will be described later, and the second relief pressure passage 524 is connected to a second relief valve 527 of the electromagnetic proportion control valve 525. The first chamber 515a is communicated with the upper cylinder chamber 502a as a first low pressure chamber in which low pressure is created during contraction of the piston rod 504, through the first relief pressure passage 522, check valve 521, second chamber 515b and a downstream portion 506a of the second communication passage 506 regarding the second chamber 515b. And, the first relief pressure passage 522, the second chamber 515b and the downstream portion 506a of the second communication passage 506 constitute a first relief passage of the present invention.

Further, the second chamber 515b is communicated with the lower cylinder chamber 502b as a second low pressure chamber in which low pressure is created during extension of the piston rod 504, through the second relief pressure passage 524, check valve 523, first chamber 515a and a downstream portion 505a of the first communication passage 505 regarding the first chamber 515a. And, the second relief pressure passage 524, the first chamber 515a and the downstream portion 505a of the first communication passage 505 constitute a second relief passage of the present invention.

The electromagnetic proportion control valve 525 includes a needle 528 formed on one end of a plunger 529 and adapted to open and close the first relief valve 526, and a needle 530 formed on the other end of the plunger 529 and adapted to open and close the second relief valve 527. Relief pressure of the first relief valve 526 is adjusted by shifting the plunger 529 under a thrust force corresponding to current applied to a proportion solenoid 531 to bias the needle 528 toward a valve closing direction, and relief pressure of the second relief valve 527 is adjusted by biasing the needle 530 toward the valve closing direction. in this case, when one of the first and second relief valves 526, 527 is closed, the other relief valve is opened.

Next, the operation off the shock absorber according to the eleventh embodiment having the above construction will be explained.

During the extension of the piston rod 504, since the popper 519 of the damping force adjusting mechanism 511 acts as the check valve to close or block the second communication passage 506, the pressure in the upper cylinder chamber 502a opens the popper 517 and the check valve 507, with the result that the oil in the upper cylinder chamber flows into the (low pressure) lower cylinder chamber 502b through the first communication passage 505, thereby generating a damping force corresponding the opening value of the popper 517. In this case, since the amount of oil emitted from the upper cylinder chamber 502a due to the extension of the piston rod 504 is smoothly replenished into the lower cylinder chamber 502b through the opened check valve 514, excessive negative pressure is prevented from generating in the lower cylinder chamber 502b, thereby preventing bubbles from entering into the oil in the lower cylinder chamber.

In the damping force adjusting mechanism 511, the popper 517 is shifted by the pressure in the upper cylinder chamber 502a toward the valve opening direction in opposition to the elastic force of the first spring member 518. Further, the pressure of oil in the upper cylinder chamber 502a acts on the second chamber 515b through the orifice 510 of the second communication passage 506 to shift the piston member 516 toward the poppet 517, thereby compressing the first spring member 518. In this case, when the pressure in the second chamber 515b reaches the relief pressure of the second relief valve 527 of the electromagnetic proportion control valve 525, since it is relieved to the (low pressure) lower cylinder chamber 502b through the second relief passage 524 and through the first chamber 515a and the downstream portion 505a of the first communication passage 505, the pressure in the second chamber 515b can freely be set by adjusting the relief pressure of the second relief valve 527 by using the current applied to the proportion solenoid 531. And, the poppet 517 is shifted until it reaches a position where the pressure in the upper cylinder chamber 502a is balanced with the elastic force of the first spring member 518 compressed by the pressure in the second chamber 515b, thereby determining the flow area of the first communication passage 505. In this way, the opening value of the popper 517 is varied with the pressure in the upper cylinder chamber 502a, thereby generating a predetermined damping force substantially without being influenced upon the piston speed. This damping force can be directly controlled by adjusting the relief pressure of the second relief valve 527.

During the contraction of the piston rod 504, since the popper 517 of the damping force adjusting mechanism 511 acts as the check valve to close or block the first communication passage 505, the pressure in the lower cylinder chamber 502b opens the popper 519 and the check valve 509, with the result that the oil in the lower cylinder chamber flows into the (low pressure) upper cylinder chamber 502a through the second communication passage 506, thereby generating a damping force corresponding the opening value of the poppet 519. In this case, since the amount of oil emitted from the lower cylinder chamber 502b due to the contraction of the piston rod 504 flows into the reservoir 512 through the orifice 513 with moderate resistance, excessive negative pressure is prevented from generating in the upper cylinder chamber 502a, thereby preventing bubbles from entering into the oil in the upper cylinder chamber.

In the damping force adjusting mechanism 511, the popper 519 is shifted by the pressure in the lower cylinder chamber 502b toward the valve opening direction in opposition to the elastic force of the second spring member 520. Further, the pressure of oil in the lower cylinder chamber 502b acts on the first chamber 515a through the orifice 508 of the first communication passage 505 to shift the piston member 516 toward the popper 519, thereby compressing the second spring member 520. In this case, when the pressure in the first chamber 515a reaches the relief pressure of the first relief valve 526 of the electromagnetic proportion control valve 525, since it is relieved to the (low pressure) upper cylinder chamber 502a through the first relief passage 522 and through the second chamber 515b and the downstream portion 506a of the second communication passage 506, the pressure in the first chamber 515a can freely be set by adjusting the relief pressure of the first relief valve 526 by using the current applied to the proportion solenoid 531. And, the popper 519 is shifted until it reaches a position where the pressure in the lower cylinder chamber 502b is balanced with the elastic force of the second spring member 520 compressed by the pressure in the first chamber 515a, thereby determining the flow area of the second communication passage 506. In this way, the opening value of the popper 519 is varied with the pressure in the lower cylinder chamber 502b, thereby generating a predetermined damping force substantially without being influenced upon the piston speed. This damping force can be directly controlled by adjusting the relief pressure of the first relief valve 526.

In the above-mentioned damping force control, when the damping force at the extension side is controlled by adjusting the pressure in the second chamber 515b by using the relief pressure of the second relief valve 527 of the electromagnetic proportion control valve, since the first relief valve 526 is in the open condition, the damping force at the contraction side is decreased. On the other hand, when the damping force at the contraction side is controlled by adjusting the pressure in the first chamber 515a by using the relief pressure of the first relief valve 526, since the second relief valve 527 is in the open condition, the damping force at the extension side is decreased. Thus, the different (great and small) damping forces can be generated at the extension side and the contraction side, thereby obtaining the damping force properties suitable for the suspension control.

Further, in the damping force adjusting mechanism 511, since the piston member 516 and the poppers 517, 519 are arranged within the guide 515 and the pilot pressure is applied to the first and second chambers 515a, 515b alternately during the extension and contraction of the piston rod 504 by means of the first and second relief valves 526, 527 of the electromagnetic proportion control valve 525, respectively, to adjust the damping forces at the extension side and the contraction side, the single damping force adjusting mechanism can be used regarding both the extension side and the contraction side, thereby achieving the compactness of the shock absorber.

Further, since the first and second spring members 518, 520 are arranged between the piston member 516 and the poppers 517, 519, for the high frequency input, even if the delay in response occurs in the pilot pressure acting on the first and second chambers 515a, 515b, it is possible to prevent the excessive increase in the damping force by deforming the first and second spring members 518, 520.

In addition, since the first communication passage 505 also acts as a passage for generating the damping force during the extension of the piston rod, and the downstream portion 505a of the first communication passage 505 regarding the first chamber 515a also acts as a passage for directing the pressure to the first chamber 515a during the contraction of the piston rod, the arrangement of passages can be simplified. Similarly, since the second communication passage 506 also acts as a passage for generating the damping force during the contraction of the piston rod, and the downstream portion 506a of the second communication passage 506 regarding the second chamber 515b also acts as a passage for directing the pressure to the second chamber 515b during the extension of the piston rod, the arrangement of passages can be further simplified.

Further, since the first and second chambers 515a, 515b as the pressure chambers provide flow paths through which the oil can flow, dust generated in the cylinder 502 and the pressure chambers is not trapped in the first and second chambers 515a, 515b, thereby preventing the reduction in the damping force due to the jamming of dust.

Next, a twelfth embodiment of the present invention will be explained with reference to FIGS. 19 and 20.

Figure 19:
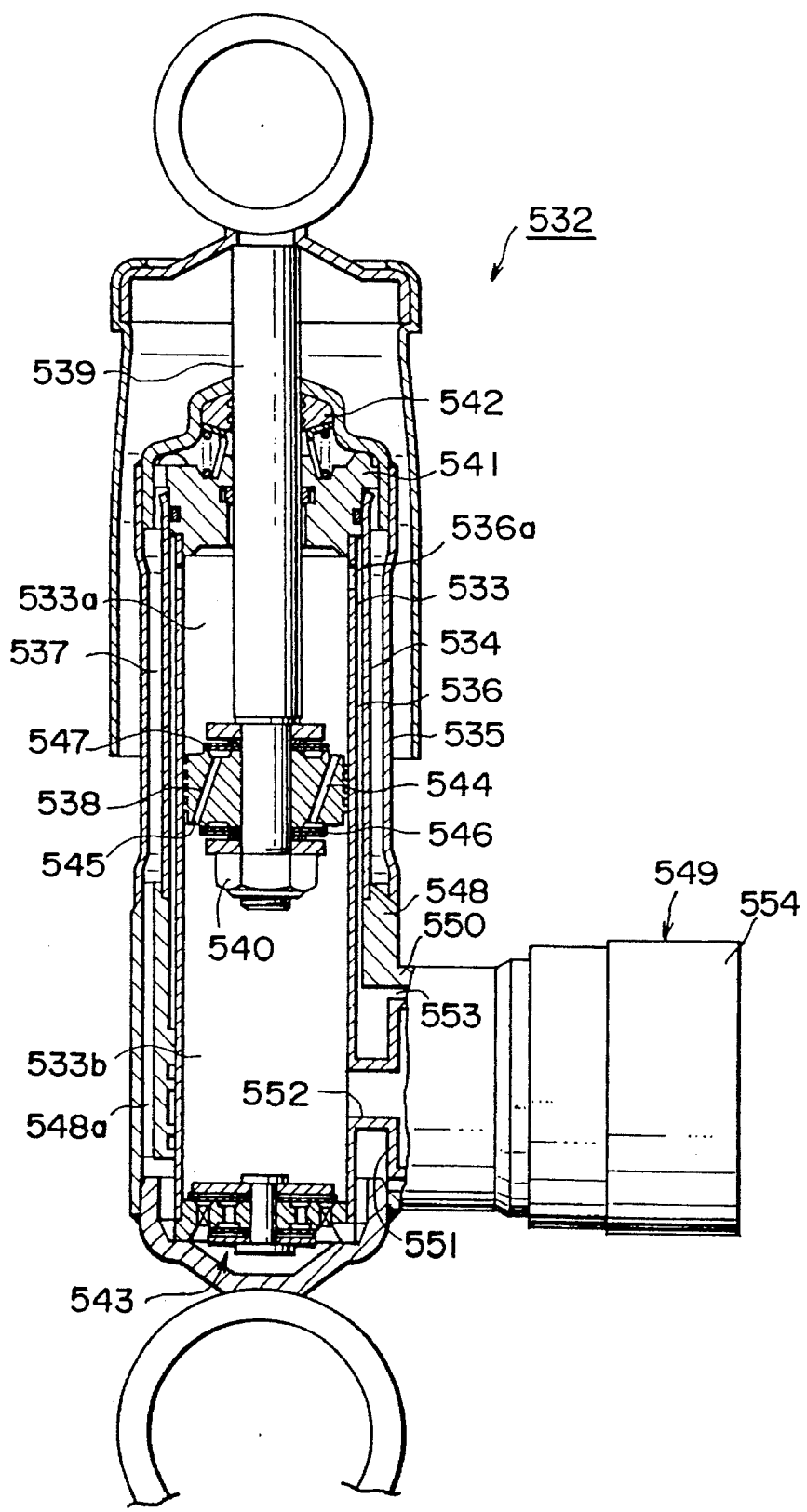
FIG. 19 is a side sectional view of a damping force adjustable hydraulic shock absorber according to a twelfth embodiment of the present invention.
Figure 20:
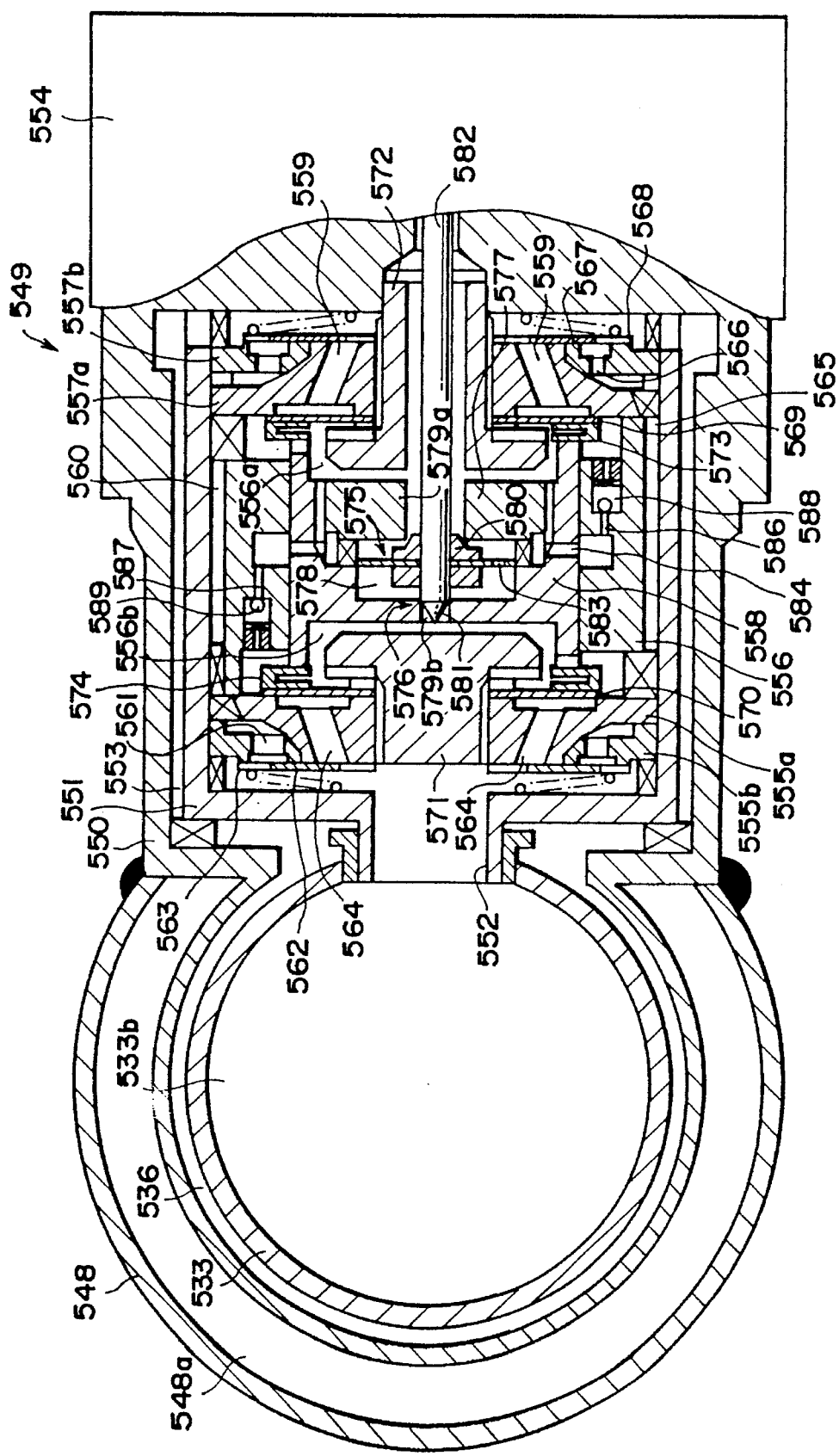
FIG. 20 is a side sectional view of a damping force adjusting mechanism of the shock absorber of FIG. 19.

As shown in FIGS. 19 and 20, a hydraulic shock absorber 532 of damping force adjustable type comprises an inner cylindrical member 534 surrounding a cylinder 533, and an outer cylindrical member 535 surrounding the inner cylindrical member 534, so that a triplicate cylinder structure is provided. With this arrangement, an annular passage 536 communicated with an upper portion of the cylinder 533 through a passage 536a formed in a wall of the cylinder 533 is defined between the cylinder 533 and the inner cylindrical member 534, and a reservoir chamber 537 is defined between the inner cylindrical member 534 and the outer cylindrical member 535.

A piston 538 is slidably mounted within the cylinder 533 to divide the interior of the cylinder 533 into an upper cylinder chamber 533a and a lower cylinder chamber 533b. A piston rod 539 has one end connected to the piston 538 by a nut 540, and the other end extending to the exterior of the cylinder 533 through a rod guide 541 and a seal member 542 which are attached to an upper end of the cylinder 533. A base valve 543 is mounted on a lower end of the cylinder 533. The lower cylinder chamber 533b is communicated with the reservoir chamber 537 through the base valve 543 with moderate flow resistance. The cylinder 533 is filled with oil and the reservoir chamber 537 is filled with oil and gas, so that the change in volume of the cylinder 533 due to extension and contraction of the piston rod 539 can be compensated by compression and expansion of the gas in the reservoir chamber 537.

An extension side passage 544 and a contraction side passage 545 for permitting the communication between the upper cylinder chamber 533a and the lower cylinder chamber 533b are formed in the piston 538. The extension side passage 544 includes a disc valve 546 for permitting the oil flow from the upper cylinder chamber 533a to the lower cylinder chamber 533b to generate a damping force when pressure in the upper cylinder chamber 533a exceeds a predetermined value, and the contraction side passage 545 includes a disc valve 547 for permitting the oil flow from the lower cylinder chamber 533b to the upper cylinder chamber 533a to generate a damping force when pressure in the lower cylinder chamber 533b exceeds a predetermined value.

A substantially cylindrical passage member 548 is arranged around the cylinder 533 near the lower end of the cylinder, and lower ends of the inner and outer cylindrical members 534, 535 are attached to an upper end of the passage member 548. An annular passage 536 is defined between the cylinder 533 and the passage member 548, and the reservoir chamber 537 is communicated with the lower cylinder chamber 533b through a reservoir passage 548a extending axially through the passage member 548 via the base valve 543.

Around the passage member 548, there is arranged a damping force adjusting mechanism 549 connected to the annular passage 536 and adapted to communicate the upper cylinder chamber 533a with the lower cylinder chamber 533b. The damping force adjusting mechanism 549 includes a substantially cylindrical case 550 joined to a side wall of the passage member 548, and a cylindrical valve case 551 having a bottom and inserted into the case 550. The interior of the valve case 551 is communicated with the lower cylinder chamber 502b through a passage 552 formed in the bottom of the valve case 551, and a passage 553 communicating with the annular passage 536 is defined between the case 550 and the valve case 551. A proportion solenoid 554 which will be described later is connected to the other end of the case 550. Within the valve case 551, there are arranged in order (from bottom thereof) valve members 555b, 555a, a substantially cylindrical guide member 556 and valve members 557a, 557b, which members partition the interior of the valve case 551. A piston member 558 is slidably mounted within the guide member 556 to divide a pressure chamber in the guide member 556 into a first chamber 556a and a second chamber 556b.

A valve passage 559 for communicating the passage 553 with the first chamber 556a is formed in the valve member 557a and a passage 560 communicating with the first chamber 556a is defined between the valve case 551 and the guide member 556. A valve passage 561 for communicating the passage 560 with the passage 552 is formed in the valve member 555b. The annular passage 536, passage 553, valve passage 559, first chamber 556a, passage 560, valve passage 561 and passage 552 constitute a first communication passage for communicating the upper cylinder chamber 553a with the lower cylinder chamber 553b. The valve member 555b is provided with a check valve 562 for permitting the oil flow from the passage 553 associated with the valve passage 561 to the passage 552 (i.e., permitting the oil flow from the upper cylinder chamber 553a to the lower cylinder chamber 553b through the first communication passage), and an orifice 563 for bypassing the check valve 562.

A valve passage 564 for communicating the passage 552 with the second chamber 556b is formed in the valve member 555a and a passage 565 communicating with the second chamber 556b is defined between the valve case 551 and the guide member 556. A valve passage 566 for communicating the passage 565 with the passage 553 is formed in the valve member 557b. The passage 552, valve passage 564, second chamber 556b, passage 565, valve passage 566 and passage 553 constitute a second communication passage for communicating the lower cylinder chamber 553b with the upper cylinder chamber 553a. The valve member 557b is provided with a check valve 567 for permitting the oil flow from the passage 555 associated with the valve passage 566 to the passage 553 (i.e., permitting the oil flow from the lower cylinder chamber 553b to the upper cylinder chamber 553a through the second communication passage), and an orifice 568 for bypassing the check valve 567.

The valve member 557a is provided with a disc valve 569 acting as an extension side damping force adjusting valve which can be deformed and opened to adjust a flow area of the valve passage 559 when the pressure in the first communication passage associated with the upper cylinder chamber 553a acts on the valve. The disc valve 569 also serves as a check valve for preventing the oil flow from the lower cylinder chamber 553b to the upper cylinder chamber 553a through the first communication passage. Further, the valve member 555a is provided with a disc valve 570 acting as a contraction side damping force adjusting valve which can be deformed and opened to adjust a flow area of the valve passage 564 when the pressure in the second communication passage associated with the lower cylinder chamber 553b acts on the valve. The disc valve 570 also serves as a check valve for preventing the oil flow from the upper cylinder chamber 553a to the lower cylinder chamber 553b through the second communication passage.

Further, pressure chambers are formed adjacent to back surfaces of the extension side disc valve 569 and the contraction side disc valve 570 within the guide member 556. Incidentally, in FIG. 20, the reference numerals 571, 572 denote bolts for fastening the disc valves 569, 570 to the valve members 555a, 557a.

One end of the piston member 558 abuts against the disc valve 569 via a first spring member 573 and the other end of the piston member abuts against the disc valve 570 via a second spring member 574. When the piston member 558 is shifted toward the disc valve 569 to compress the first spring member 573, the disc valve 569 is urged toward a valve closing direction; whereas, when the piston member 558 is shifted toward the disc valve 570 to compress the second spring member 574, the disc valve 570 is urged toward a valve closing direction.

The piston member 558 is provided with a first relief valve 575 for relieving the pressurized oil in the first chamber 556a and a second relief valve 576 for relieving the pressurized oil in the second chamber 556b. The first relief valve 575 is a needle valve in which a relief chamber 578 is defined by a plug 577 attached to the piston member 558 and a valve bore 579b for communicating the first chamber 556a in the plug 577 with the relief chamber 578 is opened and closed by a needle 580. The second relief valve 576 is a needle valve in which a valve bore 579b for communicating the second chamber 556b in the piston member 558 with the relief chamber 578 is opened and closed by a needle 581. The needle 580 is connected to an intermediate portion of an operation rod 582 of a proportion solenoid 554 inserted into the relief chamber 578 from the valve bore 579a, and the needle 581 is formed on a tip end of the operation rod 582, so that, when one of the first and second relief valves 575, 576 is opened by shifting the operation rod 582, the other relief valve is closed. The operation rod 582 is elastically supported at a predetermined position by a leaf spring 583 connected to the needle 580.

The proportion solenoid 554 serves to apply a thrust force proportional to a current supplied to the solenoid to the operation rod 582 regardless of a displaced amount of the rod. Relief pressure of the first relief valve 575 can be adjusted by changing the valve opening pressure of the needle 580 by shifting the operation rod 582 toward the first chamber 556a, and relief pressure of the second relief valve 576 can be adjusted by changing the valve opening pressure of the needle 581 by shifting the operation rod 582 toward the second chamber 556b.

Passages 584, 585 communicating with the relief chamber 578 are formed in a side wall of the piston member 558, and a first relief passage 586 always communicating with the passages 584, 585 and serving to communicate the relief chamber 578 with the first chamber 556a and a second relief passage 587 for communicating the relief chamber 578 with the second chamber 556b are formed in a side wall of the guide member 556. The first relief passage 586 includes a check valve 588 for permitting the oil flow from the relief chamber 577 to the first chamber 556a, and the second relief passage 587 includes a check valve 589 for permitting the oil flow from the relief chamber 577 to the second chamber 556b.

Next, the operation of the shock absorber according to the twelfth embodiment having the above construction will be explained.

During the extension of the piston rod 539, since the disc valve 570 of the damping force adjusting mechanism 549 acts as the check valve to close or block the valve passage 564 (second communication passage), the sliding movement of the piston 538 causes the oil in the upper cylinder chamber 533a to flow into the lower cylinder chamber 533b through the passage 536a, annular passage 536 and through the passage 553, valve passage 559, first chamber 556a, passage 560, valve passage 561 and passage 552 (first communication passage) of the damping force adjusting mechanism 549. In this case, the disc valve 569 and the check valve 562 are opened, thereby generating the damping force corresponding to the opening value of the disc valve 569.

On the other hand, the oil in the upper cylinder chamber 553a flows into the second chamber 556b through the passage 553, orifice 568, valve passage 566 and passage 565, with the result that the piston member 558 is shifted toward the disc valve 569, thereby compressing the second spring member 573. When the pressure of oil in the second chamber 556b reaches the relief pressure, since the first relief valve 575 is opened, the oil in the second chamber flows into the relief chamber 578. Further, the check valve 588 is opened, and the oil in the relief chamber is relieved to the lower cylinder chamber 533b through the first relief passage 586 and through the first chamber 556a and the passage 560. Accordingly, the pressure in the second chamber 556b can freely be set by adjusting the relief pressure of the first relief valve 575 by using the current applied to the proportion solenoid 554. And, the disc valve 569 is shifted until it reaches a position where the pressure in the upper cylinder chamber 553a is balanced with the elastic force of the disc valve 569 itself and the elastic force of the second spring member 573 compressed by the pressure in the second chamber 556b, thereby determining the damping force. In this way, the opening value of the disc valve 569 is varied with the pressure in the upper cylinder chamber 533a, thereby generating a predetermined damping force substantially without being influenced upon the piston speed. This damping force can be directly controlled by adjusting the relief pressure of the second relief valve 576 by using the current applied to the proportion solenoid 554.

Incidentally, if the pressure in the upper cylinder chamber 553a exceeds a predetermined value, the disc valve 546 of the piston 538 will be opened to flow the oil in the upper cylinder chamber 533a directly into the lower cylinder chamber 553b through the extension side passage 544, thereby generating the damping force.

During the contraction of the piston rod 539, since the disc valve 569 of the damping force adjusting mechanism 549 acts as the check valve to close or block the valve passage 559 (first communication passage), the sliding movement of the piston 538 causes the oil in the lower cylinder chamber 533b to flow into the upper cylinder chamber 533a through the passage 552 of the damping force adjusting mechanism 549, valve passage 564, second chamber 556b, passage 565, valve passage 566 and passage 553 and through the annular passage 536 and the passage 536a (second communication passage). In this case, the disc valve 570 and the check valve 567 are opened, thereby generating the damping force corresponding to the opening value of the disc valve 570.

On the other hand, the oil in the lower cylinder chamber 553b flows into the first chamber 556a through the passage 552, orifice 563, valve passage 561 and passage 560, with the result that the piston member 558 is shifted toward the disc valve 570, thereby compressing the first spring member 574. When the pressure of oil in the first chamber 556a reaches the relief pressure, since the first relief valve 575 is opened, the oil in the first chamber flows into the relief chamber 578. Further, the check valve 589 is opened, and the oil in the relief chamber is relieved to the upper cylinder chamber 533b as the first low pressure chamber through the second relief passage 587 and through the second chamber 556b and the passage 565. Accordingly, the pressure in the first chamber 556a can freely be set by adjusting the relief pressure of the first relief valve 575 by using the current applied to the proportion solenoid 554. And, the disc valve 570 is shifted until it reaches a position where the pressure in the lower cylinder chamber 553b is balanced with the elastic force of the disc valve 570 itself and the elastic force of the first spring member 574 compressed by the pressure in the first chamber 556a, thereby determining the damping force. In this way, the opening value of the disc valve 570 is varied with the pressure in the lower cylinder chamber 533b, thereby generating a predetermined damping force substantially without being influenced upon the piston speed. This damping force can be directly controlled by adjusting the relief pressure of the first relief valve 575 by using the current applied to the proportion solenoid 554.

Incidentally, if the pressure in the lower cylinder chamber 553b exceeds a predetermined value, the disc valve 547 of the piston 538 will be opened to flow the oil in the lower cylinder chamber 533b directly into the upper cylinder chamber 553a through the contraction side passage 545, thereby generating the damping force.

In the above-mentioned damping force control, when the damping force at the extension side is controlled by adjusting the pressure in the second chamber 556b by using the relief pressure of the second relief valve 576, since the first relief valve 575 is in the open condition, the damping force at the contraction side is decreased. On the other hand, when the damping force at the contraction side is controlled by adjusting the pressure in the first chamber 556a by using the relief pressure of the first relief valve 575, since the second relief valve 576 is in the open condition, the damping force at the extension side is decreased. Thus, the different (great and small) damping forces can be generated at the extension side and the contraction side, thereby obtaining the damping force properties suitable for the suspension control.

Further, in the damping force adjusting mechanism 549, since the pilot pressure is applied to the first and second chambers 556a, 556b alternately during the extension and contraction of the piston rod 539 by means of the first and second relief valves 575, 576, respectively, to adjust the damping forces at the extension side and the contraction side, the single damping force adjusting mechanism can be used regarding both the extension side and the contraction side, thereby achieving the compactness of the shock absorber. Further, since the first and second spring members 573, 574 are arranged between the piston member 558 and the disc valves 569, 570, for the high frequency input, even if the delay in response occurs in the pilot pressure acting on the first and second chambers 556a, 556b, it is possible to prevent the excessive increase in the damping force by deforming the first and second spring members 573, 574.

Next, a thirteenth embodiment of the present invention will be explained with reference to FIGS. 21 to 23. Incidentally, since the thirteenth embodiment is substantially the same as the twelfth embodiment only except for the construction of the first and second relief valves, the same elements as those in the twelfth embodiment are designated by the same reference numerals, and only the differences will be explained.

Figure 21:
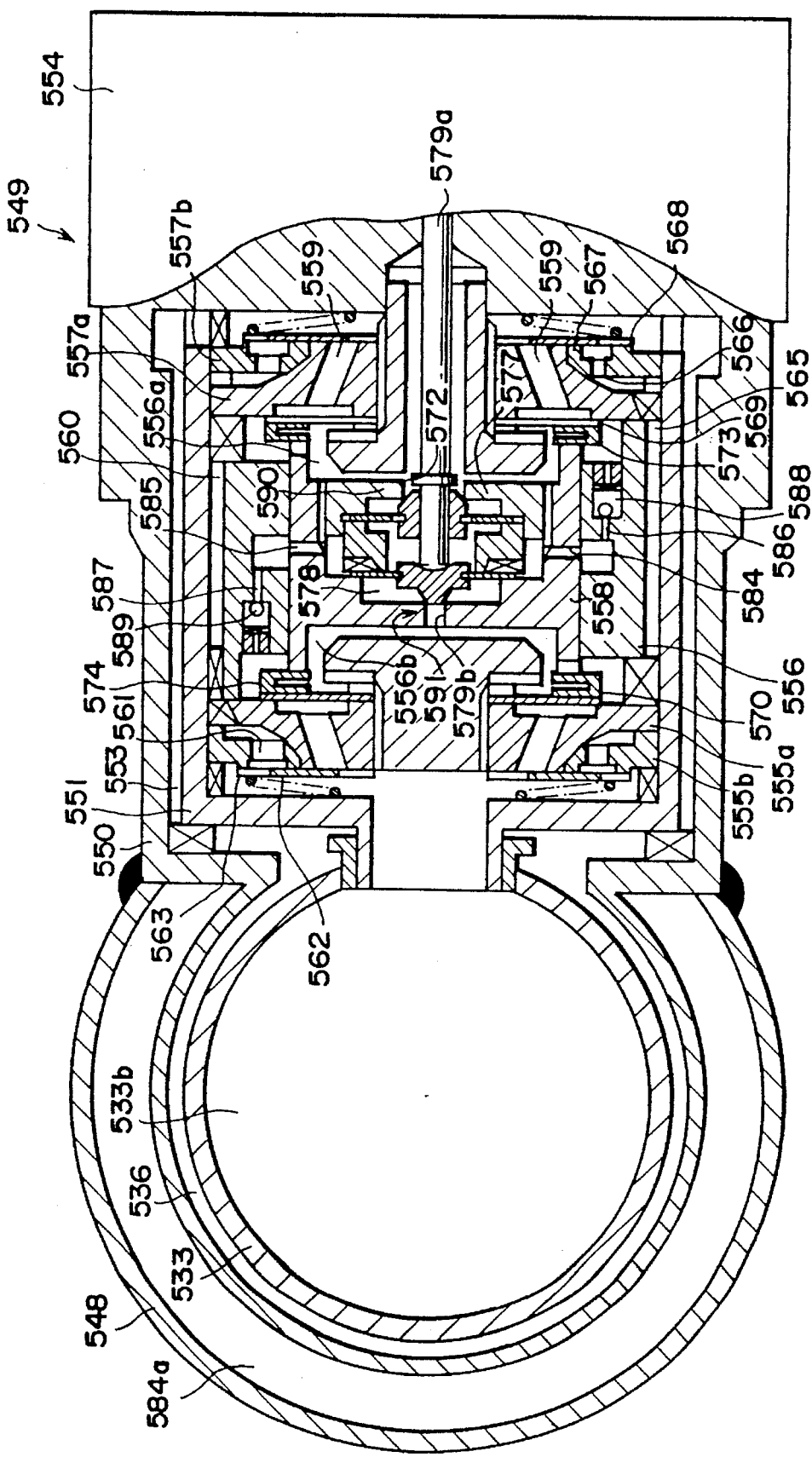
FIG. 21 is a side sectional view of a damping force adjusting mechanism as a main portion of a damping force adjustable hydraulic shock absorber according to a thirteenth embodiment of the present invention.
Figure 22:
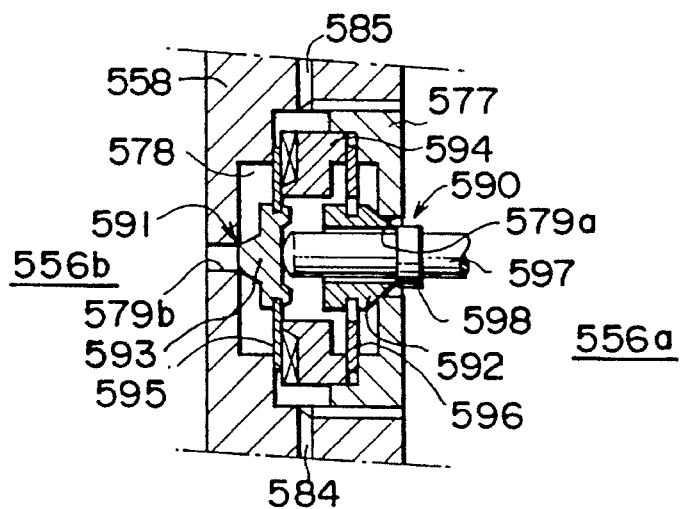
FIG. 22 is an enlarged view of a main portion of FIG. 21.

As shown in FIGS. 21 and 22, the piston member 558 includes a first relief valve 590 for relieving the oil in the first chamber 556a and a second relief valve 591 for relieving the oil in the second chamber 556b. The first relief valve 590 is a needle valve in which the valve bore 579a (FIG. 22) is opened and closed by a needle 592 and the second relief valve is also a needle valve in which the valve bore 579b is opened and closed by a needle 593. An annular valve seat member 594 is arranged within the relief chamber 578 of the piston member 558. An outer peripheral portion of an annular leaf spring 595 is pinched between the valve seat member 594 and the piston member 558, and an outer peripheral portion of an annular leaf spring 596 is pinched between the valve seat member 594 and the plug 577. The needle 592 is attached to an inner peripheral portion of the leaf spring 596 so that it is biased toward a valve closing direction by an elastic force of the leaf spring 596 with a predetermined set force. The needle 593 is attached to an inner peripheral portion of the valve spring 595 to be elastically held at a valve opening position. Further, the valve seat member 594 and the valve spring 595 constitute a fail-safe valve in which the relief chamber 578 is isolated from the passages 584, 585 by making the valve spring 595 abut against the valve seat member 594. When the needle 593 is shifted toward the valve closing position by deforming the valve spring 595, the valve spring 595 is separated from the valve seat member 594, thereby communicating the relief chamber 578 with the passages 584, 585.

An operation rod 597 of the proportion solenoid 554 is inserted into the relief chamber from the valve bore 579a and passes through the needle 592 until a tip end of the operation rod abuts against a back surface of the needle 593. Further, a step 598 is formed on an intermediate portion of the operation rod 597, which step is disposed in a confronting relation to a front surface of the needle 592. When the operation rod 597 is shifted toward the valve bore 579b by energizing the proportion solenoid 554, the needle 593 is firstly shifted toward the valve closing direction to deform the valve spring 595, with the result that the valve spring is separated from the valve seat member 594 and the step 598 of the operation rod 597 abuts against the needle 592. In this condition, the relief pressure of the first relief valve 590 is the greatest and the second relief valve 591 is in the open condition. When the thrust force of the operation rod 597 is increased, the relief pressure of the first relief valve 590 is decreased accordingly, and, when the thrust force is further increased, the first relief valve 590 is opened and the second relief valve 591 is closed, and, thereafter, the relief pressure of the second relief valve 591 is increased.

Next, the operation of the shock absorber according to the thirteenth embodiment having the above construction will be explained.

Similar to the twelfth embodiment, the damping force at the extension side can be directly controlled substantially without being influenced upon the piston speed by adjusting the relief pressure of the second relief valve 591 by shifting the operation rod 597 by energizing the proportion solenoid 544, and the damping force at the contraction side can be directly controlled substantially without being influenced upon the piston speed by adjusting the relief pressure of the first relief valve 590.

Figure 23:
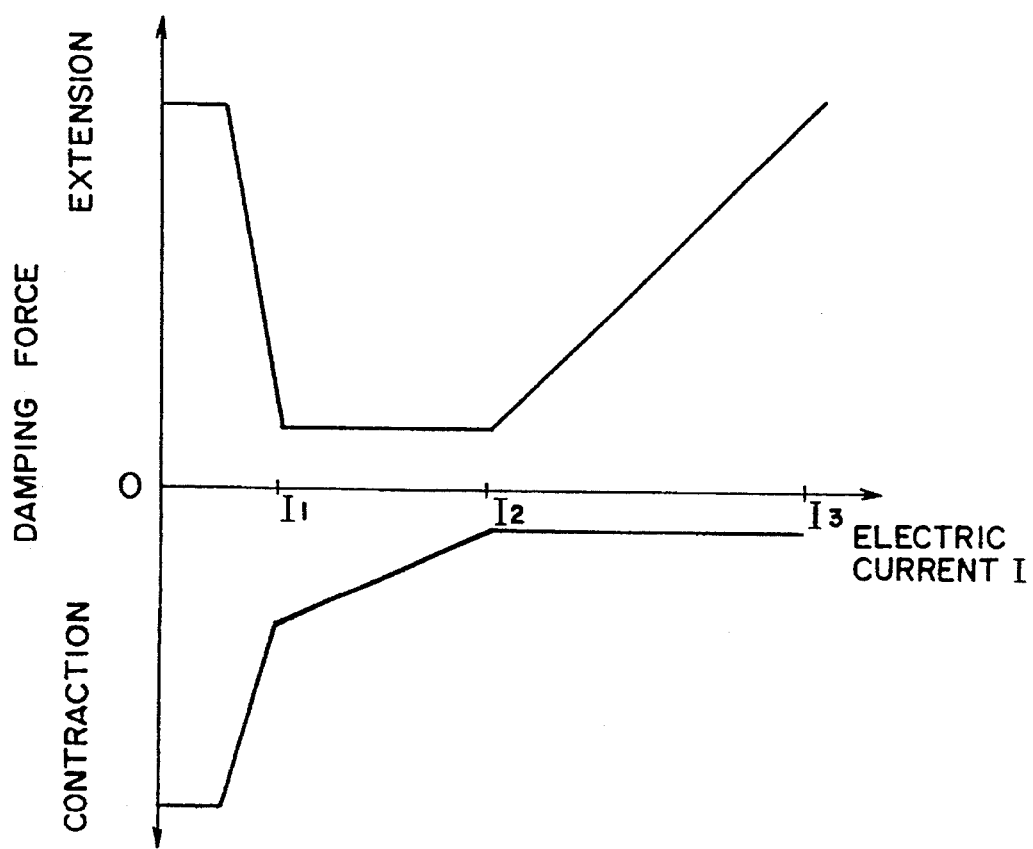
FIG. 23 is a graph showing a relation between an electric current applied to a proportion solenoid of the damping force adjusting mechanism according to the thirteenth embodiment of the present invention and a damping force at extension and contraction sides.

In this case, as shown in FIG. 23, a relation between the current I applied to the proportion solenoid 544 and the damping force F becomes as follows. That is to say, when the current is not applied to the proportion solenoid (current I=0), since the communication between the relief chamber 578 and the passages 584, 585 is prevented by the valve spring 595, the relief pressure of the second relief valve 591 is increased, thereby maximizing the damping force at the extension side. On the other hand, since the needle 592 is biased toward the valve closing direction by the leaf spring 596 with the predetermined set force, the relief pressure of the first relief valve 590 is also increased, thereby maximizing the damping force at the contraction side.

By energizing the proportion solenoid 544, when the operation rod 597 is shifted to make the step 598 abut against the needle 592 (current I=$I_1$), since the valve spring 595 is separated from the valve seat member 594 to communicate the relief chamber 578 with the passages 584, 585, the second relief valve 591 is opened, thereby minimizing the damping force at the extension side. On the other hand, since the needle 592 is biased toward the valve opening direction, the relief pressure of the first relief valve 590 is decreased accordingly, thereby obtaining the damping force having the predetermined hard property at the contraction side.

When the current I is increased, since the thrust force of the operation rod 597 is also increased, the relief pressure of the first relief valve 590 is decreased accordingly, thereby reducing the damping force at the contraction side in proportion to the current I. When the current I reaches a value $I_2$, the leaf spring 596 is deformed by the operation rod 597 to shift the needle 592, with the result that the first relief valve 590 is opened to minimize the damping force at the extension side. Further, due to the shifting movement of the operation rod 597, the needle 593 is shifted to the valve closing position, thereby closing the second relief valve 591.

Further, when the current I is increased, since the thrust force of the operation rod 597 is also increased, the relief pressure of the second relief valve 591 is increased accordingly, thereby increasing the damping force at the extension side in proportion to the current I. When the current I reaches a value $I_3$, the damping force at the extension side is maximized.

In this way, similar to the twelfth embodiment, the different (great and small) damping force properties can be set at the extension side and the contraction side. Further, the single damping force adjusting mechanism can be used regarding both the extension side and the contraction side, thereby achieving the compactness of the shock absorber. In addition, since the damping forces at the extension side and the contraction side are maximized in the condition that the current is not being applied to the proportion solenoid 554, if the application of the current to the proportion solenoid 554 is stopped due to the breakage of the electric wire and the like, the damping forces at the extension side and the contraction side are maximized, thereby achieving the fail-safe while maintaining the steering stability of the vehicle. Further, in a low current area ($I \leq I_1$) where the thrust force of the proportion solenoid 554 is unstable, only the opening and closing of the valve spring 595 is performed and the adjustment of the damping force is not effected. And, in a current range ($I_1 < I \leq I_3$) where the thrust force is stabilized, the adjustment of the damping force is effected. Accordingly, a relation between the current and the damping force property in a linear condition with small hysteresis can be obtained.

Figure 24:
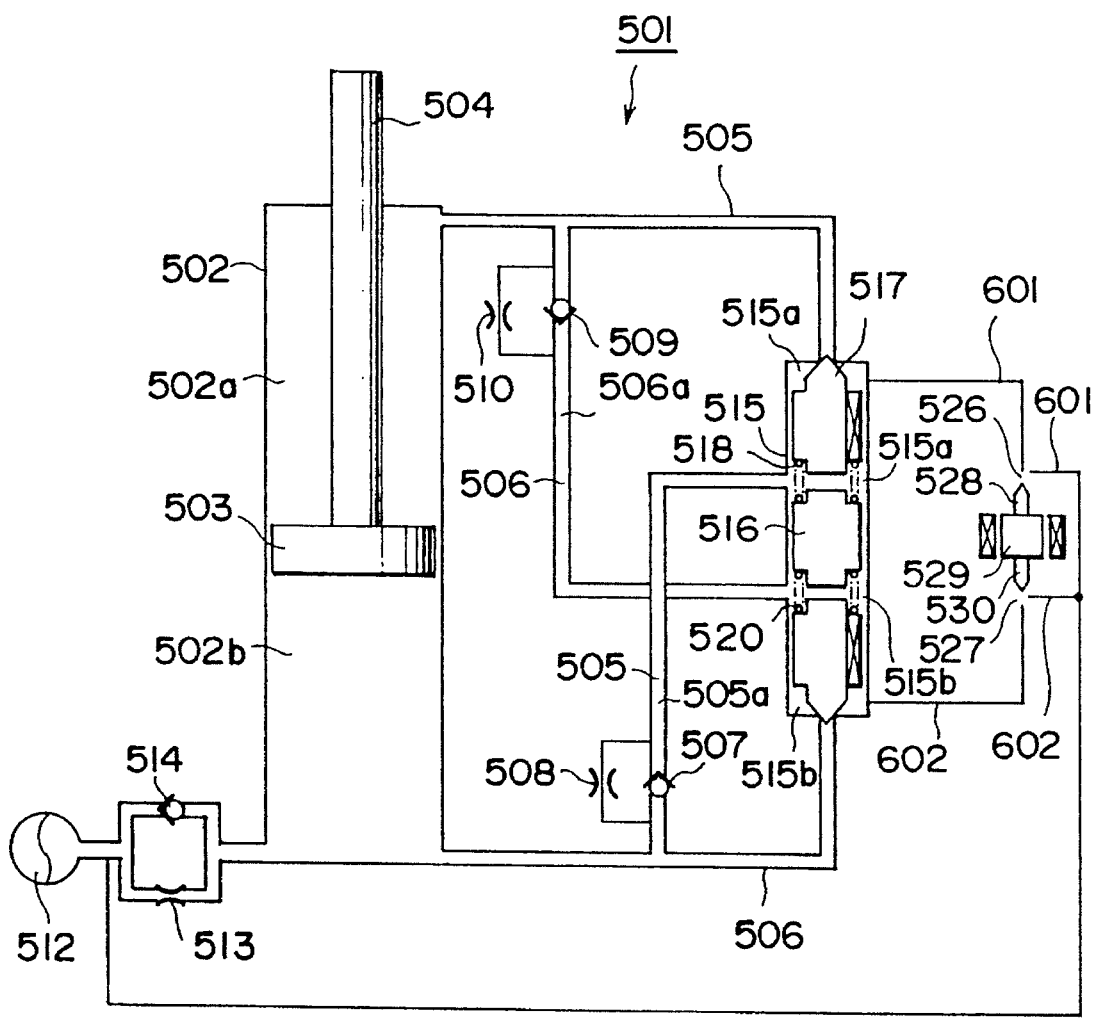
FIG. 24 is an alteration of the circuit diagram of FIG. 18.

Incidentally, in the above-mentioned embodiments, while an example that the upper cylinder chamber is the first low pressure chamber and the lower cylinder chamber is the second low pressure chamber was explained, the present invention is not limited to this example, but, as shown in FIG. 24 (in an alteration shown in FIG. 24, the same elements as those shown in FIG. 18 are designated by the same reference numerals and explanation thereof will be omitted), it may be so designed that a communication passage 601 acting as a first relief passage for communicating the first chamber 515a with the reservoir 512 and a communication passage 602 acting as a second relief passage for communicating the second chamber 515b with the reservoir 512 are provided so that the reservoir having constant low pressure is used as the first and second low pressure chambers.

In this case, although the communication passages 601, 602 may include check valves in order to permit only the oil flow from the first chamber to the first low pressure chamber or from the second chamber to the second low pressure chamber as is in the above-mentioned embodiments, since the pressure in the reservoir is always low, even if these check valves are not provided, oil can flow into the reservoir so that a bad influence does not affect upon the damping force property. Thus, as shown in FIG. 24, the communication passages 601, 602 may include no check valve.

In the embodiments shown in FIGS. 18 to 24, the single damping force adjusting mechanism can be used regarding both the extension side and the contraction side, thereby achieving the compactness of the shock absorber. Further, since the first communication passage also acts as the passage for generating the damping force during the extension of the piston rod and the downstream side portion of the first communication passage regarding the first chamber also acts as the passage for directing the pressure to the first chamber during the contraction of the piston rod, the arrangement of passages can be simplified. Similarly, since the second communication passage also acts as the passage for generating the damping force during the contraction of the piston rod and the downstream side portion of the second communication passage regarding the second chamber also acts as the passage for directing the pressure to the second chamber during the extension of the piston rod, the arrangement of passages can be further simplified.

Further, since the different (great and small) damping forces can be set at the extension side and the contraction side, it is possible to obtain the damping force properties suitable for the suspension control.

Furthermore, when the current is not applied to the proportion solenoid, since the fail-safe valve prevents the communication between the relief chamber and the first and second relief passages to nullify the relieving effect of the first and second relief valves, the damping forces at the extension side and the contraction side are maximized, thereby achieving the fall-safe while maintaining the steering stability of the vehicle.

What is claimed is:

1. A hydraulic shock absorber comprising:

a hollow cylinder for containing a hydraulic fluid;

a piston, provided in said cylinder, and dividing the interior of said cylinder into an extension-side chamber and a contraction side chamber;

a piston rod having a first end connected to said piston and a second end extending out of said cylinder;

an extension-side passage connecting said two cylinder chambers with each other so that hydraulic fluid can flow in the extension-side passage during an extension stroke of said piston;

an extension-side damping force generating valve provided in said extension-side passage for generating a damping force during an extension stroke of said piston;

an extension-side back pressure chamber operatively associated with said extension-side damping force generating valve;

an extension-side back pressure passage for transmitting hydraulic fluid pressure in said extension-side passage, at a point upstream of said extension-side damping force generating valve, to said extension-side back pressure chamber through a pressure reducing orifice, wherein hydraulic fluid pressure established in said back pressure chamber urges said damping force generating valve toward a closed position;

an extension-side back pressure adjusting valve in fluid communication with said extension-side back pressure chamber through said extension-side back pressure passage, wherein said extension-side back pressure adjusting valve controls discharge of hydraulic fluid from said back pressure chamber to a low pressure area;

a contraction-side passage connecting said two cylinder chambers with each other so that hydraulic fluid can flow in the contraction-side passage during a contraction stroke of said piston;

a contraction-side damping force generating valve provided in said contraction-side passage for generating a damping force during a contraction stroke of said piston;

a contraction-side back pressure chamber operatively associated with said contraction-side damping force generating valve;

a contraction-side back pressure passage for transmitting hydraulic fluid pressure in said contraction-side passage, at a point upstream of said contraction-side damping force generating valve, to said contraction-side back pressure chamber through a pressure reducing orifice, wherein hydraulic fluid pressure established in said back pressure chamber urges said damping force generating valve toward a valve-closing position; and a contraction-side back pressure adjusting valve in fluid communication with said contraction-side back pressure chamber through said contraction-side back pressure passage, wherein said contraction-side back pressure adjusting valve controls discharge of hydraulic fluid from said back pressure chamber to a low pressure area.

2. A hydraulic shock absorber according to claim 1, wherein said extension-side and contraction-side back pressure adjusting valves have a common valve element which when moved in one direction, opens the extension-side back pressure adjusting valve while closing the contraction-side back pressure adjusting valve, and when moved in the other direction, closes the extension-side back pressure adjusting valve while opening the contraction-side back pressure adjusting valve.

3. A hydraulic shock absorber according to claim 2, wherein said extension-side and contraction-side back pressure adjusting valves are connected to said low pressure portion through a common passage through which the hydraulic fluid discharged from said back pressure chambers flows, said common passage having a pressure controlling valve.

4. A hydraulic shock absorber according to claim 2, wherein each of said back pressure chambers is partially defined by a movable member which moves as the pressure established in the back pressure chamber varies and wherein a spring is provided between the movable member and the associated damping force generating valve so that the force generated by the pressure in the back pressure chamber is transmitted to the damping force generating valve through said movable member and the spring.

5. A hydraulic shock absorber according to claim 2, wherein each of said back pressure adjusting valves comprises a valve element, a plunger and a spring disposed between the valve element and the plunger.

6. A hydraulic shock absorber according to claim 1, wherein said extension-side and contraction-side back pressure adjusting valves are connected to said low pressure area through a common passage through which the hydraulic fluid discharged from said back pressure chambers flows, salad common passage having a pressure controlling valve.

7. A hydraulic shock absorber according to claim 1, wherein each of said back pressure chambers is partially defined by a movable member which moves as the pressure established in the back pressure chamber varies and wherein a spring is provided between the movable member and the associated damping force generating valve so that the force generated by the pressure in the back pressure chamber is transmitted to the damping force generating valve through said movable member and said spring.

8. A hydraulic shock absorber according to claim 1, wherein each of said back pressure adjusting valves comprises a valve element, a plunger and a spring disposed between said valve element and said plunger.

* * * * *